US012692029B2

(12) United States Patent
    Lowe et al.

(10) Patent No.: US 12,692,029 B2
(45) Date of Patent: Jul. 28, 2026

(54) BASE STATION FOR AN UNMANNED AERIAL VEHICLE INCLUDING A ROTATABLE ROOF ASSEMBLY

(71) Applicant: Skydio, Inc., San Mateo, CA (US)

(72) Inventors: Patrick Allen Lowe, Palo Alto, CA (US); Christopher C. Berthelet, Sunnyvale, CA (US); George Oliver Turvey, Brookdale, CA (US); Yee Shan Woo, Campbell, CA (US); Kellen James Waterman O'Rourke, Belmont, CA (US); Lingyun Luo, San Mateo, CA (US); Benjamin Scott Thompson, San Carlos, CA (US); Joseph Tankeh, Fremont, CA (US); Hunter Celio, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/222,024

(22) Filed: May 29, 2025

(65) Prior Publication Data

US 2026/0048877 A1      Feb. 19, 2026

Related U.S. Application Data

(60) Provisional application No. 63/683,504, filed on Aug. 15, 2024.

(51) Int. Cl.
    *B64U 80/70*          (2023.01)
    *B64U 70/92*          (2023.01)
                  (Continued)
(52) U.S. Cl.
    CPC ............. *B64U 80/70* (2023.01); *B64U 70/92* (2023.01); *B64U 80/30* (2023.01); *H01Q 1/246* (2013.01)

(58) Field of Classification Search
    CPC ........ B64U 80/70; B64U 70/92; B64U 80/30; H01Q 1/246
    See application file for complete search history.

(56) References Cited

U.S. PATENT DOCUMENTS

| 3,229,649 A | | 1/1966 | William | |
| 3,253,806 A | * | 5/1966 | Eickmann | B64C 27/12 244/17.23 |

(Continued)

FOREIGN PATENT DOCUMENTS

| CN | 117818944 A | 4/2024 |
| CN | 220764753 U | 4/2024 |

OTHER PUBLICATIONS

International Search Report and Written Opinion mailed on Jan. 9, 2026 in corresponding PCT Application No. PCT/US2025/041862.

*Primary Examiner* — Medhat Badawi

(74) *Attorney, Agent, or Firm* — Young Basile Hanlon & MacFarlane. P.C.

(57)                  ABSTRACT

A base station for an unmanned aerial vehicle (UAV) that includes a body, a landing platform supported by the body and configured to support the UAV, and a roof assembly movably coupled to the base. The roof assembly includes a cover defining a cavity therein and one or more ears coupled to the cover and movably coupled to the body such that the roof assembly is movable between a closed position, in which the cover is configured to enclose the landing platform and the UAV supported thereon, and an open position, in which the cover is located at least partially below the landing platform with respect to an elevational direction such that the landing platform is unobstructed by the cover to facilitate takeoff and landing of the UAV. The roof assembly is rotatable through an angular range of motion that is defined by the one or more ears.

20 Claims, 32 Drawing Sheets

(51) Int. Cl.
  *B64U 80/30*     (2023.01)
  *H01Q 1/24*     (2006.01)

(56) References Cited

U.S. PATENT DOCUMENTS

| | | | | |
|---|---|---|---|---|
| 3,417,729 A * | 12/1968 | Gilday | B64C 27/006 | 416/61 |
| 3,483,696 A * | 12/1969 | Gilbert | B64C 27/08 | 416/157 R |
| 3,575,527 A * | 4/1971 | Watanabe | F04D 29/052 | 416/169 R |
| 3,805,723 A * | 4/1974 | Bernaerts | B63H 3/002 | 416/61 |
| 4,262,712 A * | 4/1981 | Young | B67D 7/54 | 141/DIG. 1 |
| 4,865,248 A * | 9/1989 | Barth | E05B 35/086 | 312/215 |
| 4,954,962 A * | 9/1990 | Evans, Jr. | G05D 1/0246 | 701/28 |
| 4,974,795 A * | 12/1990 | Christol | E01F 3/00 | 244/114 R |
| 5,040,116 A * | 8/1991 | Evans, Jr. | G05D 1/0246 | 701/28 |
| 5,116,273 A * | 5/1992 | Chan | A45B 23/00 | 160/370.21 |
| 5,283,739 A * | 2/1994 | Summerville | G05D 1/0289 | 700/255 |
| 5,371,581 A * | 12/1994 | Wangler | G01S 17/933 | 340/963 |
| 5,386,462 A * | 1/1995 | Schlamp | G07F 11/62 | 379/93.12 |
| 5,452,374 A * | 9/1995 | Cullen | G06T 7/70 | 382/296 |
| 5,497,236 A * | 3/1996 | Wolff | H04N 1/047 | 358/406 |
| 5,731,884 A * | 3/1998 | Inoue | H04N 1/4076 | 358/3.06 |
| 5,842,667 A * | 12/1998 | Jones | B64F 1/00 | 244/114 R |
| 5,847,522 A * | 12/1998 | Barba | H02K 7/1025 | 318/269 |
| 5,901,253 A * | 5/1999 | Tretter | G06T 3/606 | 382/292 |
| 5,995,898 A * | 11/1999 | Tuttle | G07C 5/085 | 427/255.31 |
| 6,031,612 A * | 2/2000 | Shirley | G01B 11/2531 | 356/511 |
| 6,073,283 A * | 6/2000 | Zheng | A47G 9/062 | 5/502 |
| 6,079,668 A * | 6/2000 | Brown | B64F 1/36 | 244/114 R |
| 6,193,190 B1 * | 2/2001 | Nance | B64F 1/20 | 244/114 R |
| 6,266,577 B1 * | 7/2001 | Popp | B25J 9/1682 | 700/248 |
| 6,344,796 B1 * | 2/2002 | Ogilvie | G07C 9/27 | 340/568.1 |
| 6,374,155 B1 * | 4/2002 | Wallach | G05D 1/0295 | 701/25 |
| 6,426,699 B1 * | 7/2002 | Porter | A47F 10/00 | 340/568.1 |
| 6,507,670 B1 * | 1/2003 | Moed | G06T 5/77 | 382/172 |
| 6,543,983 B1 * | 4/2003 | Felder | B23Q 7/1442 | 414/389 |
| 6,636,781 B1 * | 10/2003 | Shen | B25J 9/065 | 703/2 |
| 6,676,460 B1 * | 1/2004 | Motsenbocker | B63H 5/165 | 440/71 |
| 6,690,997 B2 * | 2/2004 | Rivalto | G06Q 10/0835 | 700/242 |
| 6,694,217 B2 * | 2/2004 | Bloom | G07C 9/21 | 700/242 |
| 6,705,523 B1 * | 3/2004 | Stamm | G06Q 10/08 | 235/383 |
| 6,804,607 B1 * | 10/2004 | Wood | G05D 1/1062 | 340/425.5 |
| 6,919,803 B2 * | 7/2005 | Breed | G08B 29/181 | 340/568.1 |
| 6,954,290 B1 * | 10/2005 | Braudaway | H04N 1/00045 | 358/488 |
| 6,961,711 B1 * | 11/2005 | Chee | G07F 7/00 | 705/26.1 |
| 6,965,440 B1 * | 11/2005 | Nakagiri | G06F 3/1262 | 715/251 |
| 6,970,838 B1 * | 11/2005 | Kamath | G06Q 30/0617 | 705/26.81 |
| 7,006,952 B1 * | 2/2006 | Matsumoto | G06F 7/60 | 703/2 |
| 7,016,536 B1 * | 3/2006 | Ling | G06V 30/15 | 382/290 |
| 7,031,519 B2 * | 4/2006 | Elmenhurst | G06F 18/254 | 382/101 |
| 7,082,883 B1 * | 8/2006 | Arias | A47C 31/11 | 108/90 |
| 7,129,817 B2 * | 10/2006 | Yamagishi | G07C 9/37 | 340/5.71 |
| 7,133,743 B2 * | 11/2006 | Tilles | G07F 17/13 | 700/242 |
| 7,145,699 B2 * | 12/2006 | Dolan | G06V 30/1478 | 358/452 |
| 7,149,611 B2 * | 12/2006 | Beck | B64U 30/26 | 701/32.4 |
| 7,171,879 B2 * | 2/2007 | Gass | B27G 21/00 | 83/477.1 |
| 7,188,513 B2 * | 3/2007 | Wilson | G01N 1/2226 | 73/864.81 |
| 7,334,755 B2 * | 2/2008 | Svoboda, Jr. | B64C 27/08 | 244/17.23 |
| 7,335,071 B1 * | 2/2008 | Motsenbocker | B63H 23/30 | 440/71 |
| 7,337,686 B2 * | 3/2008 | Sagi-Dolev | G01V 11/00 | 73/866 |
| 7,337,944 B2 * | 3/2008 | Devar | A47G 29/16 | 232/19 |
| 7,339,993 B1 * | 3/2008 | Brooks | H04N 21/440281 | 375/240.1 |
| 7,459,880 B1 * | 12/2008 | Rosen | H01M 10/465 | 320/101 |
| 7,639,386 B1 * | 12/2009 | Siegel | G06Q 40/03 | 358/1.18 |
| 7,668,404 B2 * | 2/2010 | Adams | G06V 10/24 | 382/101 |
| 7,673,831 B2 * | 3/2010 | Steele | F42B 12/365 | 244/1 TD |
| 7,685,953 B2 * | 3/2010 | Giles | B63J 99/00 | 114/72 |
| 7,693,745 B1 * | 4/2010 | Pomerantz | G07F 17/13 | 705/26.5 |
| 7,780,148 B2 * | 8/2010 | Kirby | E01F 7/02 | 256/12.5 |
| 7,894,939 B2 * | 2/2011 | Zini | G05D 1/028 | 700/245 |
| 7,925,375 B2 * | 4/2011 | Schininger | G07F 11/54 | 700/214 |
| 7,946,526 B2 * | 5/2011 | Zimet | B64U 30/24 | 244/17.23 |
| 7,946,530 B1 * | 5/2011 | Talmage, Jr. | B64C 27/006 | 244/140 |
| 7,966,093 B2 * | 6/2011 | Zhuk | G05D 1/0088 | 706/50 |
| 8,015,023 B1 * | 9/2011 | Lee | G06Q 10/08 | 700/226 |
| 8,052,081 B2 * | 11/2011 | Olm | B64U 10/13 | 244/17.23 |
| 8,078,317 B2 * | 12/2011 | Allinson | G07F 11/62 | 700/242 |
| 8,126,642 B2 * | 2/2012 | Trepagnier | G05D 1/024 | 701/28 |

(56) References Cited

U.S. PATENT DOCUMENTS

| | | | | |
|---|---|---|---|---|
| 8,131,607 | B2 * | 3/2012 | Park | G06Q 10/047 |
| | | | | 705/28 |
| 8,145,351 | B2 * | 3/2012 | Schininger | G07F 9/009 |
| | | | | 221/12 |
| 8,195,328 | B2 * | 6/2012 | Mallett | G16H 40/67 |
| | | | | 221/102 |
| 8,245,469 | B2 * | 8/2012 | Rubel | E04B 5/48 |
| | | | | 52/223.6 |
| 8,256,172 | B2 * | 9/2012 | Benson | E04F 15/02183 |
| | | | | 52/489.1 |
| 8,286,236 | B2 * | 10/2012 | Jung | G06Q 50/18 |
| | | | | 713/168 |
| 8,412,588 | B1 * | 4/2013 | Bodell | G06Q 30/0643 |
| | | | | 706/919 |
| 8,424,802 | B2 * | 4/2013 | Tripier-Larivaud | E01F 3/00 |
| | | | | 244/116 |
| 8,429,754 | B2 * | 4/2013 | Jung | H04L 9/40 |
| | | | | 726/21 |
| 8,511,606 | B1 * | 8/2013 | Lutke | B64U 80/40 |
| | | | | 320/109 |
| 8,599,027 | B2 * | 12/2013 | Sanchez | G01S 13/931 |
| | | | | 340/435 |
| 8,602,349 | B2 * | 12/2013 | Petrov | G05D 1/0866 |
| | | | | 244/17.23 |
| 8,639,400 | B1 * | 1/2014 | Wong | A63H 27/12 |
| | | | | 701/16 |
| 8,736,820 | B2 * | 5/2014 | Choe | G05D 1/024 |
| | | | | 356/9 |
| 8,752,166 | B2 * | 6/2014 | Jung | B33Y 50/02 |
| | | | | 700/95 |
| 8,791,790 | B2 * | 7/2014 | Robertson | G07C 9/20 |
| | | | | 455/411 |
| 8,874,301 | B1 * | 10/2014 | Rao | B60K 28/04 |
| | | | | 340/576 |
| 8,899,903 | B1 * | 12/2014 | Saad | B65G 67/00 |
| | | | | 320/109 |
| 8,948,914 | B2 * | 2/2015 | Zini | G05B 19/41895 |
| | | | | 700/258 |
| 8,956,100 | B2 * | 2/2015 | Davi | B60P 1/02 |
| | | | | 414/334 |
| 8,989,053 | B1 * | 3/2015 | Skaaksrud | H04W 4/80 |
| | | | | 370/255 |
| 9,033,285 | B2 * | 5/2015 | Iden | B61C 17/12 |
| | | | | 701/19 |
| 9,050,997 | B1 * | 6/2015 | Schramm | B62D 6/002 |
| 9,051,043 | B1 * | 6/2015 | Peeters | G05D 1/104 |
| 9,056,676 | B1 * | 6/2015 | Wang | B60R 9/00 |
| 9,079,587 | B1 * | 7/2015 | Rupp | G05D 1/0289 |
| 9,126,693 | B1 * | 9/2015 | Shi | G05D 1/0669 |
| 9,139,310 | B1 * | 9/2015 | Wang | G05D 1/102 |
| 9,163,909 | B2 * | 10/2015 | Chengalva | G05D 1/0088 |
| 9,193,452 | B2 * | 11/2015 | Carreker | B64C 27/52 |
| 9,195,959 | B1 * | 11/2015 | Lopez | G06Q 30/0635 |
| 9,216,587 | B2 * | 12/2015 | Ando | B41J 29/38 |
| 9,216,857 | B1 * | 12/2015 | Kalyan | G06Q 10/087 |
| 9,235,213 | B2 * | 1/2016 | Villamar | G06Q 10/087 |
| 9,244,147 | B1 * | 1/2016 | Soundararajan | G06Q 10/0833 |
| 9,256,852 | B1 * | 2/2016 | Myllymaki | B60P 3/007 |
| 9,261,578 | B2 * | 2/2016 | Im | G01S 5/02526 |
| 9,290,277 | B2 * | 3/2016 | You | B64U 50/34 |
| 9,321,531 | B1 * | 4/2016 | Takayama | B64D 47/06 |
| 9,336,635 | B2 * | 5/2016 | Robertson | G07C 9/00571 |
| 9,358,975 | B1 * | 6/2016 | Watts | G05D 1/0223 |
| 9,381,916 | B1 * | 7/2016 | Zhu | B60W 30/0956 |
| 9,387,928 | B1 * | 7/2016 | Gentry | B64U 50/39 |
| 9,397,518 | B1 * | 7/2016 | Theobald | B25J 5/005 |
| 9,404,761 | B2 * | 8/2016 | Meuleau | G01C 21/3453 |
| 9,409,644 | B2 * | 8/2016 | Stanek | G05D 1/0202 |
| 9,411,337 | B1 * | 8/2016 | Theobald | G05D 1/0225 |
| 9,412,280 | B2 * | 8/2016 | Zwillinger | G08G 5/54 |
| 9,421,869 | B1 * | 8/2016 | Ananthanarayanan | |
| | | | | B60L 5/005 |
| 9,436,183 | B2 * | 9/2016 | Thakur | G01C 21/3407 |
| 9,436,926 | B2 * | 9/2016 | Cousins | G05D 1/0246 |
| 9,446,858 | B2 * | 9/2016 | Hess | B64F 3/02 |
| 9,448,559 | B2 * | 9/2016 | Kojo | G01C 21/3685 |
| 9,457,899 | B2 * | 10/2016 | Duffy | B64U 10/16 |
| 9,489,490 | B1 * | 11/2016 | Theobald | G16H 20/13 |
| 9,527,605 | B1 * | 12/2016 | Gentry | G05D 1/0094 |
| 9,535,421 | B1 * | 1/2017 | Canoso | G05D 1/0214 |
| 9,551,989 | B2 * | 1/2017 | Scarlatti | G05D 1/00 |
| 9,561,941 | B1 * | 2/2017 | Watts | G05D 1/0268 |
| 9,563,201 | B1 * | 2/2017 | Tofte | H04N 23/90 |
| 9,568,335 | B2 * | 2/2017 | Thakur | G05D 1/0217 |
| 9,582,950 | B2 * | 2/2017 | Shimizu | G07C 9/28 |
| 9,589,448 | B1 * | 3/2017 | Schneider | F41H 9/10 |
| 9,600,645 | B2 * | 3/2017 | Fadell | H04L 67/12 |
| 9,619,776 | B1 * | 4/2017 | Ford | B64U 80/86 |
| 9,623,562 | B1 * | 4/2017 | Watts | B25J 13/006 |
| 9,643,722 | B1 * | 5/2017 | Myslinski | G05D 1/689 |
| 9,650,136 | B1 * | 5/2017 | Haskin | B64U 10/13 |
| 9,652,912 | B2 * | 5/2017 | Fadell | G06Q 10/08 |
| 9,656,805 | B1 * | 5/2017 | Evans | B64U 80/25 |
| 9,671,791 | B1 * | 6/2017 | Paczan | G08G 5/57 |
| 9,676,481 | B1 * | 6/2017 | Buchmueller | G05D 1/0094 |
| 9,677,564 | B1 * | 6/2017 | Woodworth | B64U 20/30 |
| 9,697,730 | B2 * | 7/2017 | Thakur | G08G 1/0112 |
| 9,718,564 | B1 * | 8/2017 | Beckman | B61L 15/0027 |
| 9,720,414 | B1 * | 8/2017 | Theobald | B25J 5/007 |
| 9,733,646 | B1 * | 8/2017 | Nusser | B65G 57/03 |
| 9,746,852 | B1 * | 8/2017 | Watts | G01S 17/86 |
| 9,746,853 | B2 * | 8/2017 | Scheepjens | G05D 1/0212 |
| 9,777,502 | B2 * | 10/2017 | Curlander | B64F 1/025 |
| 9,778,653 | B1 * | 10/2017 | McClintock | G06Q 10/08 |
| 9,783,075 | B2 * | 10/2017 | Henry | B60L 53/36 |
| 9,783,301 | B2 * | 10/2017 | Schliwa | B64D 11/0007 |
| 9,786,187 | B1 * | 10/2017 | Bar-Zeev | G06Q 10/08355 |
| 9,796,529 | B1 * | 10/2017 | Hoareau | G06Q 10/08 |
| 9,815,633 | B1 * | 11/2017 | Kisser | B65G 37/02 |
| 9,828,092 | B1 * | 11/2017 | Navot | B64U 10/14 |
| 9,858,604 | B2 * | 1/2018 | Apsley | G06Q 30/0635 |
| 9,886,035 | B1 * | 2/2018 | Watts | G05D 1/0088 |
| 9,896,204 | B1 * | 2/2018 | Willison | G05D 1/102 |
| 9,957,045 | B1 * | 5/2018 | Daly | B64U 50/19 |
| 9,959,771 | B1 * | 5/2018 | Carlson | G08G 5/57 |
| 9,974,612 | B2 * | 5/2018 | Pinter | A61B 5/741 |
| 10,022,753 | B2 * | 7/2018 | Chelian | B07C 5/362 |
| 10,048,697 | B1 * | 8/2018 | Theobald | B65G 47/61 |
| 10,099,561 | B1 * | 10/2018 | Ananthanarayanan | |
| | | | | B60L 53/126 |
| 10,099,785 | B1 * | 10/2018 | Gonzalez | B64U 50/31 |
| 10,108,185 | B1 * | 10/2018 | Theobald | G05B 19/4189 |
| 10,137,984 | B1 * | 11/2018 | Flick | B64F 1/00 |
| 10,176,722 | B1 * | 1/2019 | Boyd | G08G 5/57 |
| 10,239,638 | B1 * | 3/2019 | Cohen | B64U 70/50 |
| 10,249,200 | B1 * | 4/2019 | Grenier | G01C 23/005 |
| 10,268,208 | B1 * | 4/2019 | Hopwood Thomas | |
| | | | | G05D 1/0676 |
| 10,287,033 | B2 * | 5/2019 | Hu | B64F 1/02 |
| 10,310,501 | B2 * | 6/2019 | Greenberger | H02J 7/342 |
| 10,434,885 | B2 * | 10/2019 | Antonini | B64C 25/52 |
| 10,467,685 | B1 * | 11/2019 | Brisson | G06Q 10/083 |
| 10,526,094 | B2 * | 1/2020 | Cheng | B64U 80/25 |
| 10,534,372 | B2 | 1/2020 | Fisher et al. | |
| 10,558,226 | B1 * | 2/2020 | Bigdeli | G06V 10/22 |
| 10,577,126 | B2 * | 3/2020 | Mozer | B64F 1/02 |
| 10,719,080 | B2 * | 7/2020 | Zhang | B64F 5/60 |
| 10,745,102 | B2 * | 8/2020 | Nysæter | B64U 30/20 |
| 10,745,132 | B1 * | 8/2020 | Kimchi | B64U 10/13 |
| 10,780,988 | B2 * | 9/2020 | Buchmueller | B64U 50/19 |
| 10,793,268 | B2 | 10/2020 | Wolf-Monheim | |
| 10,807,846 | B1 * | 10/2020 | Vos, Jr. | B66F 7/28 |
| D903,576 | S * | 12/2020 | Feldman | D12/345 |
| 10,860,115 | B1 * | 12/2020 | Tran | G06F 3/0346 |
| 10,870,498 | B2 * | 12/2020 | Zambelli | E01F 3/00 |
| 10,875,648 | B2 * | 12/2020 | Schmalzried | B64C 39/024 |
| 10,899,436 | B2 * | 1/2021 | Gentry | B64C 25/001 |
| 10,967,970 | B2 * | 4/2021 | Van Niekerk | B64U 20/87 |
| 10,988,949 | B2 * | 4/2021 | Puchner | E04G 21/3233 |
| 11,007,290 | B2 * | 5/2021 | Kreitenberg | A61L 2/24 |
| 11,079,752 | B1 * | 8/2021 | Lombardini | B64U 80/60 |
| 11,111,033 | B1 * | 9/2021 | Burks | B64U 50/19 |

(56) References Cited

U.S. PATENT DOCUMENTS

| | | | | |
|---|---|---|---|---|
| D932,369 S * | 10/2021 | Passley | D12/16.1 | |
| 11,148,808 B2 * | 10/2021 | Wiggerich | B64U 30/26 | |
| 11,156,010 B1 * | 10/2021 | Corban | G06Q 10/083 | |
| 11,164,149 B1 * | 11/2021 | Williams | G06K 19/06028 | |
| 11,180,253 B1 * | 11/2021 | Seeley | B64U 60/50 | |
| 11,235,890 B1 * | 2/2022 | Dahlstrom | B05B 13/005 | |
| 11,292,620 B1 * | 4/2022 | Molony | B64G 1/1071 | |
| 11,370,561 B2 * | 6/2022 | Ratajczak | B64C 1/061 | |
| 11,459,117 B1 * | 10/2022 | Shapiro | G08G 5/54 | |
| 11,511,886 B1 * | 11/2022 | Tian | B60P 3/11 | |
| 11,524,596 B2 * | 12/2022 | Cheng | B64U 80/70 | |
| 11,534,801 B2 * | 12/2022 | Volta | B66F 9/063 | |
| 11,572,197 B1 * | 2/2023 | Nevdahs | B64U 50/19 | |
| 11,597,515 B2 * | 3/2023 | Passley | B64F 1/007 | |
| 11,597,516 B1 * | 3/2023 | Klinkmueller | B64U 70/20 | |
| 11,603,218 B2 * | 3/2023 | Fisher | B64F 1/222 | |
| 11,603,219 B2 * | 3/2023 | Ratajczak | B64U 30/20 | |
| 11,619,952 B2 * | 4/2023 | Kwon | G05D 1/0808 | |
| | | | 701/3 | |
| 11,628,932 B2 * | 4/2023 | Seung | B64U 60/50 | |
| | | | 244/17.23 | |
| 11,636,771 B2 * | 4/2023 | Barker | B64F 1/222 | |
| | | | 701/16 | |
| 11,641,966 B2 * | 5/2023 | Nakanishi | A47G 29/124 | |
| | | | 232/44 | |
| 11,649,050 B1 * | 5/2023 | Miller | G05D 1/0808 | |
| | | | 701/11 | |
| 11,655,048 B2 * | 5/2023 | Sugimoto | B64F 1/22 | |
| | | | 244/114 R | |
| 11,667,402 B2 * | 6/2023 | Liske | B64U 80/25 | |
| | | | 244/116 | |
| 11,673,690 B2 * | 6/2023 | Dayan | B64U 70/97 | |
| | | | 244/114 R | |
| 11,710,092 B2 * | 7/2023 | Dearing | G07C 9/00896 | |
| | | | 705/330 | |
| 11,713,136 B2 * | 8/2023 | Foggia | B64F 1/222 | |
| | | | 244/114 R | |
| 11,714,189 B2 * | 8/2023 | Padmanabhan | G01S 19/51 | |
| | | | 342/22 | |
| 11,738,867 B2 * | 8/2023 | Ehasoo | B60L 53/00 | |
| | | | 244/17.11 | |
| 11,741,422 B2 * | 8/2023 | Gil | G06Q 10/08355 | |
| | | | 705/338 | |
| 11,748,688 B2 * | 9/2023 | Ur | B64C 39/024 | |
| | | | 705/332 | |
| 11,760,485 B2 * | 9/2023 | Wabnegger | H02G 1/02 | |
| | | | 244/121 | |
| 11,767,129 B2 * | 9/2023 | Warwick | B64C 39/024 | |
| | | | 244/137.1 | |
| 11,772,814 B2 * | 10/2023 | Dubois | B64U 70/83 | |
| | | | 244/110 E | |
| 11,776,136 B1 * | 10/2023 | Pachikov | B64U 10/13 | |
| | | | 244/17.23 | |
| 11,780,606 B2 * | 10/2023 | Carthew | B64U 70/99 | |
| | | | 244/114 R | |
| 11,794,894 B2 * | 10/2023 | Brock | B64U 30/20 | |
| 11,794,922 B1 * | 10/2023 | Twyford | B64U 80/25 | |
| 11,808,580 B1 * | 11/2023 | Ebrahimi Afrouzi | | |
| | | | G05D 1/0272 | |
| 11,814,191 B2 * | 11/2023 | Cheng | B64F 1/005 | |
| 11,814,241 B2 * | 11/2023 | Tian | B60P 3/11 | |
| D1,008,873 S * | 12/2023 | Lin | D12/16.1 | |
| 11,840,152 B2 * | 12/2023 | Fisher | B64C 29/02 | |
| 11,851,162 B1 * | 12/2023 | Daube | B64C 19/00 | |
| 11,851,209 B2 * | 12/2023 | Fisher | B64F 1/005 | |
| 11,858,662 B2 * | 1/2024 | Gil | B64U 80/00 | |
| 11,866,168 B2 * | 1/2024 | Cooper | B64U 70/97 | |
| 11,868,146 B2 * | 1/2024 | Yasunaga | G05D 1/0094 | |
| 11,884,422 B2 * | 1/2024 | Lowe | B64U 50/19 | |
| 11,898,368 B2 * | 2/2024 | Blake | B64U 80/10 | |
| 11,900,823 B2 * | 2/2024 | Surace | G05D 1/042 | |
| 11,932,315 B2 * | 3/2024 | Hwang | B64F 1/32 | |
| 11,933,613 B2 * | 3/2024 | Michini | G05D 1/689 | |
| 11,939,046 B1 * | 3/2024 | Berry | B64C 27/08 | |
| 11,939,057 B2 * | 3/2024 | Hamm | B64U 20/70 | |
| 11,939,080 B2 * | 3/2024 | Cowden | B64U 80/30 | |
| 11,939,083 B2 * | 3/2024 | Baklycki | B64F 1/36 | |
| 12,032,388 B2 * | 7/2024 | Villiers | G08G 5/74 | |
| 12,043,421 B2 * | 7/2024 | Cevacins | B64U 70/99 | |
| 12,059,089 B1 * | 8/2024 | Dunn | A47G 29/141 | |
| 12,078,912 B2 * | 9/2024 | Valio | G03B 15/03 | |
| 12,084,211 B2 * | 9/2024 | Li | B64U 70/99 | |
| 12,091,194 B2 * | 9/2024 | Wang | B64U 50/37 | |
| 12,099,370 B2 * | 9/2024 | Jourdan | G05D 1/0676 | |
| 12,122,243 B2 * | 10/2024 | Shah | B64U 80/25 | |
| 12,134,329 B2 * | 11/2024 | Todeschini | G05D 1/0202 | |
| 12,168,533 B1 * | 12/2024 | Hinman | B64U 70/97 | |
| 12,172,777 B2 * | 12/2024 | Carthew | B64U 70/93 | |
| 12,195,213 B2 * | 1/2025 | Qi | B64U 70/97 | |
| 12,420,961 B2 | 9/2025 | Jeong et al. | | |
| 2001/0045449 A1 * | 11/2001 | Shannon | G07C 9/21 | |
| | | | 232/19 | |
| 2002/0016726 A1 * | 2/2002 | Ross | G06Q 10/08 | |
| | | | 705/339 | |
| 2002/0035450 A1 * | 3/2002 | Thackston | G05B 19/4099 | |
| | | | 703/1 | |
| 2002/0072979 A1 * | 6/2002 | Sinha | G06Q 10/087 | |
| | | | 705/26.7 | |
| 2002/0087375 A1 * | 7/2002 | Griffin | G06Q 10/0835 | |
| | | | 705/336 | |
| 2002/0107751 A1 * | 8/2002 | Rajagopalan | G06Q 30/0627 | |
| | | | 705/26.7 | |
| 2002/0111914 A1 * | 8/2002 | Terada | G06Q 30/02 | |
| | | | 705/60 | |
| 2002/0116289 A1 * | 8/2002 | Yang | G06Q 10/08 | |
| | | | 705/26.81 | |
| 2002/0123930 A1 * | 9/2002 | Boyd | G06Q 30/0254 | |
| | | | 705/14.1 | |
| 2002/0156645 A1 * | 10/2002 | Hansen | G07F 17/13 | |
| | | | 705/26.1 | |
| 2003/0040980 A1 * | 2/2003 | Nakajima | G07F 17/13 | |
| | | | 705/26.8 | |
| 2003/0072031 A1 * | 4/2003 | Kuwata | H04N 1/00188 | |
| | | | 358/1.15 | |
| 2003/0121968 A1 * | 7/2003 | Miller | G07F 17/13 | |
| | | | 235/375 | |
| 2003/0141411 A1 * | 7/2003 | Pandya | G06Q 10/02 | |
| | | | 244/114 R | |
| 2004/0002898 A1 * | 1/2004 | Kuhlmann | G06Q 30/0635 | |
| | | | 705/26.81 | |
| 2004/0068416 A1 * | 4/2004 | Solomon | G05D 1/0088 | |
| | | | 446/454 | |
| 2004/0112660 A1 * | 6/2004 | Johansson | B63B 27/19 | |
| | | | 180/167 | |
| 2004/0160335 A1 * | 8/2004 | Reitmeier | A47J 31/4407 | |
| | | | 340/4.12 | |
| 2004/0162638 A1 * | 8/2004 | Solomon | G05D 1/0088 | |
| | | | 700/247 | |
| 2004/0256519 A1 * | 12/2004 | Ellis | B64F 1/125 | |
| | | | 244/110 E | |
| 2004/0257199 A1 * | 12/2004 | Fitzgibbon | G07C 9/00182 | |
| | | | 340/5.71 | |
| 2005/0061910 A1 * | 3/2005 | Wobben | B64C 29/00 | |
| | | | 244/17.23 | |
| 2005/0068178 A1 * | 3/2005 | Lee | G06Q 30/06 | |
| | | | 700/214 | |
| 2005/0093865 A1 * | 5/2005 | Jia | H04N 1/38 | |
| | | | 345/426 | |
| 2005/0102240 A1 * | 5/2005 | Misra | G06Q 30/06 | |
| | | | 705/59 | |
| 2005/0178894 A1 * | 8/2005 | McGeer | B64U 70/70 | |
| | | | 244/63 | |
| 2005/0244060 A1 * | 11/2005 | Nagarajan | H04N 1/41 | |
| | | | 382/302 | |
| 2005/0285934 A1 * | 12/2005 | Carter | H04N 7/147 | |
| | | | 348/14.06 | |
| 2006/0038067 A1 * | 2/2006 | Dennis | B64F 1/06 | |
| | | | 244/63 | |

(56) References Cited

U.S. PATENT DOCUMENTS

| | | | | |
|---|---|---|---|---|
| 2006/0053534 | A1* | 3/2006 | Mullen | F41H 7/005 |
| | | | | 2/456 |
| 2006/0118162 | A1* | 6/2006 | Saelzer | H02J 3/38 |
| | | | | 136/246 |
| 2006/0136237 | A1* | 6/2006 | Spiegel | G06Q 10/0835 |
| | | | | 705/13 |
| 2006/0249622 | A1* | 11/2006 | Steele | B64U 80/20 |
| | | | | 244/115 |
| 2006/0287829 | A1* | 12/2006 | Pashko-Paschenko | |
| | | | | G08G 5/723 |
| | | | | 340/436 |
| 2007/0016496 | A1* | 1/2007 | Bar | G06Q 10/087 |
| | | | | 705/28 |
| 2007/0073552 | A1* | 3/2007 | Hileman | G06Q 10/08 |
| | | | | 705/333 |
| 2007/0102565 | A1* | 5/2007 | Speer | B64U 10/20 |
| | | | | 244/2 |
| 2007/0150375 | A1* | 6/2007 | Yang | G06Q 10/08 |
| | | | | 705/26.81 |
| 2007/0170237 | A1* | 7/2007 | Neff | A47G 29/122 |
| | | | | 232/36 |
| 2007/0176432 | A1* | 8/2007 | Rolt | F03D 9/255 |
| | | | | 290/55 |
| 2007/0210953 | A1* | 9/2007 | Abraham | G08G 5/57 |
| | | | | 342/36 |
| 2007/0233337 | A1* | 10/2007 | Plishner | G05D 1/0295 |
| | | | | 701/23 |
| 2007/0244763 | A1* | 10/2007 | Williams | G06Q 10/10 |
| | | | | 705/26.1 |
| 2007/0246601 | A1* | 10/2007 | Layton | B64C 39/10 |
| | | | | 244/12.2 |
| 2007/0262195 | A1* | 11/2007 | Bulaga | B64U 10/20 |
| | | | | 244/12.4 |
| 2007/0293978 | A1* | 12/2007 | Wurman | G05B 19/4189 |
| | | | | 700/213 |
| 2008/0012697 | A1* | 1/2008 | Smith | B60K 35/50 |
| | | | | 340/439 |
| 2008/0027591 | A1* | 1/2008 | Lenser | G05D 1/0038 |
| | | | | 701/28 |
| 2008/0100258 | A1* | 5/2008 | Ward | H01M 10/465 |
| | | | | 320/101 |
| 2008/0109246 | A1* | 5/2008 | Russell | G06Q 10/04 |
| | | | | 414/800 |
| 2008/0111816 | A1* | 5/2008 | Abraham | G06Q 30/06 |
| | | | | 345/420 |
| 2008/0141921 | A1* | 6/2008 | Hinderks | F01L 3/22 |
| | | | | 114/274 |
| 2008/0150679 | A1* | 6/2008 | Bloomfield | B60R 25/24 |
| | | | | 340/5.72 |
| 2008/0154659 | A1* | 6/2008 | Bettes | G06Q 10/08 |
| | | | | 705/7.36 |
| 2008/0167817 | A1* | 7/2008 | Hessler | G01C 21/005 |
| | | | | 701/514 |
| 2008/0184906 | A1* | 8/2008 | Kejha | B64D 27/33 |
| | | | | 102/374 |
| 2008/0189012 | A1* | 8/2008 | Kaufmann | B62D 15/025 |
| | | | | 701/41 |
| 2008/0217486 | A1* | 9/2008 | Colten | B64U 10/25 |
| | | | | 244/45 R |
| 2008/0301009 | A1* | 12/2008 | Plaster | G06Q 10/087 |
| | | | | 705/28 |
| 2009/0027253 | A1* | 1/2009 | van Tooren | G08G 5/59 |
| | | | | 342/29 |
| 2009/0057486 | A1* | 3/2009 | Becht, IV | B64F 1/007 |
| | | | | 244/114 R |
| 2009/0062974 | A1* | 3/2009 | Tamamoto | G05D 1/0295 |
| | | | | 701/25 |
| 2009/0063166 | A1* | 3/2009 | Palmer | B65D 19/42 |
| | | | | 211/133.4 |
| 2009/0079388 | A1* | 3/2009 | Reddy | G06Q 40/12 |
| | | | | 320/109 |
| 2009/0086275 | A1* | 4/2009 | Liang | G06V 10/25 |
| | | | | 358/3.21 |
| 2009/0091435 | A1* | 4/2009 | Bolourchi | B60K 28/066 |
| | | | | 340/575 |
| 2009/0106124 | A1* | 4/2009 | Yang | G06Q 30/0601 |
| | | | | 705/26.1 |
| 2009/0149985 | A1* | 6/2009 | Chirnomas | G07F 11/26 |
| | | | | 705/26.1 |
| 2009/0164379 | A1* | 6/2009 | Jung | G06Q 10/06 |
| | | | | 705/310 |
| 2009/0165127 | A1* | 6/2009 | Jung | G06Q 10/06 |
| | | | | 726/21 |
| 2009/0216394 | A1* | 8/2009 | Heppe | B64U 20/87 |
| | | | | 701/16 |
| 2009/0236470 | A1* | 9/2009 | Goossen | B64U 70/80 |
| | | | | 244/115 |
| 2009/0254457 | A1* | 10/2009 | Folsom | G06Q 30/0601 |
| | | | | 705/26.1 |
| 2009/0254482 | A1* | 10/2009 | Vadlamani | G06F 21/10 |
| | | | | 705/59 |
| 2009/0299903 | A1* | 12/2009 | Hung | G06Q 20/40 |
| | | | | 235/462.11 |
| 2009/0303507 | A1* | 12/2009 | Abeloe | B33Y 30/00 |
| | | | | 358/1.9 |
| 2009/0314883 | A1* | 12/2009 | Arlton | B64U 80/40 |
| | | | | 244/63 |
| 2010/0007479 | A1* | 1/2010 | Smith | B60W 50/14 |
| | | | | 340/576 |
| 2010/0030608 | A1* | 2/2010 | Kaminsky | G06Q 10/10 |
| | | | | 707/E17.014 |
| 2010/0031351 | A1* | 2/2010 | Jung | G06F 21/10 |
| | | | | 700/98 |
| 2010/0038480 | A1* | 2/2010 | Wu | B64F 1/26 |
| | | | | 244/114 B |
| 2010/0088163 | A1* | 4/2010 | Davidson | G06Q 10/08 |
| | | | | 340/425.5 |
| 2010/0088175 | A1* | 4/2010 | Lundquist | G06Q 30/0234 |
| | | | | 705/26.1 |
| 2010/0100269 | A1* | 4/2010 | Ekhaguere | G08G 5/74 |
| | | | | 701/26 |
| 2010/0169185 | A1* | 7/2010 | Cottingham | G06F 3/01 |
| | | | | 715/708 |
| 2010/0170993 | A1* | 7/2010 | Misegades | B64C 7/00 |
| | | | | 244/130 |
| 2010/0206145 | A1* | 8/2010 | Tetelbaum | B27G 19/02 |
| | | | | 83/13 |
| 2010/0287065 | A1* | 11/2010 | Alivandi | G06Q 30/02 |
| | | | | 705/26.1 |
| 2010/0299067 | A1* | 11/2010 | McCollough | G08G 5/51 |
| | | | | 701/301 |
| 2010/0299222 | A1* | 11/2010 | Hamilton, IV | G06Q 20/12 |
| | | | | 705/26.1 |
| 2010/0320313 | A1* | 12/2010 | Hanafin | B64F 1/125 |
| | | | | 244/114 R |
| 2011/0035149 | A1* | 2/2011 | McAndrew | G05D 1/0077 |
| | | | | 701/466 |
| 2011/0068224 | A1* | 3/2011 | Kang | B64U 80/25 |
| | | | | 244/116 |
| 2011/0074570 | A1* | 3/2011 | Feldstein | G08B 13/196 |
| | | | | 348/E7.087 |
| 2011/0087350 | A1* | 4/2011 | Fogel | G06T 19/00 |
| | | | | 700/98 |
| 2011/0112761 | A1* | 5/2011 | Hurley | G06Q 10/08 |
| | | | | 701/465 |
| 2011/0153052 | A1* | 6/2011 | Pettibone | G06F 30/13 |
| | | | | 700/98 |
| 2011/0166707 | A1* | 7/2011 | Romanov | G01S 5/16 |
| | | | | 700/255 |
| 2011/0174925 | A1* | 7/2011 | Ying | B64F 1/005 |
| | | | | 701/16 |
| 2011/0178711 | A1* | 7/2011 | Christoph | G01S 7/51 |
| | | | | 701/301 |
| 2011/0210866 | A1* | 9/2011 | David | G08G 1/166 |
| | | | | 340/901 |
| 2011/0227435 | A1* | 9/2011 | Maeda | B60L 50/16 |
| | | | | 310/77 |

(56)                References Cited

U.S. PATENT DOCUMENTS

| | | | | |
|---|---|---|---|---|
| 2011/0246331 A1* | 10/2011 | Luther | G06Q 30/0627 | 705/26.63 |
| 2011/0253831 A1* | 10/2011 | Cheng | A63H 27/12 | 244/17.11 |
| 2011/0264311 A1* | 10/2011 | Lee | H04N 7/183 | 348/E7.085 |
| 2011/0282476 A1* | 11/2011 | Hegemier | G06Q 30/0621 | 705/26.5 |
| 2011/0301787 A1* | 12/2011 | Chaperon | A63H 27/12 | 701/2 |
| 2011/0313878 A1* | 12/2011 | Norman | G06F 30/12 | 705/26.5 |
| 2012/0039694 A1* | 2/2012 | Suzanne | E04H 5/02 | 414/339 |
| 2012/0078592 A1* | 3/2012 | Sims, Jr. | G06F 30/00 | 703/1 |
| 2012/0080556 A1* | 4/2012 | Root, Jr. | B64F 1/06 | 73/170.28 |
| 2012/0091260 A1* | 4/2012 | Callou | G05D 1/0858 | 244/17.13 |
| 2012/0109419 A1* | 5/2012 | Mercado | G07C 9/00182 | 701/2 |
| 2012/0219397 A1* | 8/2012 | Baker | B65G 1/1373 | 414/796 |
| 2012/0221438 A1* | 8/2012 | Cook, Jr. | G06Q 30/0641 | 705/26.61 |
| 2012/0227389 A1* | 9/2012 | Hinderks | F02B 75/002 | 60/317 |
| 2012/0229325 A1* | 9/2012 | Dutruc | G01S 7/03 | 342/29 |
| 2012/0234969 A1* | 9/2012 | Savoye | B64U 10/13 | 244/17.11 |
| 2012/0235606 A1* | 9/2012 | Takeuchi | H02K 7/116 | 318/371 |
| 2012/0323365 A1* | 12/2012 | Taylor | G05D 1/0225 | 901/1 |
| 2013/0006739 A1* | 1/2013 | Horvitz | G06Q 30/0222 | 705/14.23 |
| 2013/0073477 A1* | 3/2013 | Grinberg | G06Q 30/00 | 705/332 |
| 2013/0081245 A1* | 4/2013 | Vavrina | B60L 53/51 | 29/281.1 |
| 2013/0093582 A1* | 4/2013 | Walsh | G08G 1/166 | 340/436 |
| 2013/0099054 A1* | 4/2013 | Besenzoni | B64F 1/007 | 244/110 E |
| 2013/0126611 A1* | 5/2013 | Kangas | G06K 7/10178 | 235/385 |
| 2013/0148123 A1* | 6/2013 | Hayashi | G03F 9/7046 | 356/401 |
| 2013/0193269 A1* | 8/2013 | Zwaan | B64U 20/87 | 244/118.1 |
| 2013/0206915 A1* | 8/2013 | Desaulniers | B64U 10/20 | 244/165 |
| 2013/0218446 A1* | 8/2013 | Bradley | G06Q 10/00 | 701/123 |
| 2013/0218799 A1* | 8/2013 | Lehmann | G06Q 10/063 | 705/337 |
| 2013/0233964 A1* | 9/2013 | Woodworth | B64U 10/60 | 244/175 |
| 2013/0261792 A1* | 10/2013 | Gupta | G05B 15/02 | 700/232 |
| 2013/0262252 A1* | 10/2013 | Lakshman | G06Q 30/06 | 705/26.1 |
| 2013/0262276 A1* | 10/2013 | Wan | G06Q 10/00 | 705/28 |
| 2013/0262336 A1* | 10/2013 | Wan | G06Q 10/087 | 705/339 |
| 2013/0264381 A1* | 10/2013 | Kim | G07F 17/13 | 232/24 |
| 2013/0320133 A1* | 12/2013 | Ratti | B64C 33/025 | 244/22 |
| 2013/0324164 A1* | 12/2013 | Vulcano | H04W 4/02 | 455/457 |
| 2013/0332062 A1* | 12/2013 | Kreitmair-Steck | G08G 5/80 | 701/301 |
| 2013/0344778 A1* | 12/2013 | Schafer | B24B 41/02 | 451/294 |
| 2014/0010656 A1* | 1/2014 | Nies | F03D 7/0244 | 29/889 |
| 2014/0025230 A1* | 1/2014 | Levien | A63H 27/12 | 701/2 |
| 2014/0030444 A1* | 1/2014 | Swaminathan | C23C 16/48 | 427/569 |
| 2014/0031964 A1* | 1/2014 | Sidhu | G05B 19/41865 | 700/99 |
| 2014/0032034 A1* | 1/2014 | Raptopoulos | G08G 5/55 | 701/25 |
| 2014/0040065 A1* | 2/2014 | DuBois | G06Q 30/0621 | 705/26.5 |
| 2014/0052661 A1* | 2/2014 | Shakes | G06Q 10/0836 | 705/339 |
| 2014/0058959 A1* | 2/2014 | Isbjornssund | G06Q 50/184 | 705/310 |
| 2014/0081445 A1* | 3/2014 | Villamar | G06Q 10/087 | 701/19 |
| 2014/0089073 A1* | 3/2014 | Jacobs | G06Q 20/326 | 705/16 |
| 2014/0124619 A1* | 5/2014 | McGeer | B64U 70/70 | 244/110 F |
| 2014/0124621 A1* | 5/2014 | Godzdanker | B64F 1/125 | 244/110 E |
| 2014/0136282 A1* | 5/2014 | Fedele | G06Q 10/06 | 705/7.31 |
| 2014/0136414 A1* | 5/2014 | Abhyanker | G06Q 20/3224 | 701/25 |
| 2014/0149244 A1* | 5/2014 | Abhyanker | G06Q 30/0605 | 705/26.2 |
| 2014/0156053 A1* | 6/2014 | Mahdavi | B29C 64/112 | 700/119 |
| 2014/0180914 A1* | 6/2014 | Abhyanker | G06Q 10/0832 | 705/332 |
| 2014/0200697 A1* | 7/2014 | Cheng | G06Q 30/06 | 700/98 |
| 2014/0214684 A1* | 7/2014 | Pell | G06Q 30/02 | 705/57 |
| 2014/0240313 A1* | 8/2014 | Varga | H04N 13/383 | 345/419 |
| 2014/0244433 A1* | 8/2014 | Cruz | G06T 7/001 | 705/26.8 |
| 2014/0254896 A1* | 9/2014 | Zhou | G06Q 20/3829 | 705/16 |
| 2014/0257595 A1* | 9/2014 | Tillmann | B64U 10/14 | 701/2 |
| 2014/0271200 A1* | 9/2014 | Sutton | B64C 27/33 | 29/889 |
| 2014/0273865 A1* | 9/2014 | Skarda | H01Q 1/084 | 455/66.1 |
| 2014/0283104 A1* | 9/2014 | Nilsson | H04N 1/32117 | 726/26 |
| 2014/0309813 A1* | 10/2014 | Ricci | G06V 20/59 | 701/1 |
| 2014/0319272 A1* | 10/2014 | Casado Magana | B60L 58/10 | 244/110 E |
| 2014/0325218 A1* | 10/2014 | Shimizu | H04L 12/10 | 713/168 |
| 2014/0330456 A1* | 11/2014 | Lopez Morales | G06Q 10/087 | 701/3 |
| 2015/0006005 A1* | 1/2015 | Yu | G05D 1/667 | 701/22 |
| 2015/0066178 A1* | 3/2015 | Stava | B22F 10/47 | 700/98 |
| 2015/0069968 A1* | 3/2015 | Pounds | B60L 53/35 | 320/109 |
| 2015/0097530 A1* | 4/2015 | Scarlatti | H02J 7/00 | 320/109 |
| 2015/0098819 A1* | 4/2015 | Tourin | G01M 5/0091 | 416/61 |

(56) References Cited

U.S. PATENT DOCUMENTS

2015/0102154 A1* 4/2015 Duncan ............... G05D 1/0094
                                                701/300
2015/0112837 A1* 4/2015 O'Dea .................. G06Q 20/24
                                                705/26.41
2015/0112885 A1* 4/2015 Fadell ................. G08B 29/185
                                                705/330
2015/0120094 A1* 4/2015 Kimchi .................. B64U 10/14
                                                701/3
2015/0120602 A1* 4/2015 Huffman .............. G06Q 10/083
                                                700/214
2015/0123462 A1* 5/2015 Kamradt ................. B67D 7/02
                                                141/192
2015/0127712 A1* 5/2015 Fadell ............... H04L 12/2807
                                                709/202
2015/0129716 A1* 5/2015 Yoffe ...................... B64F 1/029
                                                244/110 C
2015/0148855 A1* 5/2015 Szakelyhidi ......... H01Q 1/2208
                                                343/702
2015/0158587 A1* 6/2015 Patrick .................... B64D 1/22
                                                701/3
2015/0158599 A1* 6/2015 Sisko ........................ B64F 1/20
                                                244/114 R
2015/0167262 A1* 6/2015 Gartner .................... E01F 7/02
                                                256/12.5
2015/0175276 A1* 6/2015 Koster .................. A47G 29/14
                                                244/114 R
2015/0183528 A1* 7/2015 Walsh .................. B64C 39/024
                                                244/114 R
2015/0185034 A1* 7/2015 Abhyanker ......... G05D 1/0088
                                                701/23
2015/0191255 A1* 7/2015 Zolich ...................... B64F 1/16
                                                340/946
2015/0202770 A1* 7/2015 Patron ................... G06Q 50/01
                                                901/50
2015/0217860 A1* 8/2015 Yang ...................... B64C 25/32
                                                244/102 R
2015/0227882 A1* 8/2015 Bhatt .................. G06Q 10/083
                                                705/330
2015/0246727 A1* 9/2015 Masticola ............ G08B 29/145
                                                701/2
2015/0253777 A1* 9/2015 Binney ................ G05D 1/0214
                                                701/28
2015/0254611 A1* 9/2015 Perez .............. G06Q 10/08355
                                                705/5
2015/0259078 A1* 9/2015 Filipovic ................. H04W 4/38
                                                244/114 R
2015/0286216 A1* 10/2015 Miwa ................... G05D 1/0808
                                                701/4
2015/0314881 A1* 11/2015 Tsaliah ................. B64D 17/725
                                                244/146
2015/0317597 A1* 11/2015 Shucker ............. G06Q 10/0833
                                                235/375
2015/0332206 A1* 11/2015 Trew .................... G06Q 10/083
                                                705/330
2015/0336669 A1* 11/2015 Kantor ................. G01C 21/343
                                                701/3
2015/0336670 A1* 11/2015 Zhang .................... B29C 43/18
                                                244/119
2015/0336677 A1* 11/2015 Smaoui ................. H01R 24/38
                                                320/109
2015/0363843 A1* 12/2015 Loppatto ............ G06Q 30/0283
                                                705/330
2015/0367850 A1* 12/2015 Clarke ................... H04N 23/90
                                                701/28
2015/0370251 A1* 12/2015 Siegel ...................... B64D 1/22
                                                701/2
2016/0001877 A1* 1/2016 Paulos ................. B64U 30/29
                                                701/3
2016/0001883 A1* 1/2016 Sanz ...................... B64U 10/13
                                                244/17.23
2016/0003637 A1* 1/2016 Andersen ............. G01C 21/362
                                                701/519

2016/0009413 A1* 1/2016 Lee .......................... G08G 5/57
                                                701/16
2016/0011592 A1* 1/2016 Zhang ................... B64U 70/97
                                                244/114 R
2016/0019495 A1* 1/2016 Kolchin ............ G06Q 10/0833
                                                705/333
2016/0023761 A1* 1/2016 McNally ............. G05D 1/0094
                                                701/3
2016/0033966 A1* 2/2016 Farris ..................... G01C 21/20
                                                701/16
2016/0039541 A1* 2/2016 Beardsley ........... G05D 1/0011
                                                701/2
2016/0051110 A1* 2/2016 Cao .......................... A47L 9/009
                                                15/324
2016/0058181 A1* 3/2016 Han ..................... H04N 23/661
                                                312/236
2016/0068264 A1* 3/2016 Ganesh ................... G08G 5/55
                                                701/4
2016/0068265 A1* 3/2016 Hoareau ............... G06Q 10/08
                                                701/3
2016/0068267 A1* 3/2016 Liu ....................... G05D 1/042
                                                701/4
2016/0070265 A1* 3/2016 Liu ...................... B64C 39/024
                                                701/25
2016/0085238 A1* 3/2016 Hayes ..................... G08G 5/22
                                                701/4
2016/0101856 A1* 4/2016 Kohstall ............. G05D 1/0669
                                                244/17.23
2016/0104099 A1* 4/2016 Villamar ............... G06Q 10/08
                                                705/26.81
2016/0104113 A1* 4/2016 Gorlin ............. G06Q 10/08355
                                                705/338
2016/0107750 A1* 4/2016 Yates ................... B64U 10/25
                                                244/2
2016/0114488 A1* 4/2016 Mascorro Medina ......................
                                                B25J 9/1697
                                                901/1
2016/0117931 A1* 4/2016 Chan ...................... G08G 5/56
                                                701/120
2016/0125746 A1* 5/2016 Kunzi ..................... G08G 5/55
                                                701/11
2016/0129592 A1* 5/2016 Saboo ..................... B25J 5/007
                                                700/248
2016/0130000 A1* 5/2016 Rimanelli ............. B64U 20/50
                                                244/2
2016/0130015 A1* 5/2016 Caubel ................. B64C 27/001
                                                244/120
2016/0131025 A1* 5/2016 Pekrul ..................... F02B 53/10
                                                123/205
2016/0131358 A1* 5/2016 Spiro ................... H05B 47/105
                                                455/561
2016/0132059 A1* 5/2016 Mason ................. B65G 1/1373
                                                701/28
2016/0144734 A1* 5/2016 Wang ................. B64C 29/0016
                                                701/17
2016/0144982 A1* 5/2016 Sugumaran ............. B64C 25/32
                                                244/108
2016/0180618 A1* 6/2016 Ho ...................... G07C 9/00563
                                                340/5.52
2016/0185466 A1* 6/2016 Dreano, Jr. .......... G06Q 10/083
                                                705/26.81
2016/0194959 A1* 7/2016 Pekrul .................... F01C 19/06
                                                418/146
2016/0196755 A1* 7/2016 Navot ................. G05D 1/0088
                                                701/4
2016/0196756 A1* 7/2016 Prakash ................. B64U 80/25
                                                701/3
2016/0200438 A1* 7/2016 Bokeno ................. B64C 39/024
                                                244/2
2016/0207627 A1* 7/2016 Hoareau ................. B64D 1/02
2016/0214717 A1* 7/2016 De Silva ................ B64D 5/00
2016/0214728 A1* 7/2016 Rossi ................... B64U 30/291
2016/0221671 A1* 8/2016 Fisher ................... B64U 30/26
2016/0229299 A1* 8/2016 Streett ................... B64F 1/222
2016/0229530 A1* 8/2016 Welsh ................... B64U 30/24
2016/0235236 A1* 8/2016 Byers ................... A47G 29/14

(56) References Cited

U.S. PATENT DOCUMENTS

| | | | |
|---|---|---|---|
| 2016/0239789 A1* | 8/2016 | Hanks | G06Q 30/04 |
| 2016/0239803 A1* | 8/2016 | Borley | G06Q 10/08355 |
| 2016/0244162 A1* | 8/2016 | Weller | B64U 10/13 |
| 2016/0244187 A1* | 8/2016 | Byers | A47G 29/14 |
| 2016/0257401 A1* | 9/2016 | Buchmueller | G01C 21/343 |
| 2016/0257423 A1* | 9/2016 | Martin | A47G 29/14 |
| 2016/0257424 A1* | 9/2016 | Stabler | A63H 27/12 |
| 2016/0257426 A1* | 9/2016 | Mozer | B64U 70/30 |
| 2016/0258775 A1* | 9/2016 | Santilli | G06Q 10/0833 |
| 2016/0266578 A1* | 9/2016 | Douglas | G05D 1/0282 |
| 2016/0272317 A1* | 9/2016 | Cho | G08G 1/162 |
| 2016/0280371 A1* | 9/2016 | Canavor | H04W 4/029 |
| 2016/0282126 A1* | 9/2016 | Watts | G06Q 10/08 |
| 2016/0286128 A1* | 9/2016 | Zhou | H04N 23/698 |
| 2016/0291445 A1* | 10/2016 | Fisher, Sr. | F16M 11/10 |
| 2016/0299233 A1* | 10/2016 | Levien | G08G 5/53 |
| 2016/0304198 A1* | 10/2016 | Jourdan | G08G 5/57 |
| 2016/0304217 A1* | 10/2016 | Fisher | B64F 1/222 |
| 2016/0307448 A1* | 10/2016 | Salnikov | A01C 21/00 |
| 2016/0311329 A1* | 10/2016 | Rodriguez | B60L 58/18 |
| 2016/0321503 A1* | 11/2016 | Zhou | B64U 50/38 |
| 2016/0334229 A1* | 11/2016 | Ross | G08B 25/00 |
| 2016/0340006 A1* | 11/2016 | Tang | B63C 9/01 |
| 2016/0340021 A1* | 11/2016 | Zhang | B64C 27/006 |
| 2016/0355261 A1* | 12/2016 | Chin | B64U 70/20 |
| 2016/0364660 A1* | 12/2016 | Brown | G01C 21/20 |
| 2016/0364679 A1* | 12/2016 | Cao | G06Q 10/083 |
| 2016/0364823 A1* | 12/2016 | Cao | G06Q 50/40 |
| 2016/0364989 A1* | 12/2016 | Speasl | G08G 5/57 |
| 2016/0371984 A1* | 12/2016 | Macfarlane | G05D 1/106 |
| 2016/0378108 A1* | 12/2016 | Paczan | G06Q 10/083 |
| | | | 705/330 |
| 2017/0011333 A1* | 1/2017 | Greiner | G06K 7/10722 |
| 2017/0011340 A1* | 1/2017 | Gabbai | G05D 1/667 |
| 2017/0015415 A1* | 1/2017 | Chan | G06Q 30/04 |
| 2017/0021923 A1* | 1/2017 | Fisher | B64U 70/97 |
| 2017/0021941 A1* | 1/2017 | Fisher | G05D 1/0011 |
| 2017/0021942 A1* | 1/2017 | Fisher | B64U 70/80 |
| 2017/0023949 A1* | 1/2017 | Fisher | G08G 5/55 |
| 2017/0032315 A1* | 2/2017 | Gupta | G06Q 10/08 |
| 2017/0050749 A1* | 2/2017 | Pilskalns | G05D 1/0676 |
| 2017/0073085 A1* | 3/2017 | Tremblay | B64F 1/007 |
| 2017/0081043 A1* | 3/2017 | Jones | B64C 37/02 |
| 2017/0087999 A1* | 3/2017 | Miller | G01C 21/3679 |
| 2017/0096222 A1* | 4/2017 | Spinelli | B64U 80/25 |
| 2017/0100837 A1* | 4/2017 | Zevenbergen | G05D 1/0225 |
| 2017/0113352 A1* | 4/2017 | Lutz | B25J 9/1682 |
| 2017/0117676 A1* | 4/2017 | James | B64U 80/70 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0137150 A1* | 5/2017 | Conyers | B60K 1/02 |
| 2017/0144776 A1* | 5/2017 | Fisher | B64C 39/024 |
| 2017/0147975 A1* | 5/2017 | Natarajan | G06Q 10/0832 |
| 2017/0152060 A1* | 6/2017 | Morisawa | B64U 50/23 |
| 2017/0154347 A1* | 6/2017 | Bateman | G06Q 10/067 |
| 2017/0158352 A1* | 6/2017 | von Flotow | B64F 1/0295 |
| 2017/0158353 A1* | 6/2017 | Schmick | B60L 53/12 |
| 2017/0166327 A1* | 6/2017 | Schmidt | B64F 1/007 |
| 2017/0167881 A1* | 6/2017 | Rander | B60W 60/0016 |
| 2017/0174335 A1* | 6/2017 | Malloy | B64D 35/021 |
| 2017/0190443 A1* | 7/2017 | Fisher | B64F 1/005 |
| 2017/0193442 A1* | 7/2017 | Ekkel | G06Q 10/083 |
| 2017/0199522 A1* | 7/2017 | Li | G07C 5/0866 |
| 2017/0203632 A1* | 7/2017 | Westendarp | B60H 1/00378 |
| 2017/0203857 A1* | 7/2017 | O'Toole | A47G 29/141 |
| 2017/0225782 A1* | 8/2017 | Kohstall | B64U 30/26 |
| 2017/0225783 A1* | 8/2017 | Fisher | B64U 20/87 |
| 2017/0225799 A1* | 8/2017 | Selwyn | B64F 1/005 |
| 2017/0225801 A1* | 8/2017 | Bennett | B64U 70/90 |
| 2017/0225802 A1* | 8/2017 | Lussier | B64U 10/20 |
| 2017/0240291 A1* | 8/2017 | Kim | H01M 16/006 |
| 2017/0247120 A1* | 8/2017 | Miller | B64U 80/25 |
| 2017/0248948 A1* | 8/2017 | Otani | H04N 23/685 |
| 2017/0253349 A1* | 9/2017 | Wang | B64U 70/97 |
| 2017/0255896 A1* | 9/2017 | Van Dyke | G06Q 10/0835 |
| 2017/0270314 A1* | 9/2017 | Tsybrovskyy | H04W 12/06 |
| 2017/0275025 A1* | 9/2017 | Johnson | B64F 1/12 |
| 2017/0279640 A1* | 9/2017 | Yang | H04L 1/0003 |
| 2017/0283090 A1* | 10/2017 | Miller | B64U 70/97 |
| 2017/0286905 A1* | 10/2017 | Richardson | G06Q 10/0836 |
| 2017/0300855 A1* | 10/2017 | Lund | B64F 5/10 |
| 2017/0305526 A1* | 10/2017 | Thomassey | B64C 27/26 |
| 2017/0305575 A1* | 10/2017 | Bash | B64F 1/32 |
| 2017/0308850 A1* | 10/2017 | Roush | G01C 21/343 |
| 2017/0309088 A1* | 10/2017 | Arya | H04L 67/568 |
| 2017/0313421 A1* | 11/2017 | Gil | B64D 45/04 |
| 2017/0316379 A1* | 11/2017 | Lepek | G06Q 10/047 |
| 2017/0316701 A1* | 11/2017 | Gil | G06Q 10/0832 |
| 2017/0323129 A1* | 11/2017 | Davidson | G05D 1/0234 |
| 2017/0327091 A1* | 11/2017 | Capizzo | B60L 53/68 |
| 2017/0330145 A1* | 11/2017 | Studnicka | G07C 9/00896 |
| 2017/0341769 A1* | 11/2017 | Haberbusch | F17C 5/007 |
| 2017/0345245 A1* | 11/2017 | Torresani | H04W 4/80 |
| 2017/0372256 A1* | 12/2017 | Kantor | G08G 5/34 |
| 2018/0024554 A1* | 1/2018 | Brady | G06Q 10/0833 |
| | | | 701/23 |
| 2018/0039286 A1* | 2/2018 | Tirpak | G05D 1/042 |
| 2018/0053139 A1* | 2/2018 | Stoman | B64U 10/13 |
| 2018/0056794 A1* | 3/2018 | Kim | B60L 53/126 |
| 2018/0088586 A1* | 3/2018 | Hance | G05D 1/0236 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/262 |
| 2018/0105271 A1* | 4/2018 | Wypyszynski | B64U 10/13 |
| 2018/0105289 A1* | 4/2018 | Walsh | G06Q 10/1097 |
| 2018/0118340 A1* | 5/2018 | Russo | B64U 50/37 |
| 2018/0118374 A1* | 5/2018 | Lombardini | B64F 3/02 |
| 2018/0124326 A1* | 5/2018 | Irie | G03B 17/00 |
| 2018/0127211 A1* | 5/2018 | Jarvis | G05D 1/0285 |
| 2018/0137454 A1* | 5/2018 | Kulkarni | G05D 1/021 |
| 2018/0141682 A1* | 5/2018 | Blake | B64U 70/97 |
| 2018/0194484 A1* | 7/2018 | Livieratos | B64U 10/13 |
| 2018/0196418 A1* | 7/2018 | Meier | G05D 1/0206 |
| 2018/0208070 A1* | 7/2018 | Sanchez | B64U 10/13 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0257775 A1* | 9/2018 | Baek | B64U 30/26 |
| 2018/0265196 A1* | 9/2018 | Phillips | B64F 1/20 |
| 2018/0265295 A1* | 9/2018 | Beckman | G08G 5/57 |
| 2018/0265296 A1* | 9/2018 | Beckman | B64U 70/90 |
| 2018/0295327 A1* | 10/2018 | Yearwood | G06V 20/62 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0354649 A1* | 12/2018 | Ortiz | G08B 13/1436 |
| 2018/0357910 A1* | 12/2018 | Hobbs | G08G 5/54 |
| 2018/0360326 A1* | 12/2018 | Lee | G06F 3/0346 |
| 2018/0364740 A1* | 12/2018 | Collins | G05D 1/0088 |
| 2018/0370618 A1* | 12/2018 | Harris | B64C 25/24 |
| 2018/0370652 A1* | 12/2018 | Vendrame | B64F 1/007 |
| 2019/0002128 A1* | 1/2019 | Raz | B64U 70/99 |
| 2019/0009926 A1* | 1/2019 | Hu | B64U 70/99 |
| 2019/0016476 A1* | 1/2019 | Scherz | H02J 7/00 |
| 2019/0023133 A1* | 1/2019 | Renold | B60L 53/35 |
| 2019/0023416 A1* | 1/2019 | Borko | G06F 3/041 |
| 2019/0028904 A1* | 1/2019 | Carpenter | G08G 5/76 |
| 2019/0047462 A1* | 2/2019 | Vijayaraghavan | B60W 30/00 |
| 2019/0051192 A1* | 2/2019 | Schick | G08G 5/80 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0100330 A1* | 4/2019 | Cheng | B64U 80/25 |
| 2019/0106224 A1* | 4/2019 | Nishikawa | B64U 50/37 |
| 2019/0108472 A1* | 4/2019 | Sweeney | B64U 70/90 |
| 2019/0127083 A1* | 5/2019 | Di Benedetto | B64D 47/06 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | H04L 67/55 |
| 2019/0172358 A1* | 6/2019 | Zhou | G06V 20/17 |
| 2019/0193952 A1* | 6/2019 | Zevenbergen | B60L 53/12 |

(56) References Cited

U.S. PATENT DOCUMENTS

| | | | | |
|---|---|---|---|---|
| 2019/0217952 A1* | 7/2019 | Zawadzki | B64D 1/02 | |
| 2019/0217968 A1* | 7/2019 | Schmidt | B64F 1/007 | |
| 2019/0233103 A1* | 8/2019 | High | A47G 29/141 | |
| 2019/0233107 A1* | 8/2019 | Tian | B64C 39/12 | |
| 2019/0245365 A1* | 8/2019 | Farrahi Moghaddam | | |
| | | | B64U 10/14 | |
| 2019/0256201 A1* | 8/2019 | Plekhanov | B64U 20/40 | |
| 2019/0256202 A1* | 8/2019 | Resnick | B64U 10/13 | |
| 2019/0256207 A1* | 8/2019 | Nohmi | G05D 1/0866 | |
| 2019/0258910 A1* | 8/2019 | Stoman | G06K 19/06028 | |
| 2019/0263519 A1* | 8/2019 | Argus | B64D 31/06 | |
| 2019/0270526 A1* | 9/2019 | Hehn | B60L 53/18 | |
| 2019/0283871 A1* | 9/2019 | Wieczorek | B64U 10/60 | |
| 2019/0291961 A1* | 9/2019 | Urban | G06Q 50/40 | |
| 2019/0308724 A1* | 10/2019 | Cooper | B64U 80/25 | |
| 2019/0315235 A1* | 10/2019 | Kung | B60L 53/36 | |
| 2019/0315463 A1* | 10/2019 | Chen | F24H 15/25 | |
| 2019/0337407 A1* | 11/2019 | Wang | B60L 53/31 | |
| 2019/0348862 A1* | 11/2019 | Obayashi | B64U 30/21 | |
| 2019/0375504 A1* | 12/2019 | Schmalzried | B64U 10/13 | |
| 2019/0382134 A1* | 12/2019 | Baklycki | B64F 1/36 | |
| 2019/0383052 A1* | 12/2019 | Blake | B60L 53/30 | |
| 2020/0003529 A1* | 1/2020 | Benezra | B64U 80/70 | |
| 2020/0010214 A1* | 1/2020 | Newcomb | B60L 53/51 | |
| 2020/0017218 A1* | 1/2020 | Ahmad | B64D 9/00 | |
| 2020/0017237 A1* | 1/2020 | Walker | G08G 5/54 | |
| 2020/0031466 A1* | 1/2020 | Anderson | B64U 30/26 | |
| 2020/0036243 A1* | 1/2020 | Zhao | H02K 1/145 | |
| 2020/0044463 A1* | 2/2020 | Kim | B64U 10/14 | |
| 2020/0053325 A1* | 2/2020 | Deyle | H04N 7/185 | |
| 2020/0055613 A1* | 2/2020 | Miller | G05D 1/0676 | |
| 2020/0062373 A1* | 2/2020 | Liao | B64U 10/16 | |
| 2020/0082570 A1* | 3/2020 | Wunderwald | G02B 27/01 | |
| 2020/0094957 A1* | 3/2020 | Sohmshetty | B60P 3/11 | |
| 2020/0108930 A1* | 4/2020 | Foley | B64U 80/00 | |
| 2020/0113167 A1* | 4/2020 | Bouten | A01C 23/008 | |
| 2020/0148322 A1* | 5/2020 | Pekrul | B63H 5/02 | |
| 2020/0165008 A1* | 5/2020 | Krauss | G05D 1/0676 | |
| 2020/0180940 A1* | 6/2020 | Rainville | B64F 1/28 | |
| 2020/0189731 A1* | 6/2020 | Mistry | B64C 39/022 | |
| 2020/0198803 A1* | 6/2020 | Zhou | B64U 70/30 | |
| 2020/0207484 A1* | 7/2020 | Foggia | B64U 70/90 | |
| 2020/0207485 A1* | 7/2020 | Foggia | B64U 70/90 | |
| 2020/0218287 A1* | 7/2020 | Wang | B64U 50/34 | |
| 2020/0218288 A1* | 7/2020 | Johnson | B64U 30/26 | |
| 2020/0225684 A1* | 7/2020 | Anderson | B64U 70/95 | |
| 2020/0239160 A1* | 7/2020 | Cheng | B64U 70/99 | |
| 2020/0247540 A1* | 8/2020 | Jones | B64D 7/08 | |
| 2020/0262583 A1* | 8/2020 | Ducharme | B64U 70/30 | |
| 2020/0272144 A1* | 8/2020 | Yang | B64U 10/14 | |
| 2020/0284883 A1* | 9/2020 | Ferreira | G01S 7/4815 | |
| 2020/0290752 A1* | 9/2020 | Kolosiuk | B64U 70/95 | |
| 2020/0301445 A1* | 9/2020 | Jourdan | G06K 19/06037 | |
| 2020/0307829 A1* | 10/2020 | Smith | B64C 25/06 | |
| 2020/0309489 A1* | 10/2020 | Kadavanich | F41J 9/08 | |
| 2020/0310465 A1* | 10/2020 | Carthew | B64U 70/92 | |
| 2020/0324898 A1* | 10/2020 | Youmans | G06V 20/176 | |
| 2020/0346736 A1* | 11/2020 | Krasnoff | B64G 1/413 | |
| 2020/0346743 A1* | 11/2020 | Bernard | B64C 25/18 | |
| 2020/0349852 A1* | 11/2020 | DiCosola | G08G 5/55 | |
| 2020/0369384 A1* | 11/2020 | Kelly | G08G 5/32 | |
| 2020/0369408 A1* | 11/2020 | Dolata | B60L 53/16 | |
| 2020/0398999 A1* | 12/2020 | Ortiz | G07C 9/00563 | |
| 2020/0406773 A1* | 12/2020 | Lacaze | B60L 53/35 | |
| 2021/0016696 A1* | 1/2021 | Kelly | F16B 2/22 | |
| 2021/0031947 A1* | 2/2021 | Wankewycz | B60L 53/51 | |
| 2021/0045564 A1* | 2/2021 | Duckers | E06B 3/483 | |
| 2021/0046650 A1* | 2/2021 | Deyle | G05D 1/0214 | |
| 2021/0047055 A1* | 2/2021 | Lee | B64F 1/22 | |
| 2021/0053677 A1* | 2/2021 | Passley | B64U 70/95 | |
| 2021/0070468 A1* | 3/2021 | Svirsky | B64U 80/25 | |
| 2021/0074170 A1* | 3/2021 | Barker | B64F 1/28 | |
| 2021/0086913 A1* | 3/2021 | Friedman | B60L 53/30 | |
| 2021/0089055 A1* | 3/2021 | Tran | G06N 3/0495 | |
| 2021/0094686 A1* | 4/2021 | Metzner | G08B 13/1965 | |
| 2021/0107682 A1* | 4/2021 | Kozlenko | B64U 80/25 | |
| 2021/0107684 A1* | 4/2021 | Le Lann | B64F 1/26 | |
| 2021/0114729 A1* | 4/2021 | Ragan | B64D 9/00 | |
| 2021/0122495 A1* | 4/2021 | Rezvani | B64F 1/007 | |
| 2021/0125503 A1* | 4/2021 | Henry | G05D 1/2247 | |
| 2021/0127658 A1* | 5/2021 | Luebke | F16C 11/04 | |
| 2021/0197983 A1* | 7/2021 | Wang | B64U 80/10 | |
| 2021/0214068 A1* | 7/2021 | Bry | B64U 20/83 | |
| 2021/0214102 A1* | 7/2021 | Geng | B64U 70/97 | |
| 2021/0229805 A1* | 7/2021 | Getman | B64C 27/52 | |
| 2021/0237694 A1* | 8/2021 | Hirschvogel | B60J 7/16 | |
| 2021/0237899 A1* | 8/2021 | Warwick | B64C 39/024 | |
| 2021/0253242 A1* | 8/2021 | Falk-Petersen | B64U 80/40 | |
| 2021/0276732 A1 | 9/2021 | Fisher et al. | | |
| 2021/0276735 A1* | 9/2021 | Raptopoulos | A47G 29/141 | |
| 2021/0284335 A1* | 9/2021 | Mclaughlin | B64U 50/39 | |
| 2021/0284356 A1* | 9/2021 | Jourdan | B64F 1/18 | |
| 2021/0300591 A1* | 9/2021 | Tian | B64F 1/007 | |
| 2021/0309388 A1* | 10/2021 | Ratajczak | B64D 31/00 | |
| 2021/0339842 A1* | 11/2021 | Sauer | B64D 27/402 | |
| 2021/0347500 A1* | 11/2021 | Hagan | B64U 10/13 | |
| 2021/0349456 A1* | 11/2021 | Pham | G05D 1/0676 | |
| 2021/0354820 A1* | 11/2021 | Hiller | B60L 53/12 | |
| 2021/0371128 A1* | 12/2021 | Rodriguez | A47G 29/141 | |
| 2021/0394930 A1* | 12/2021 | O'Toole | A47G 29/141 | |
| 2021/0405655 A1* | 12/2021 | Yi | B64U 70/90 | |
| 2022/0009647 A1* | 1/2022 | Johannesson | B64U 20/96 | |
| 2022/0019247 A1* | 1/2022 | Dayan | G05D 1/104 | |
| 2022/0041279 A1* | 2/2022 | Rowse | G05D 1/104 | |
| 2022/0041299 A1* | 2/2022 | Wankewycz | B64D 37/30 | |
| 2022/0055745 A1* | 2/2022 | Walker | H02G 11/02 | |
| 2022/0055770 A1* | 2/2022 | O'Toole | B65G 69/003 | |
| 2022/0063798 A1* | 3/2022 | Johnson | B64C 37/02 | |
| 2022/0073214 A1* | 3/2022 | Liske | B64F 1/22 | |
| 2022/0106125 A1* | 4/2022 | Ragan | F16G 3/10 | |
| 2022/0119105 A1* | 4/2022 | Schmalzried | G05D 1/652 | |
| 2022/0162001 A1* | 5/2022 | Gherardi | G05D 1/0088 | |
| 2022/0163980 A1* | 5/2022 | Beer | G05D 1/228 | |
| 2022/0169400 A1* | 6/2022 | Seeley | B64C 1/20 | |
| 2022/0169401 A1* | 6/2022 | Di Cosola | B60L 53/51 | |
| 2022/0171388 A1* | 6/2022 | Yanagihashi | B65G 43/00 | |
| 2022/0177124 A1* | 6/2022 | Marshall | B64U 10/20 | |
| 2022/0185501 A1* | 6/2022 | Kempley | B64U 70/70 | |
| 2022/0234757 A1* | 7/2022 | Dayan | B64U 70/97 | |
| 2022/0242589 A1* | 8/2022 | Pham | G09F 27/005 | |
| 2022/0267026 A1* | 8/2022 | Lee | B64F 1/007 | |
| 2022/0289376 A1* | 9/2022 | Hayakawa | G05D 1/101 | |
| 2022/0306320 A1* | 9/2022 | Howe | B60L 53/00 | |
| 2022/0315248 A1* | 10/2022 | Castellano Aldave | B60L 3/00 | |
| 2022/0348405 A1* | 11/2022 | Cheng | B25J 13/08 | |
| 2022/0380063 A1* | 12/2022 | Shah | B64U 70/92 | |
| 2022/0396373 A1* | 12/2022 | Wang | B64U 50/37 | |
| 2022/0396421 A1* | 12/2022 | Tian | B62D 63/061 | |
| 2023/0017530 A1* | 1/2023 | Lowe | H01M 10/613 | |
| 2023/0023246 A1* | 1/2023 | McLaughlin | G05D 1/0088 | |
| 2023/0031028 A1* | 2/2023 | Ehasoo | B64F 1/222 | |
| 2023/0044050 A1* | 2/2023 | Cevacins | B64U 70/99 | |
| 2023/0045483 A1* | 2/2023 | Ahn | G05D 1/689 | |
| 2023/0045691 A1* | 2/2023 | Cevacins | B64U 60/00 | |
| 2023/0046127 A1* | 2/2023 | Guerra Johansson | H04N 7/183 | |
| 2023/0063715 A1* | 3/2023 | Bell | G05D 1/0246 | |
| 2023/0065140 A1* | 3/2023 | Blevins | B64U 20/40 | |
| 2023/0074715 A1* | 3/2023 | Kwon | F04D 25/08 | |
| 2023/0088830 A1* | 3/2023 | Kim | B64U 50/32 | |
| | | | 244/221 | |
| 2023/0096139 A1* | 3/2023 | Ubaldi | B65G 23/44 | |
| | | | 198/844.1 | |
| 2023/0100169 A1* | 3/2023 | Laczak | B64F 1/125 | |
| | | | 232/1 R | |
| 2023/0133068 A1* | 5/2023 | Wiegman | B60L 53/62 | |
| | | | 320/109 | |
| 2023/0140387 A1* | 5/2023 | Infanti | B64U 60/50 | |
| | | | 244/114 R | |
| 2023/0159192 A1* | 5/2023 | Gil | B64U 80/40 | |
| | | | 244/137.1 | |
| 2023/0202680 A1* | 6/2023 | Yehya | B64U 70/30 | |
| | | | 244/110 E | |

(56) References Cited

U.S. PATENT DOCUMENTS

| | | | | |
|---|---|---|---|---|
| 2023/0202682 A1* | 6/2023 | Kiyokami | B64U 70/90 | |
| | | | 244/114 R | |
| 2023/0202691 A1* | 6/2023 | Kiyokami | B64U 70/93 | |
| | | | 244/114 R | |
| 2023/0244249 A1* | 8/2023 | Smith | G01S 13/933 | |
| | | | 701/11 | |
| 2023/0249851 A1* | 8/2023 | Tian | B64U 80/10 | |
| | | | 414/787 | |
| 2023/0257139 A1* | 8/2023 | Straus | B64U 10/13 | |
| | | | 244/114 R | |
| 2023/0298268 A1* | 9/2023 | Oleynikova | B60W 30/09 | |
| 2023/0303272 A1* | 9/2023 | Passley | B64U 70/00 | |
| 2023/0348106 A1* | 11/2023 | Berthelet | H05K 7/20154 | |
| 2023/0349146 A1* | 11/2023 | Vasconi | B66B 9/00 | |
| 2023/0356863 A1* | 11/2023 | Zhang | G08G 5/55 | |
| 2023/0373626 A1* | 11/2023 | Kiyokami | B64D 1/22 | |
| 2023/0373668 A1* | 11/2023 | Kozlenko | G05D 1/0055 | |
| 2023/0399132 A1* | 12/2023 | Kiyokami | B64C 39/024 | |
| 2024/0002080 A1* | 1/2024 | Shi | B64F 1/362 | |
| 2024/0010368 A1* | 1/2024 | Liao | B64U 80/10 | |
| 2024/0067371 A1* | 2/2024 | Turner | B64U 50/37 | |
| 2024/0076067 A1* | 3/2024 | Takahashi | B64U 10/60 | |
| 2024/0076072 A1* | 3/2024 | Arii | B64U 10/14 | |
| 2024/0101286 A1* | 3/2024 | Regev | B64U 70/20 | |
| 2024/0101287 A1* | 3/2024 | Takahashi | B64U 80/86 | |
| 2024/0101288 A1* | 3/2024 | Takahashi | B64U 70/92 | |
| 2024/0109656 A1* | 4/2024 | Stege | G06Q 10/083 | |
| 2024/0132238 A1* | 4/2024 | Qiu | B64U 70/92 | |
| 2024/0140630 A1* | 5/2024 | Lee | B64U 80/40 | |
| 2024/0158112 A1* | 5/2024 | Le Lann | H01M 50/262 | |
| 2024/0176367 A1* | 5/2024 | Zhou | G08G 5/22 | |
| 2024/0190593 A1* | 6/2024 | Shah | B60L 53/14 | |
| 2024/0262545 A1* | 8/2024 | Fu | B64U 80/20 | |
| 2024/0278946 A1* | 8/2024 | Roberts | B64U 70/92 | |
| 2024/0300677 A1* | 9/2024 | Sercel | B64G 1/623 | |
| 2024/0326680 A1* | 10/2024 | Rosen | B60P 3/11 | |
| 2024/0336378 A1* | 10/2024 | Neate | B64U 10/60 | |
| 2024/0343426 A1* | 10/2024 | Cornew | B64U 80/25 | |
| 2024/0384587 A1* | 11/2024 | Anderson | B64U 70/90 | |
| 2024/0391616 A1* | 11/2024 | Dayan | B64U 70/90 | |
| 2024/0425199 A1* | 12/2024 | Li | G05D 1/042 | |
| 2025/0002185 A1* | 1/2025 | Liu | B64U 80/70 | |
| 2025/0003581 A1* | 1/2025 | Talbi | F21V 21/35 | |
| 2025/0011017 A1* | 1/2025 | Kim | B64U 50/19 | |
| 2025/0026509 A1* | 1/2025 | Infanti | B64U 70/50 | |
| 2025/0074632 A1* | 3/2025 | DiCosola | G07F 15/006 | |
| 2025/0076040 A1* | 3/2025 | Sandall | B64C 13/16 | |
| 2025/0108935 A1* | 4/2025 | Johnson | B60L 53/22 | |
| 2025/0108943 A1* | 4/2025 | Sekiguchi | B64U 80/20 | |
| 2025/0121966 A1* | 4/2025 | Gronstedt | B64U 80/70 | |
| 2025/0128638 A1* | 4/2025 | Scheler | B60L 53/30 | |
| 2025/0145314 A1* | 5/2025 | Gronstedt | B64F 1/32 | |
| 2025/0185139 A1* | 6/2025 | Spiro | H01F 41/041 | |
| 2025/0187761 A1* | 6/2025 | Yamakawa | B64U 70/90 | |
| 2025/0205528 A1* | 6/2025 | Hakos | A62C 37/38 | |
| 2025/0206463 A1* | 6/2025 | Aralis | B64F 1/362 | |
| 2025/0223061 A1* | 7/2025 | Merdin | B64U 80/25 | |
| 2025/0224541 A1* | 7/2025 | Quist | G06V 20/17 | |
| 2025/0250006 A1* | 8/2025 | Burgess | G05D 1/0094 | |

* cited by examiner

162

166

164

166

BASE STATION FOR AN UNMANNED AERIAL VEHICLE INCLUDING A ROTATABLE ROOF ASSEMBLY

CROSS-REFERENCE TO RELATED APPLICATION(S)

This application claims priority to and the benefit of U.S. Provisional Patent Application Ser. No. 63/683,504, filed Aug. 15, 2024, the entire contents of which are incorporated by reference herein for all purposes.

TECHNICAL FIELD

The present disclosure relates to a base station for an unmanned aerial vehicle (UAV) and, more specifically, to a base station that includes a rotatable roof assembly.

BACKGROUND

A base station for a UAV is designed to house and protect the UAV when not in use. The base station may include a landing platform on which the UAV may take flight and land. For example, the base station may include one or more fiducial markings that may be detected by an image sensor (e.g., a camera) of the UAV. Based upon detection of the one or more fiducial markings, the UAV may execute a landing procedure to safely land on the landing platform of the base station. Additionally, the base station may include an integrated charging system that, when the UAV is not in use and is stored on the landing platform, may replenish a power supply (e.g., a battery) of the UAV.

SUMMARY

In one aspect of the present disclosure, a base station for a UAV is disclosed that includes a base and a roof assembly that is supported by the base such that the roof assembly is repositionable between a closed position, in which the UAV is concealed within the base station, and an open position, which facilitates takeoff and landing of the UAV. The base includes a body and a landing platform that is supported by the body and which is configured to receive the UAV during docking. The roof assembly is rotatable through an angular range of motion that lies substantially within the range of approximately 110 degrees to approximately 120 degrees during repositioning between the closed position and the open position.

In some configurations, the base may further include hoists that are configured to facilitate transport and/or repositioning of the base station.

In some configurations, the base may further include an access module that is configured to accommodate at least one accessibility component.

In some configurations, the access module may include: a box; a door that is connected to the box such that the door is repositionable between open and closed positions; and an umbrella that is supported by the box and which is configured to inhibit the entry of water, dust, and/or debris.

In some configurations, the base may further include a lighting and heating assembly that is configured to provide a visual indication of activity of the base station and facilitate deicing of the roof assembly.

In some configurations, the lighting and heating assembly may be positioned adjacent to a perimeter of the base.

In some configurations, the lighting and heating assembly may include: at least one diffuser lens; at least one light positioned vertically below the landing platform; and at least one heater.

In some configurations, the lighting and heating assembly may be waterproof in construction.

In some configurations, the roof assembly may include: a cover; ears that connect the cover to the base; and a drive system that engages the ears and which is configured to rotate the ears in relation to the base during repositioning of the roof assembly between the closed position and the open position.

In some configurations, the roof assembly may further include at least one camera to facilitate inspection during repositioning of the roof assembly between the closed position and the open position.

In some configurations, the roof assembly may further include a pivot shaft that supports the ears and which defines a channel that is configured to receive at least one data and/or power transmission member.

In some configurations, the drive system may include: at least one motor that is connected to the base; at least one spacer that is positioned between the at least one motor and the base; at least one belt that engages the at least one motor; and at least one pulley that supports the at least one belt.

In some configurations, the at least one spacer may include a generally symmetrical configuration.

In some configurations, the drive system may further include at least one damper that is configured to absorb force during repositioning of the roof assembly between the closed position and the open position.

In some configurations, the drive system may further include at least one limit sensor.

In another aspect of the present disclosure, a base station for an unmanned aerial vehicle (UAV) is disclosed. The base station includes a body and a landing platform supported by the body and configured to support the UAV. The base station also includes a roof assembly movably coupled to the base. The roof assembly includes a cover defining a cavity therein and one or more ears coupled to the cover and movably coupled to the body such that the roof assembly is movable between a closed position, in which the cover is configured to enclose the landing platform and the UAV supported thereon, and an open position, in which the cover is located at least partially below the landing platform with respect to an elevational direction such that the landing platform is unobstructed by the cover to facilitate takeoff and landing of the UAV. The roof assembly is rotatable through an angular range of motion that is defined by the one or more ears.

In some configurations, the one or more ears may include a first ear coupled to a first side of the cover and movably coupled to a first side of the body and a second ear coupled to an opposing second side of the cover and movably coupled to an opposing second side of the body. The first ear may be movably coupled to the first side of the body by a first pivot shaft projecting from the first ear. The second ear may be movably coupled to the opposing second side of the body by a second pivot shaft projecting from the second ear. The first pivot shaft and the second pivot shaft may be coaxial along an axis of rotation of the roof assembly.

In some configurations, the body may define a cavity therein. One or more actuators may be disposed in the cavity of the body and coupled to the roof assembly to move the roof assembly between the closed position and the open position. The one or more actuators may extend at least partially through the body to engage the one or more ears.

In some configurations, the roof assembly may be rotatable through the angular range of motion, which may be substantially within a range of approximately 110 degrees to approximately 120 degrees during repositioning of the roof assembly between the closed position and the open position.

In some configurations, the base station may further comprise indicator lighting extending at least partially around a perimeter of the base. The indicator lighting remains unobstructed by the roof assembly when the roof assembly is in the open position and the closed position. The indicator lighting may be disposed along a top edge of the body and secured to the body by a peripheral bracket projecting in the elevational direction away from the top edge. A light module configured to control and power the indicator lighting may be electrically connected to the indicator lighting and disposed within confines of the body.

In some configurations, the roof assembly may further include one or more of a rain or a wind sensor coupled to an exterior surface of the cover.

In some configurations, the base may further include a user interface disposed along an exterior surface of the body. The user may be configured to stop movement of the roof assembly between the closed position and the open position by interacting with the user interface.

In some configurations, the roof assembly may further include a camera coupled to the cover and at least partially disposed within the cavity of the cover. The camera may be positioned such that a field of view of the camera is configured to monitor the landing platform when the roof assembly is in the closed position. The camera may be configured to extend above the landing platform in the elevational direction when the roof assembly is in the closed position such that the field of view of the camera maintains monitoring of the landing platform.

In another aspect of the present disclosure, a base station for an unmanned aerial vehicle (UAV) is disclosed. The base station includes a landing platform configured to support the UAV and a roof assembly movably coupled to the base and configured to move between a closed position, in which the roof assembly is configured to enclose the landing platform and the UAV supported thereon, and an open position, in which the roof assembly exposes the landing platform to facilitate takeoff and landing of the UAV. The roof assembly includes a cover defining a cavity therein, a first ear extending downward from the cover with respect to an elevational direction and coupled to a first side of the base via a first pivot shaft, a second ear extending downward from the cover with respect to the elevational direction and coupled to an opposing second side of the base via a second pivot shaft, and a camera coupled to the cover and configured for enclosure by the base and the cover when the roof assembly is in the closed position. The landing platform is configured for positioning within a field of view of the camera when the roof assembly is in the closed position and the open position.

In some configurations, the first pivot shaft and the second pivot shaft may each define an opening therein. Wiring of the base station may be configured for routing through one or more of the opening of the first pivot shaft or the opening of the second pivot shaft to electrically connect the base to the roof assembly.

In some configurations, the roof assembly may further include a light located adjacent to the camera and contained within the cavity of the cover.

In some configurations, the base station may further comprise indicator lighting extending around a periphery of the base. The indicator lighting may be configured to provide a visual indication of activity of the base station.

In another aspect of the present disclosure, a base station for an unmanned aerial vehicle (UAV) is disclosed. The base station includes a base that includes a landing platform configured to support the UAV and a roof assembly movably coupled to the base and configured to move between a closed position, in which the roof assembly is configured to enclose the landing platform and the UAV supported thereon, and an open position, in which the roof assembly exposes the landing platform. The roof assembly includes a cover defining a cavity therein, a heating element disposed along an interior surface of the cover and located within the cavity of the cover, and a cover panel disposed within the cavity of the cover such that the heating element is located between the interior surface of the cover and the cover panel. The heating element is configured to facilitate de-icing of one or more of the roof assembly, the base, or the UAV. The heating element and the cover panel define a cutout therein that is configured to facilitate wireless communication between the UAV located on the landing platform and an external device when the roof assembly is in the closed position.

In some configurations, the roof assembly may further include one or more antennas coupled to the interior surface of the cover and contained within the cavity of the cover. In some configurations, the cutout defined by the heating element and the cover panel may be enclosed by the cover.

In another aspect of the present disclosure, a base station for an unmanned aerial vehicle (UAV) is disclosed. The base station includes a base that includes a body defining a cavity therein and a landing platform supported by the body and configured to support the UAV. The base station also includes a roof assembly movably coupled to the base to move between a closed position, in which the roof assembly is configured to enclose the landing platform, and an open position, in which the roof assembly is located such that the landing platform is unobstructed by the roof assembly. The roof assembly is actuated between the closed position and the open position by a drive system that includes a first drive assembly located in the cavity of the body and extending through a first side panel of the body to couple to a first side of the roof assembly, and a second drive assembly disposed in the cavity of the body and extending through a second side panel of the body to couple to an opposing second side of the roof assembly.

In some configurations, the roof assembly may include a cover, a first ear coupled to a first side of the cover and movably coupled to a first side of the body, and a second ear coupled to an opposing second side of the cover and movably coupled to an opposing second side of the body. The first drive assembly may be movably coupled to the first ear. The second drive assembly may be movably coupled to the second ear. The first drive assembly and the second drive assembly may be located beneath the landing platform with respect to an elevational direction.

In some configurations, the first ear may be movably coupled to the first side of the body by a first pivot shaft projecting from the first ear into a first pivot opening defined by the first side panel. The second ear may be movably coupled to the opposing second side of the body by a second pivot shaft projecting from the second ear into a second pivot opening defined by the second side panel. The first pivot opening and the second pivot opening may define an axis of rotation of the roof assembly. The first pivot shaft and the second pivot shaft may be coaxial along the axis of rotation. The first pivot opening may be spaced apart from the first drive assembly and the second pivot opening may be spaced apart from the second drive assembly.

In some configurations, the first ear may include a first track that is configured to guide the first drive assembly during actuation of the roof assembly and the second ear may include a second track that is configured to guide the second drive assembly during actuation of the roof assembly. The first track and the second track may be symmetrical. The first drive assembly may be configured to engage a first belt disposed within the first track and the second drive assembly may be configured to engage a second belt disposed within the second track to actuate the roof assembly.

In another aspect of the present disclosure, a base station for an unmanned aerial vehicle (UAV) is disclosed. The base station includes a base that includes a landing platform configured to support the UAV. The base station also includes a roof assembly movably coupled to the base and configured to move between a closed position, in which the roof assembly is configured to enclose the landing platform, and an open position, in which the roof assembly exposes the landing platform. The roof assembly includes a cover, an ear extending downward from the cover with respect to an elevational direction and coupled to the base via a pivot shaft, and a drive assembly disposed within the base and coupled to the ear. The drive assembly includes a drive shaft extending through the base and into the ear, an actuator coupled to the drive shaft and configured to rotate the drive shaft, and a gear coupled to the drive shaft and in communication with the ear. Rotation of the drive shaft rotates the gear to drive the roof assembly between the closed position and the open position.

In some configurations, the ear may define a track. The belt may be disposed within the track. The gear may be positioned within the track and configured to engage with the belt to drive the roof assembly between the closed position and the open position. Rotational movement of the gear may be configured to advance the belt along the gear to drive the roof assembly between the closed position and the open position. The base station may further comprise a retaining mechanism located at least partially within the base and coupled to the actuator. The belt may be routed through the retaining mechanism such that the retaining mechanism maintains engagement between the belt and the gear.

In some configurations, the drive assembly may be coupled to the base by a mounting bracket located therebetween.

In another aspect of the present disclosure, a base station for an unmanned aerial vehicle (UAV) is disclosed. The base station includes a base that includes a body defining a cavity therein and a landing platform supported by the body. The base station also includes a roof assembly movably coupled to the body and configured to move between a closed position and an open position. The roof assembly includes a cover, an ear coupled to the cover and movably coupled to the body via a pivot shaft, and a drive assembly disposed within the cavity of the body and movably coupled to the ear. The drive assembly includes an actuator disposed within the cavity of the body and coupled to an interior surface of the body by a mounting bracket, a drive shaft extending through an actuator opening defined by the body and a track defined by the ear, and a gear coupled to the drive shaft and configured to engage a belt within the track. The drive shaft is rotatably coupled to the actuator. Rotation of the gear advances the belt along the gear to drive the roof assembly between the closed position and the open position.

In some configurations, the mounting bracket may be secured within the actuator opening. The mounting bracket may be keyed to the actuator opening to prevent rotation of the mounting bracket with respect to the body.

In some configurations, the drive shaft may extend through the mounting bracket to couple to the gear.

In some configurations a retaining mechanism may be coupled to the mounting bracket and configured to maintain engagement between the belt and the gear. The retaining mechanism may be guided along the track during movement of the roof assembly between the closed position and the open position. The retaining mechanism may include one or more bushings that are guided along the track during movement of the roof assembly. The retaining mechanism may include a pair of bushings that are disposed on opposing sides of the gear. The belt may be routed around the gear and between the pair of bushings.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure relates to a base station for use with a UAV. The base station may be configured to support the UAV. The base station may be configured to charge a power source (e.g., a battery) of the UAV when the UAV is supported on or contained within the base station. For example, the base station may include a support assembly, such as a landing platform, which may support the UAV during periods of inactivity (e.g., when not in use) and may further support the UAV during takeoff and landing. The landing platform may be positioned within the base station such that, when the UAV is docked (e.g., supported by the landing platform), the base station may contain the UAV.

In an example, the base station may include a base, which may include or be the landing platform, and a roof assembly. The roof assembly may be movable so that, when the UAV is docked, the roof assembly may at least partially enclose the UAV such that the UAV is no longer exposed to environmental conditions, such as precipitation (e.g., rain, snow, hail, etc.), wind, extreme temperatures (e.g., extreme heat and/or cold), sunlight, debris, other external factors, or a combination thereof. Additionally, when the UAV is prepared for takeoff, the roof assembly may move so that the landing platform remains unobstructed by the roof assembly and the UAV may safely take off from the landing platform.

Conventional base stations are often mechanically complex to ensure proper docking of the UAV. Similarly, conventional base stations may frequently require significant operator interaction to ensure proper takeoff and landing of the UAV. For example, the operator may be required to manually move a portion of the base station (e.g., a cover) to ensure that takeoff and landing of the UAV remains unobstructed. Additionally, conventional base stations may often provide a landing surface for the UAV yet provide no protection to the UAV once docked. For example, conventional base stations may not include a roof assembly to prevent exposure of the UAV to various environmental conditions, such as those described above.

The present teachings provide a base station that addresses the aforementioned challenges. Operations of the base station herein may advantageously be substantially or entirely automated to substantially alleviate user interaction. The base station herein may also provide protection to the UAV when docked. For example, the base station may partially or entirely enclose the UAV therein to protect the UAV from environmental conditions. Additionally, the base station may be thermally regulated to ensure proper operation of the base station even in extreme weather conditions (e.g., extreme cold, which may expose the base station to snow and/or ice).

Figure 1:
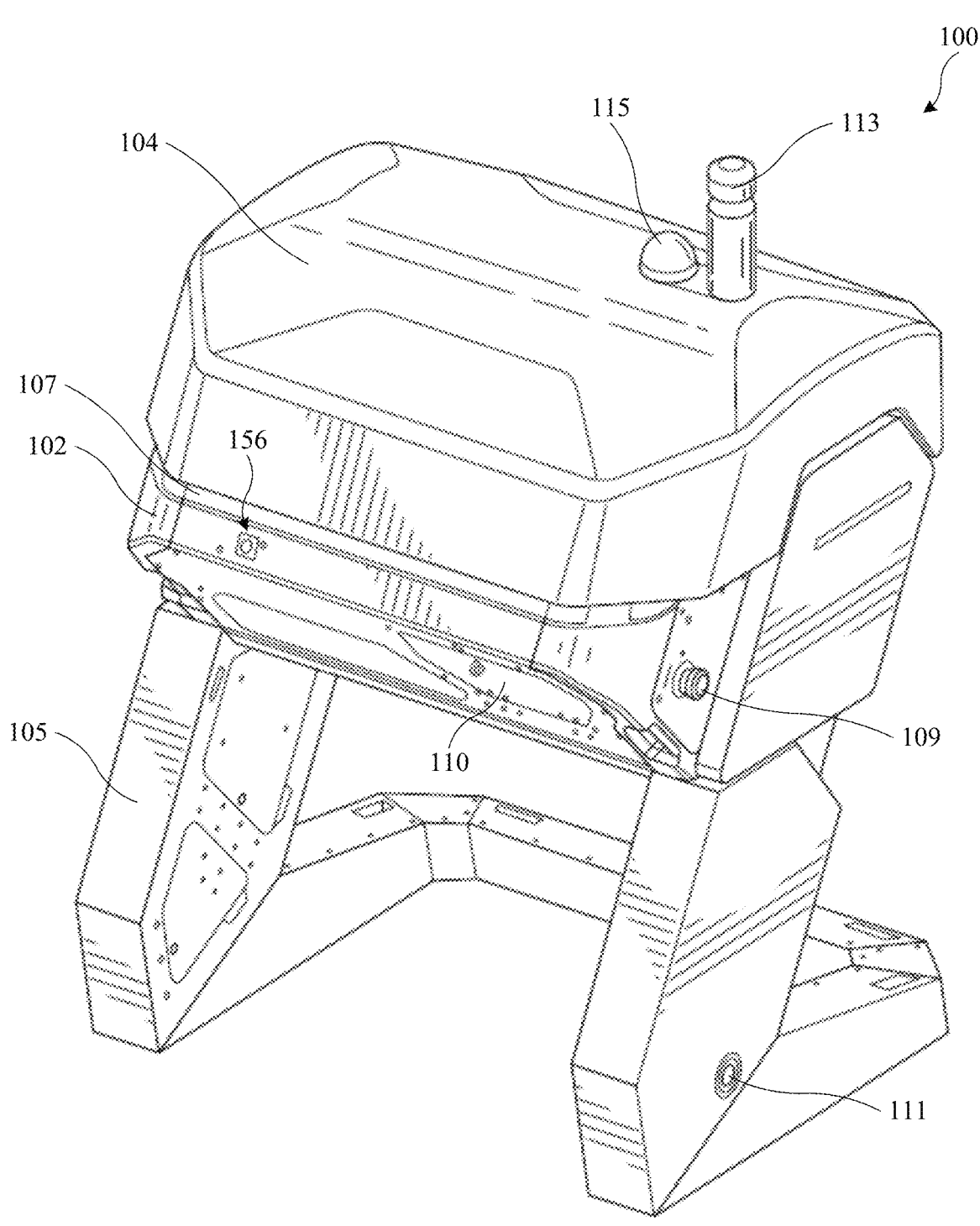
FIG. 1 is a perspective view of a base station for use with a UAV, which includes a rotatable roof assembly.
Figure 2:
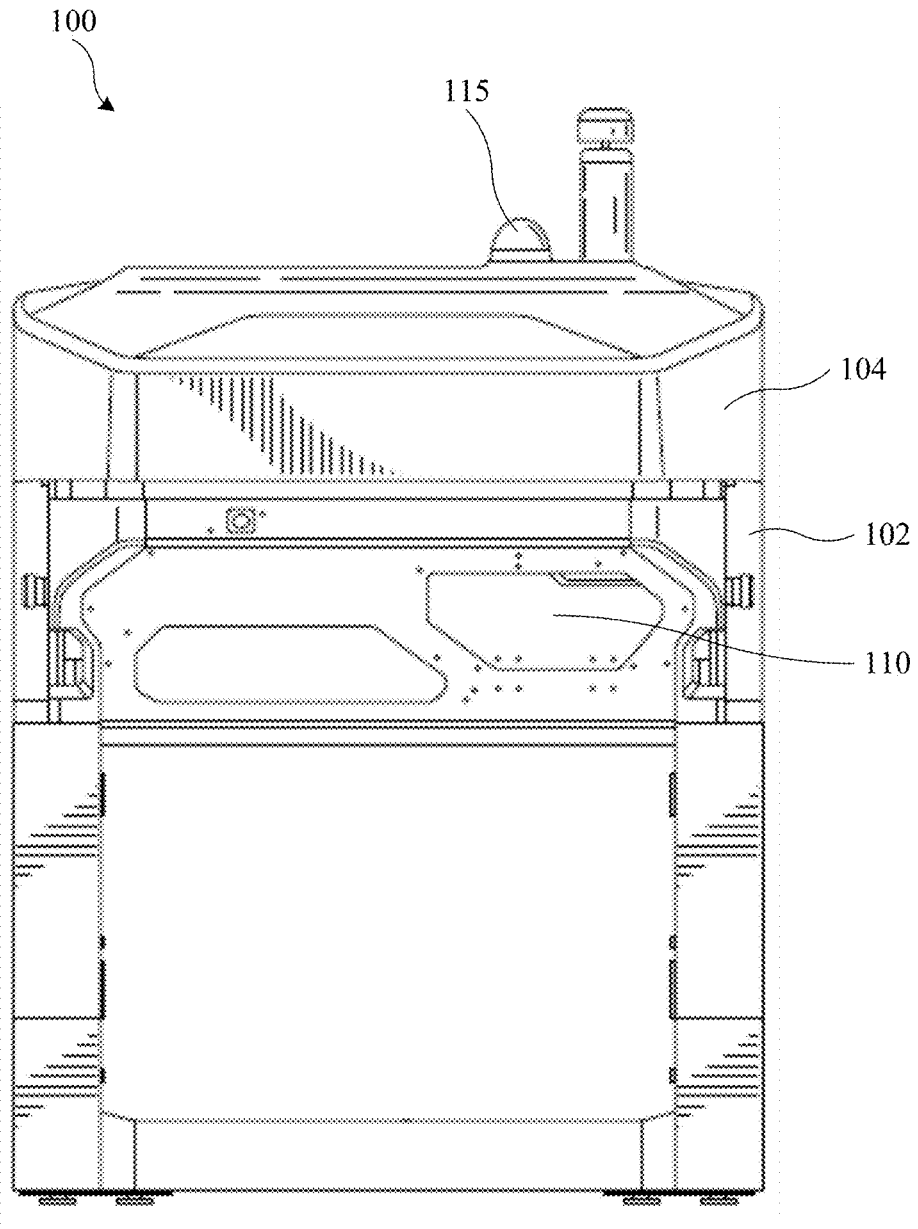
FIG. 2 is a front view of the base station.
Figure 3:
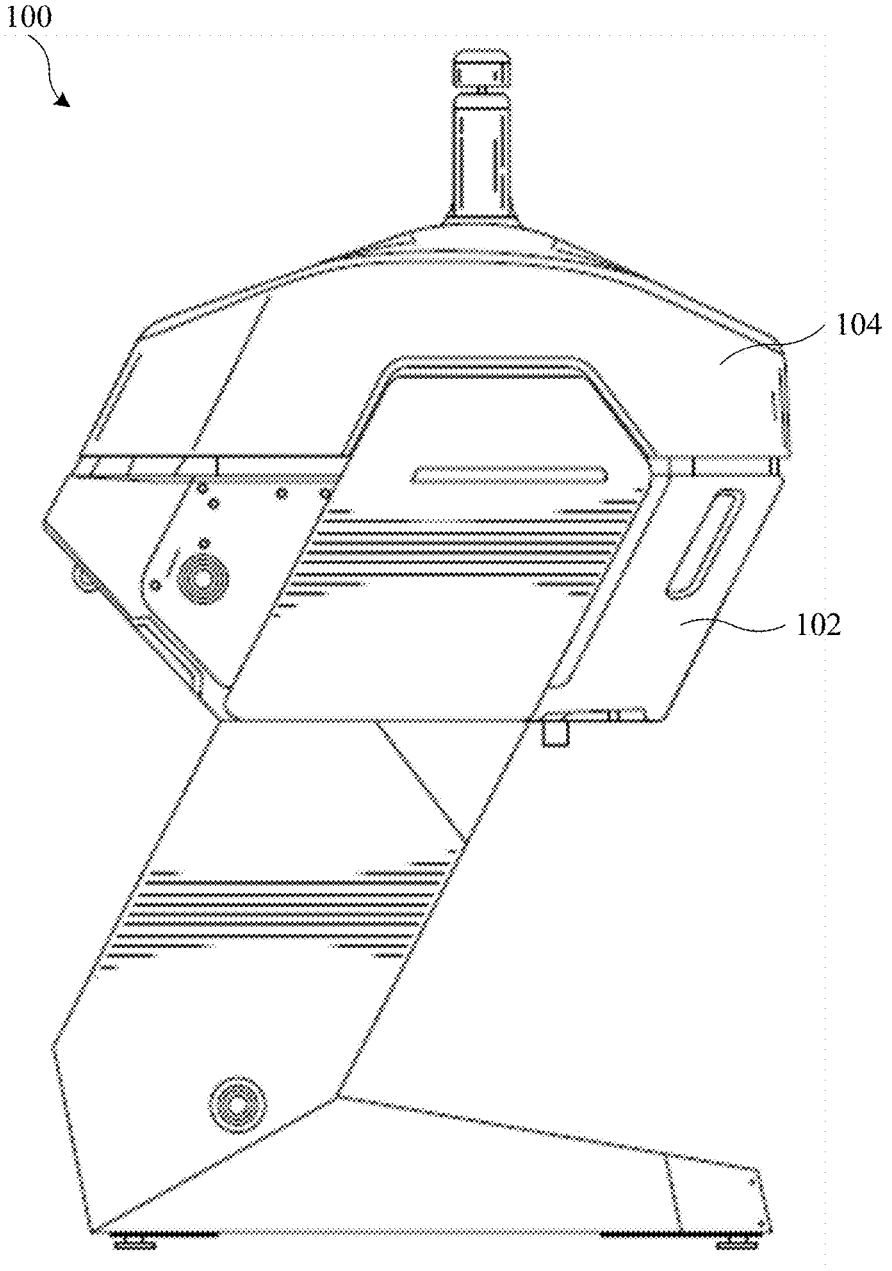
FIG. 3 is a side view of the base station.
Figure 4:
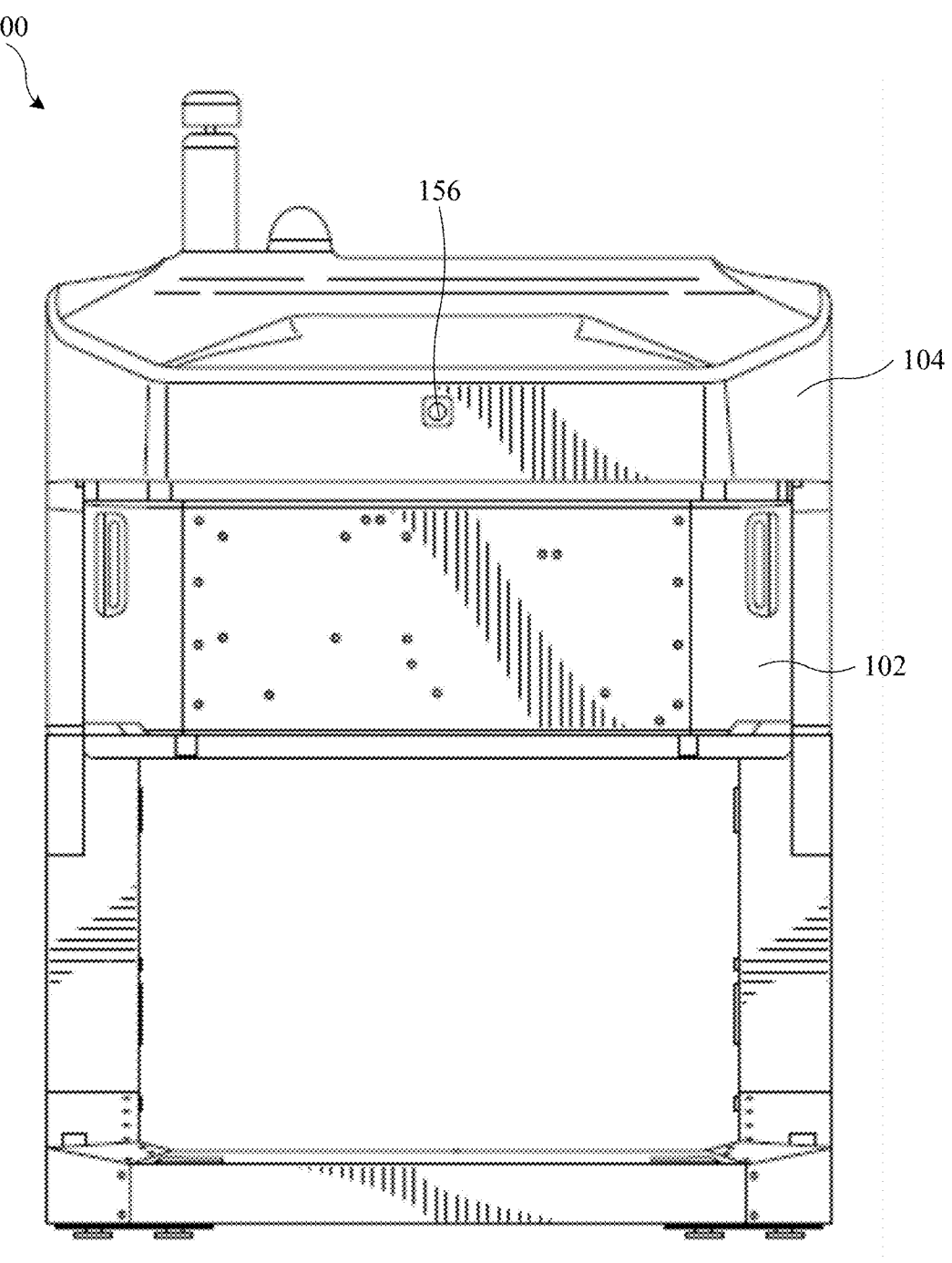
FIG. 4 is a rear view of the base station.
Figures 5, 6:
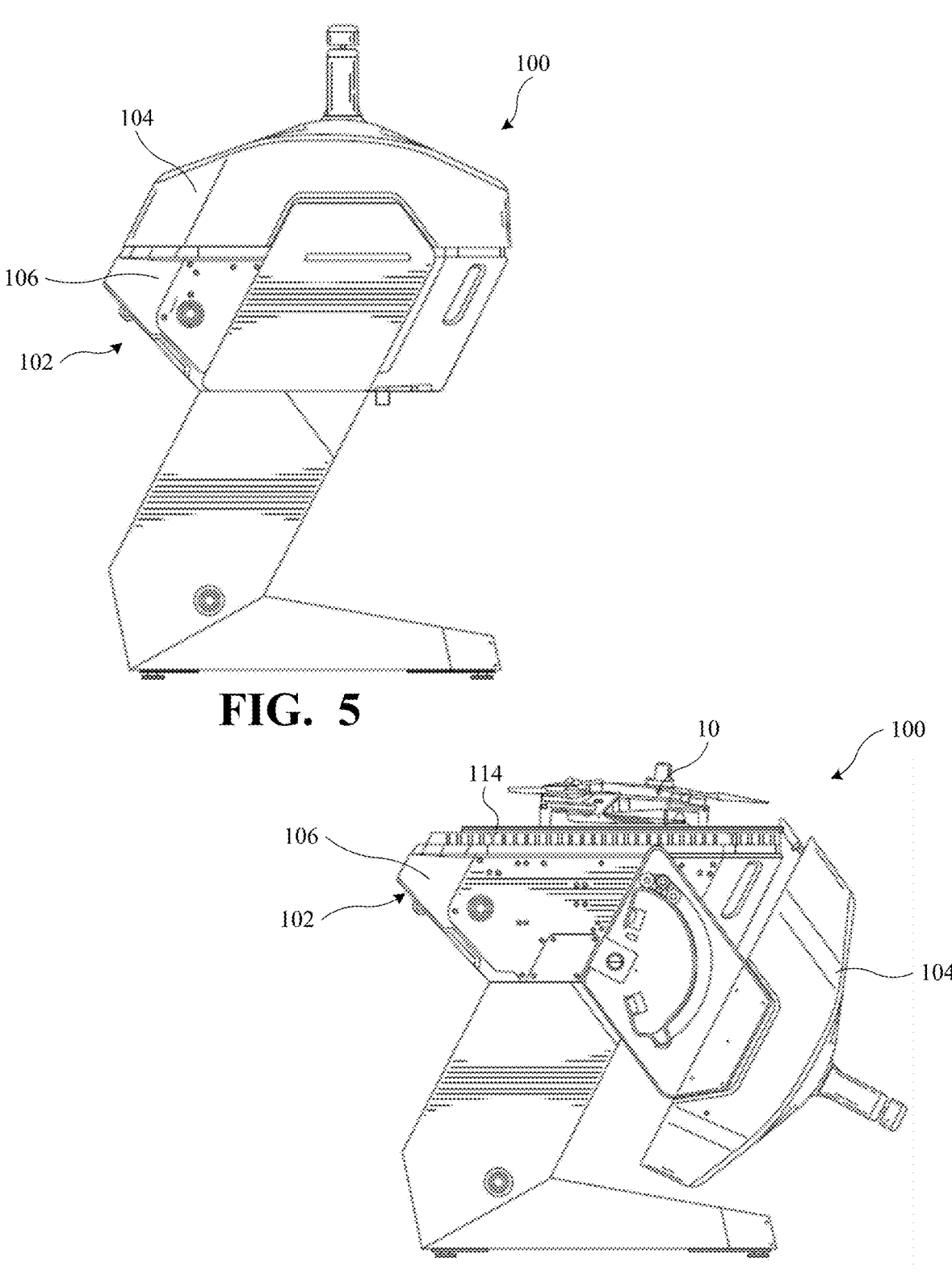
FIG. 5 is a side view of the base station with the roof assembly shown in a closed position.
FIG. 6 is a side view of the base station with the roof assembly shown in an open position.
Figure 7:
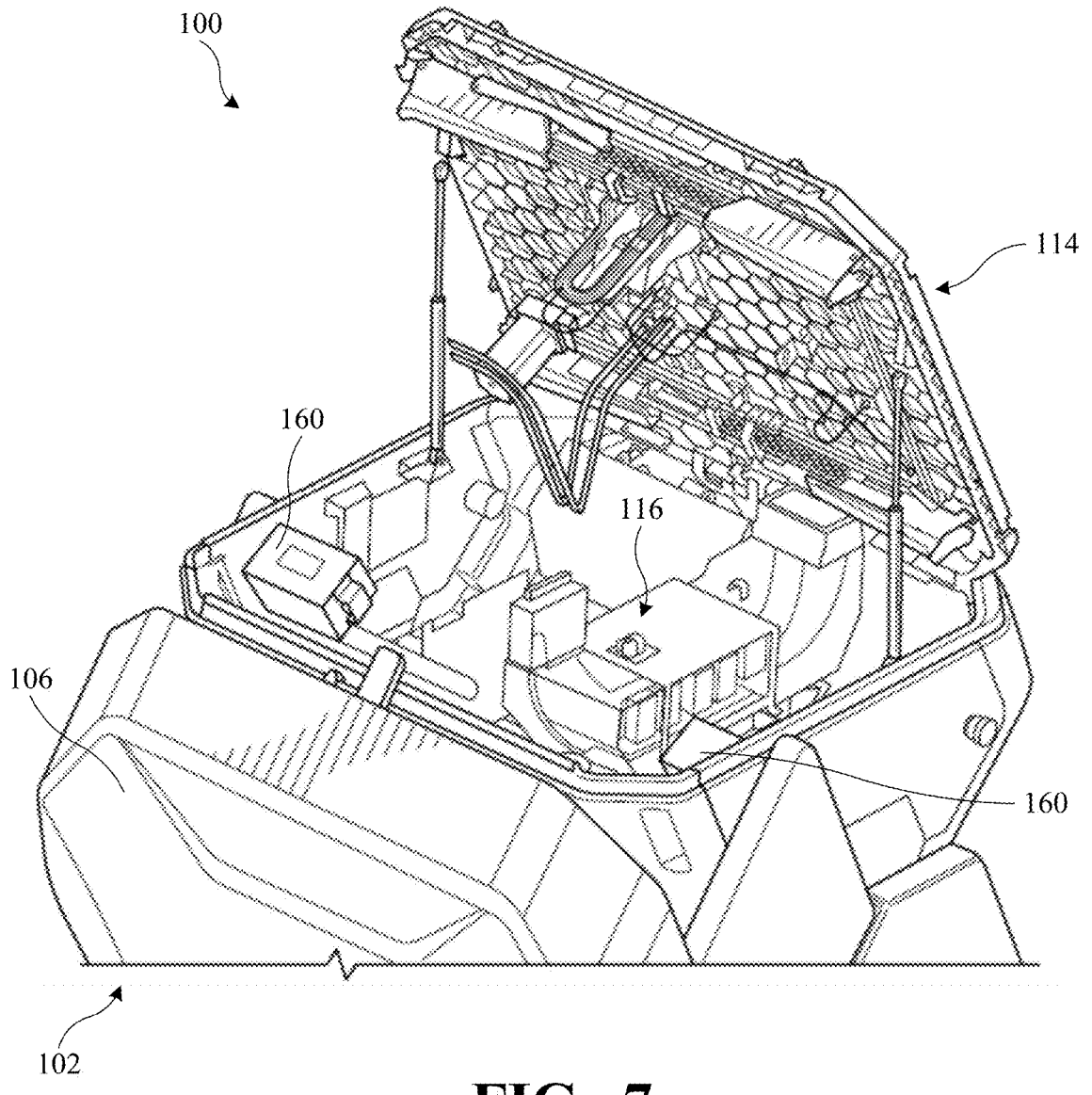
FIG. 7 is a perspective view of the base station illustrating a landing platform for the UAV and various internal components.
Figure 8:
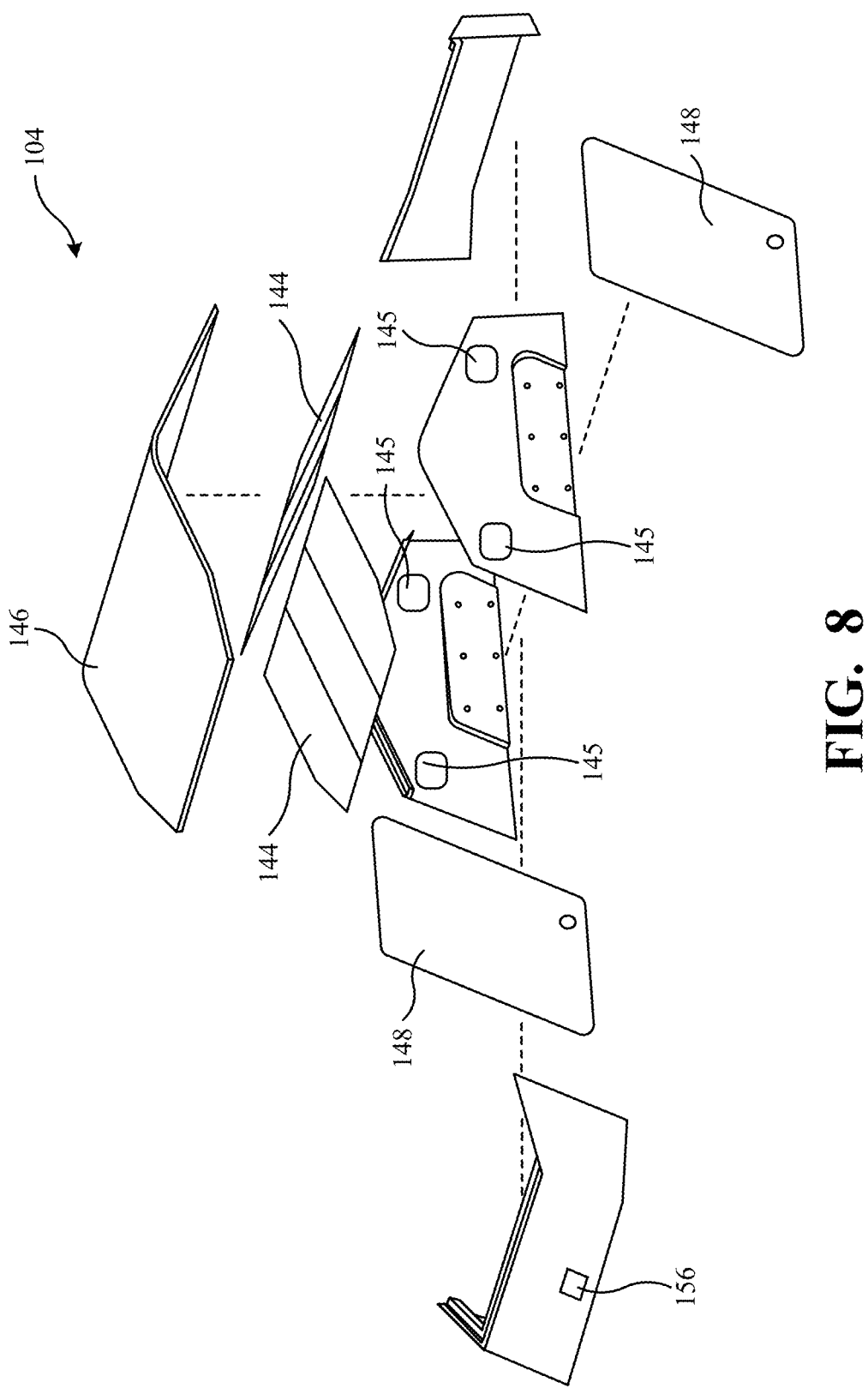
FIG. 8 is a perspective view of the roof assembly shown with parts separated according to one example of the present disclosure.
Figures 9, 10, 11:
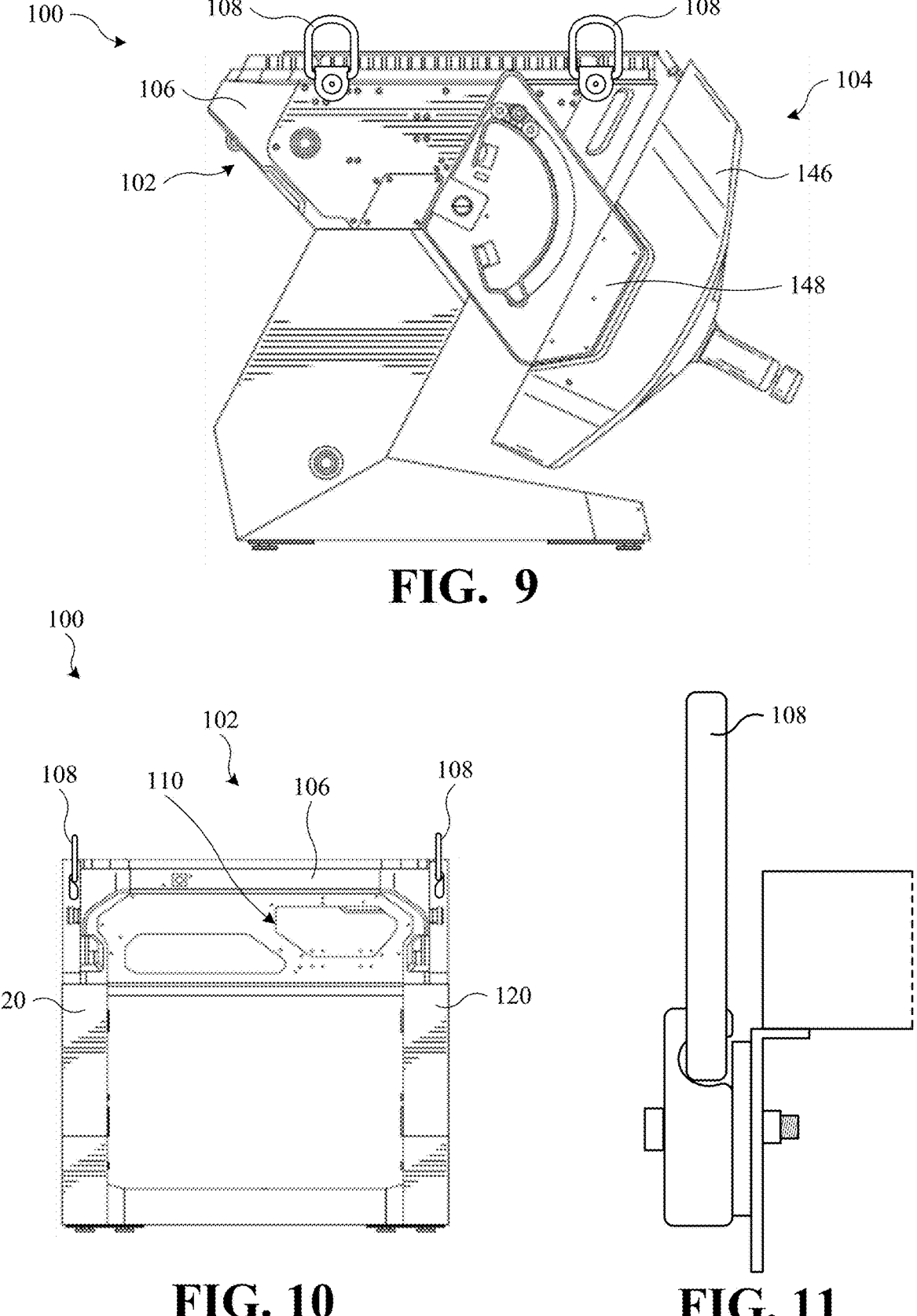
FIG. 9 is a side view of the base station illustrating hoists for use in transporting and/or repositioning the base station.
FIG. 10 is a front view of the base station illustrating the hoists and an access module.
FIG. 11 is a close-up front view of the base station illustrating one of the hoists.
Figure 12:
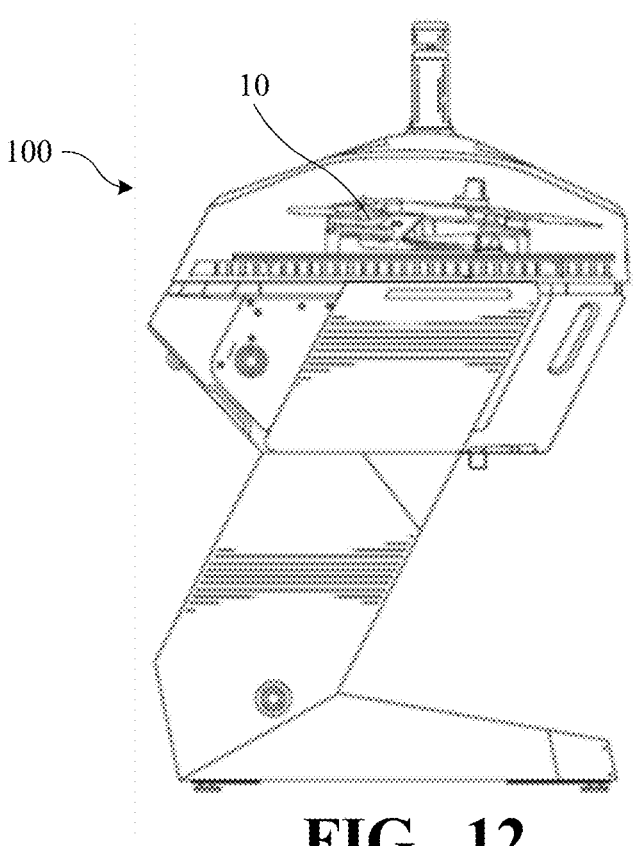
FIG. 12 is a cross-sectional view of the UAV and the base station.

Turning now to the figures, FIGS. 1-6 illustrate a base station 100 (e.g., a dock) for an unmanned aerial vehicle (UAV) 10 (FIGS. 6, 12), whereby the base station 100 is configured for automated servicing (e.g., storage, charging, operation, etc.) and accommodation of the UAV 10. While the base station 100 and the UAV 10 are shown and described herein, in certain embodiments of the disclosure, it is envisioned that a plurality of base stations 100 and more than one of the UAV 10 may be utilized depending, for example, upon the particular intended use of the UAVs 10.

The base station 100 includes a base 102 and a roof assembly 104, which is supported by the base 102 such that the roof assembly 104 is repositionable between a closed position (FIGS. 1-5), in which the UAV 10 is concealed within the base station 100, and an open position (FIG. 6), which facilitates takeoff and landing of the UAV 10. The base station 100 may further include a stand 105 to support the base 102 and the roof assembly 104.

With reference now to FIGS. 7-16 as well, the base 102 includes: a body 106 (e.g., enclosure); hoists 108; an access module 110 (e.g., user box, panel, etc.); a lighting and heating assembly 112, which is waterproof in construction; and a landing platform 114.

The body 106 is the main structural member of the base 102 and supports various internal and external components of the base station 100. For example, the body 106 accommodates: various lights and cameras, such as an indicator light 107; an (emergency) stop 109; one or more vent openings, which support thermal management and heat dissipation; various electrical components (e.g., processors, logic boards, wiring, connectors, etc.); various motors; the access module 110; and the landing platform 114; a temperature control (e.g., heating and cooling) system 116 (FIGS. 7, 14), which is configured to thermally condition (e.g., cool and heat) the base station 100 and the UAV 10 when docked (subject to environmental conditions); one or more internal power sources (e.g., a charging hub 118 (FIG. 16) that is configured for electrical connection to the UAV 10, in which the charging hub 118 may be powered by an external power source (e.g., wall outlet) via wiring routed through a conduit punchout 111 of the stand 105); handles 120, which facilitate transport and/or repositioning of the base station 100; and antennas 145 disposed within the roof assembly 104.

The hoists 108 (FIGS. 9-11) facilitate transport and/or repositioning of the base station 100 (e.g., using a crane or the like) and are connected (secured) to the base 102. In the illustrated embodiment, the base 102 includes a pair of hoists 108. Embodiments in which the particular number of hoists 108 may be increased or decreased are also envisioned herein, however, and would not be beyond the scope of the present disclosure.

Figure 13:
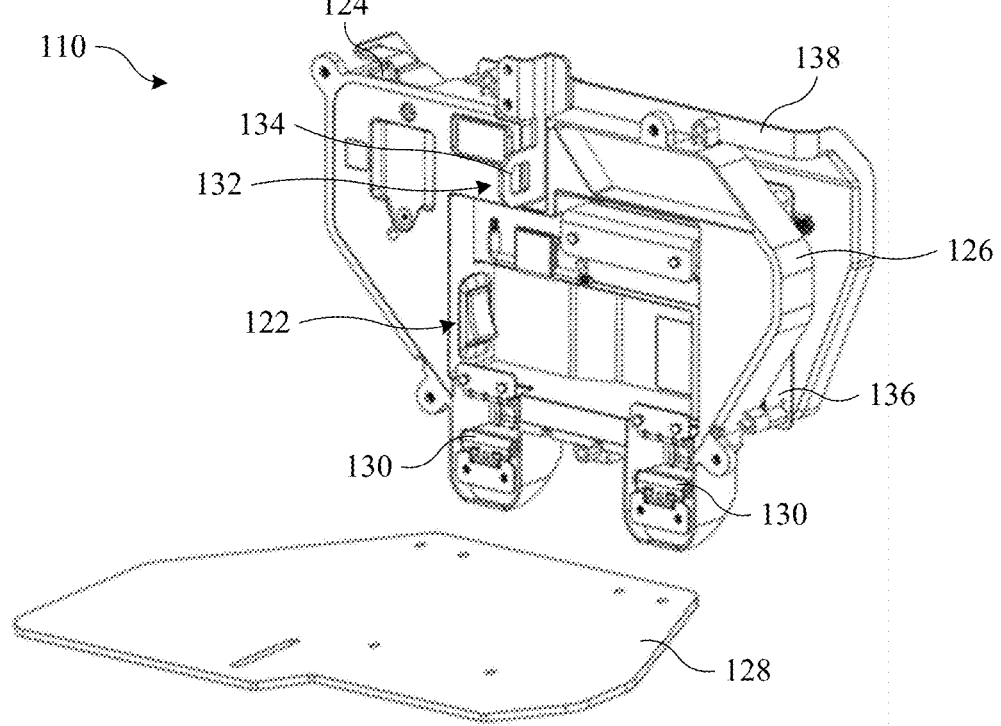
FIG. 13 is a perspective view of the access module.
Figures 14, 15:
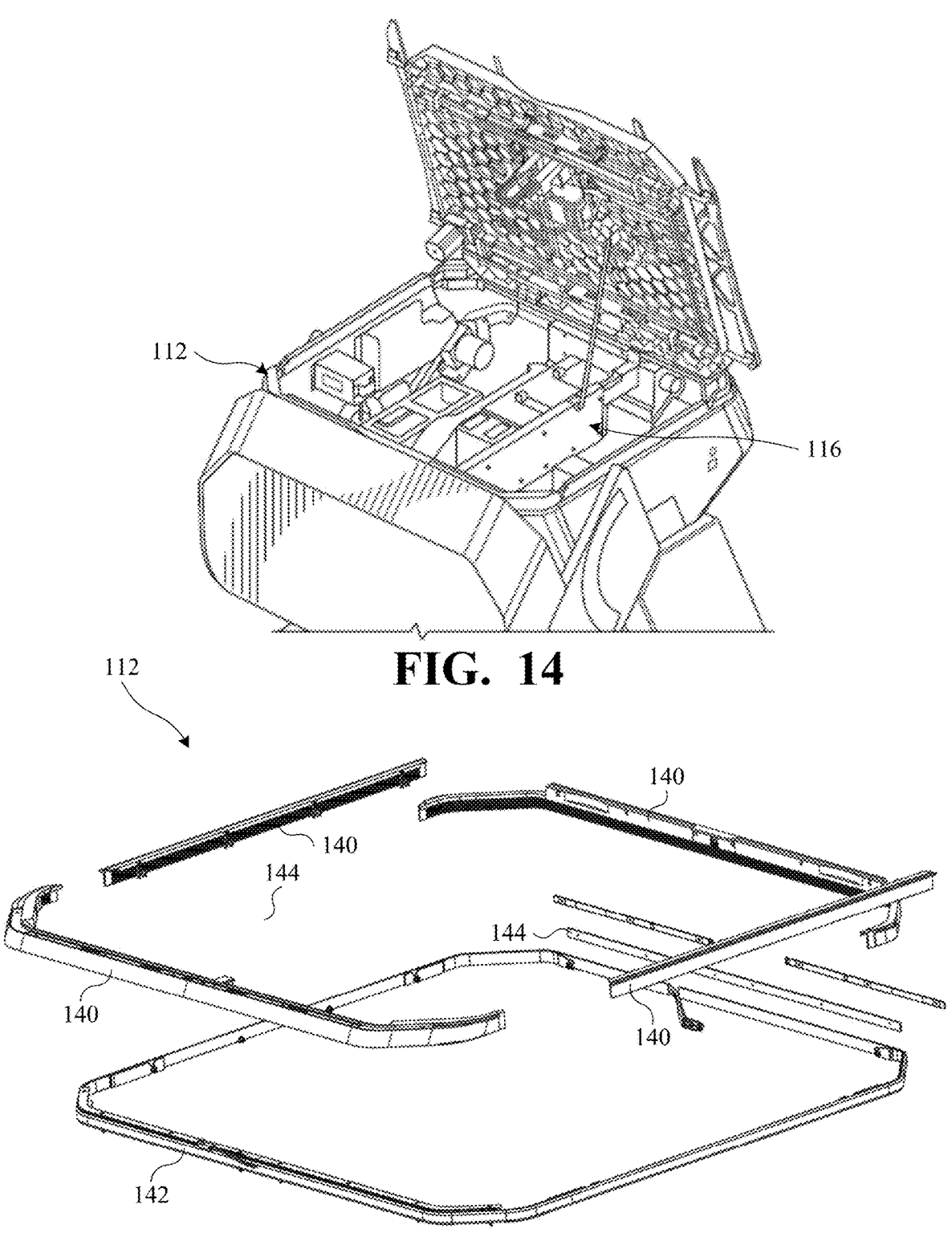
FIG. 14 is a perspective view of the base station illustrating a lighting and heating assembly.
FIG. 15 is a perspective view of the lighting and heating assembly shown separated from the base station.

The access module 110 (FIGS. 1, 2, 10, 13) is connected (secured) to (or otherwise supported by) the body 106 and provides user access to at least one accessibility component 122 including, for example, (one or more) at least one port (e.g., ethernet, USB, etc.), (one or more) at least one switch (e.g., a rocker switch), (one or more) at least one latch (e.g., a roof latch lever 124), etc. As seen in FIG. 13, the access module 110 includes: a box 126, which accommodates the accessibility components 122; a door 128, which is connected to the box 126 such that the door 128 is repositionable between open and closed positions; (one or more) at least one hinge member 130, which pivotably connects the door 128 to the box 126; a locking member 132 (e.g., a padlock loop 134); a printed circuit board (PCB) 136; and an umbrella 138, which is supported by the box 126 and is configured to inhibit (if not entirely prevent) the entry of water, dust, debris, etc.

The lighting and heating assembly 112 (FIGS. 14, 15) provides a visual indication that the base station 100 is (and/or will become) active and facilitates de-icing of the roof assembly 104 in order to support repositioning of the roof assembly 104 between the closed and open positions. The lighting and heating assembly 112 is generally positioned at (e.g., adjacent to) the perimeter of the base 102 and includes: (one or more) at least one diffuser lens 140; (one or more) at least one light 142 (e.g., an LED strip), which is positioned (located) vertically below the landing platform 114; (one or more) at least one heater 144; and a (wiring) harness.

The landing platform 114 (FIGS. 6, 7, 16) is supported by (e.g., connected (secured) to the body 106 and receives the UAV 10 during docking. More specifically, the landing platform 114 is configured to receive the UAV 10 such that a camera 12 (FIG. 16) (or other such image/video capture device) on the UAV 10 is positioned (located) vertically above the landing platform 114, which establishes line-of-sight between the camera 12 and the interface with the charging hub 118 (e.g., to allow for inspection of the electrical connection between the base station 100 and the UAV 10 upon docking).

Figure 17:
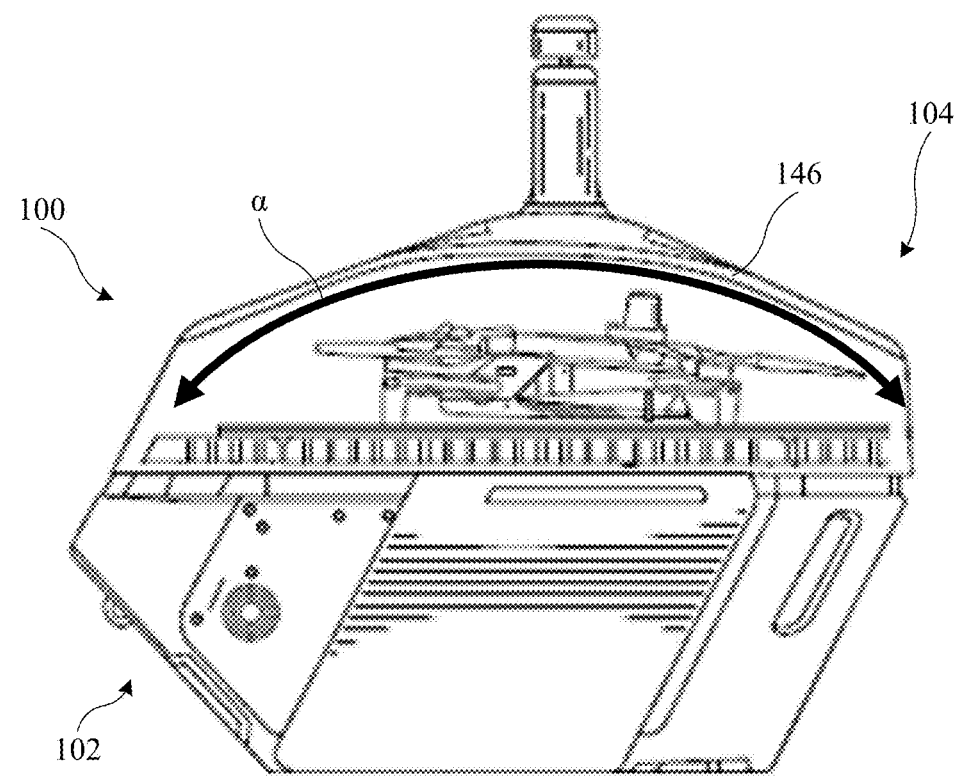
FIG. 17 is a side view of the UAV and the base station with the roof assembly shown in the closed position and illustrating an angular range of motion thereof.
Figure 18:
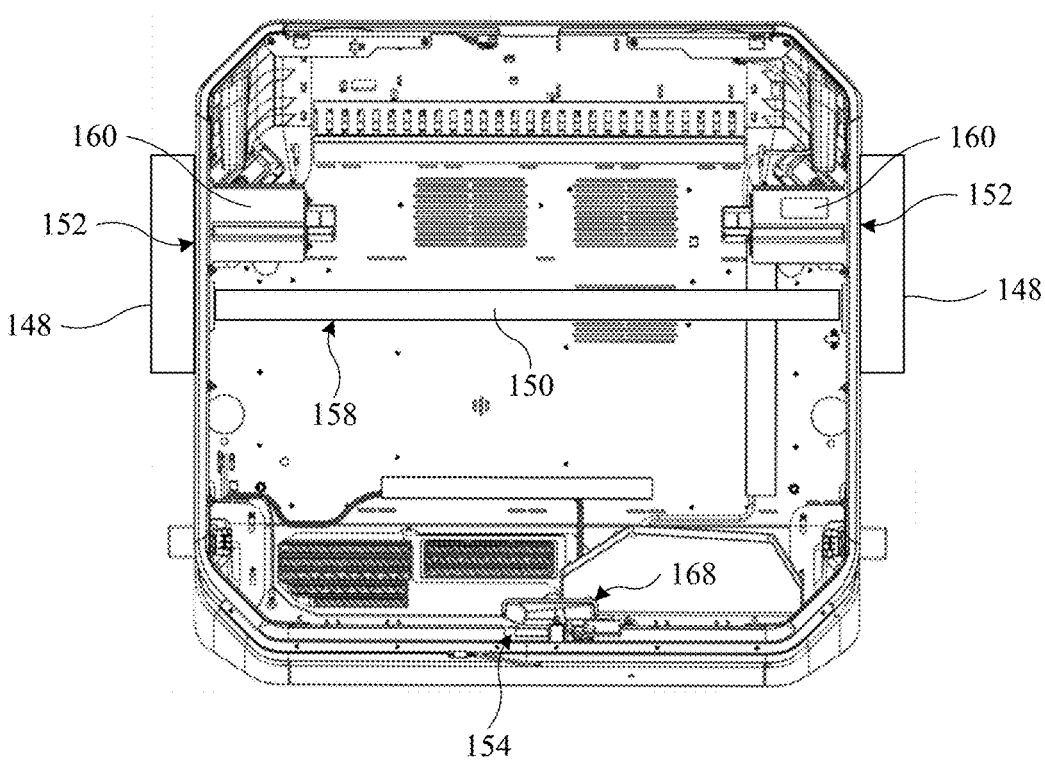
FIG. 18 is a top view of the base station illustrating a drive system of the roof assembly.

Referring now to FIGS. 17-25 as well, the roof assembly 104 will be discussed. The roof assembly 104 is connected (secured) to (or otherwise supported by) the base 102 such, during repositioning of the roof assembly 104 between the closed and open positions, the roof assembly 104 is rotatable through an angular range of motion a (FIG. 17).

Figure 16:
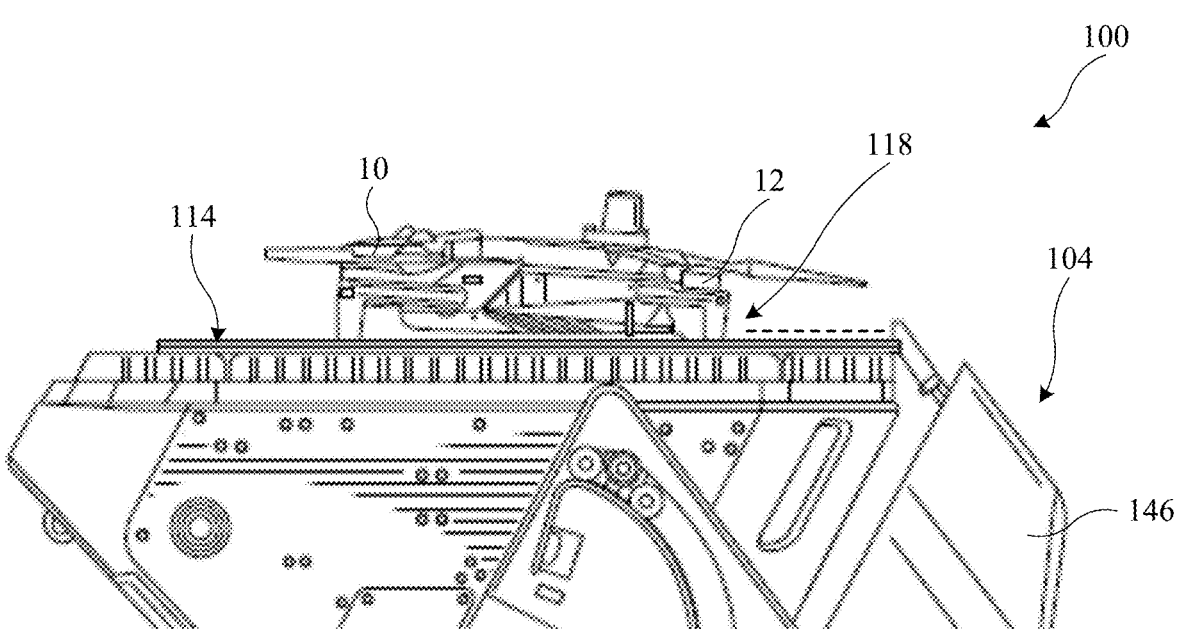
FIG. 16 is a side view of the UAV and the base station with the roof assembly shown in the open position.

In the illustrated embodiment, the roof assembly 104 is configured such that the angular range of motion a lies substantially within the range of approximately 110 degrees to approximately 120 degrees (e.g., 117 degrees), which allows the roof assembly 104 to be positioned substantially or entirely below the landing platform 114 in the open position with respect to an elevational axis (e.g., an elevation direction extending up and down with respect to the base station 100, as seen in FIG. 16, and inhibits (if not entirely prevents) contact between the roof assembly 104 and the UAV 10. Embodiments in which the roof assembly 104 may be configured such that the angular range of motion a lies outside of the disclosed range are also envisioned herein (e.g., depending upon the particular configuration of the UAV 10), however, and would not be beyond the scope of the present disclosure. That is, a variety of angular ranges of motion of the roof assembly 104 may be possible based on the teachings herein.

In order to inhibit (if not entirely prevent) unintended repositioning of the roof assembly 104 into the open position (e.g., in the event of power loss), it is envisioned that the base station 100 may include the aforementioned (emergency) stop.

The roof assembly 104 includes: a cover 146; ears 148, which connect the cover 146 to the base 102 and support repositioning of the roof assembly 104 between the closed and open positions (i.e., movement through the angular range of motion a); a pivot shaft 150; a drive system 152; a locking mechanism 154; and (one or more) at least one camera 156 (FIGS. 1, 4) (or other such image/video capture device), which facilitates inspection during repositioning of the roof assembly 104 between the closed and open positions. The roof assembly 104 may further include one or more sensors coupled to or otherwise disposed in the cover 146, such as a wind sensor 113 and/or a rain sensor 115.

The pivot shaft 150 is connected (secured) to and supports the ears 148 during repositioning of the roof assembly 104 between the closed and open positions. The pivot shaft 150 defines a channel 158 (FIG. 18), which is configured to receive (one or more) data and/or power transition members (e.g., wire(s), cable(s), flexible printed circuits, etc.).

In the illustrated embodiment, the pivot shaft 150 is configured such that the channel 158 defines an inner diameter that lies substantially within the range of approximately 30 mm to approximately 50 mm (e.g., approximately 45 mm). Embodiments in which the pivot shaft 150 may be configured such that the inner diameter of the channel 158 lies outside of the disclosed range also envisioned herein, however, and would not be beyond the scope of the present disclosure.

Figure 19:
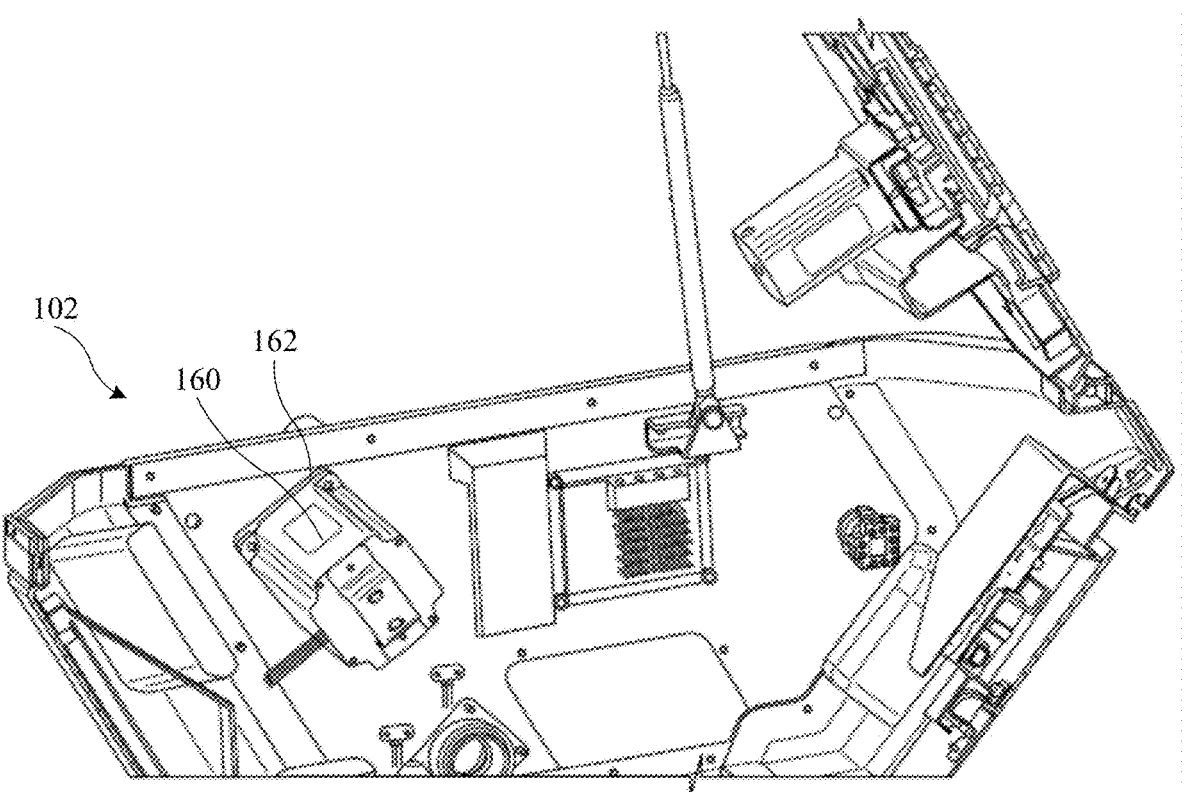
FIG. 19 is a perspective view of the base station illustrating the drive system of the roof assembly.
Figure 20:
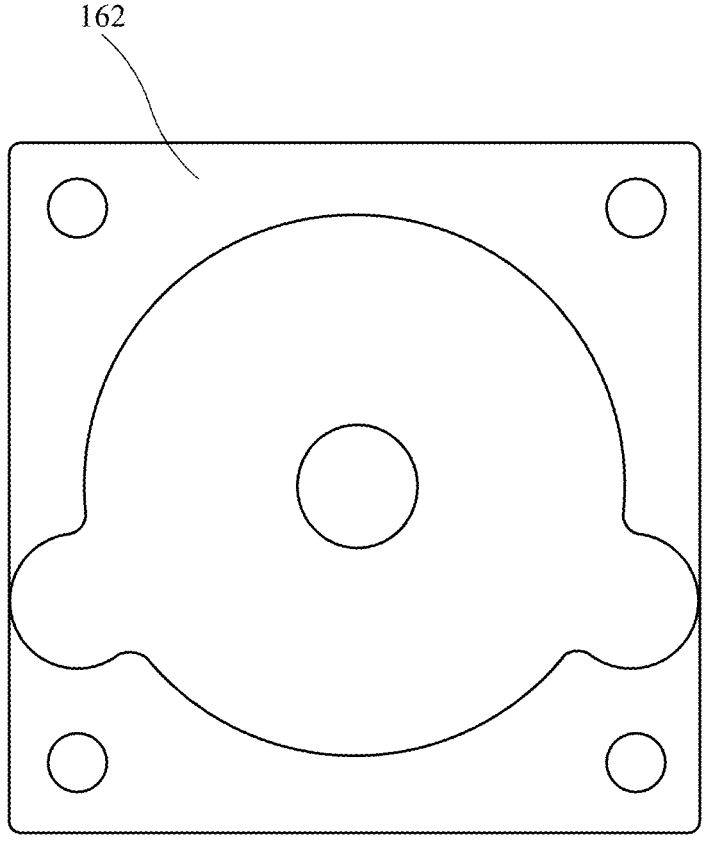
FIG. 20 is a side view of a spacer.
Figure 21:
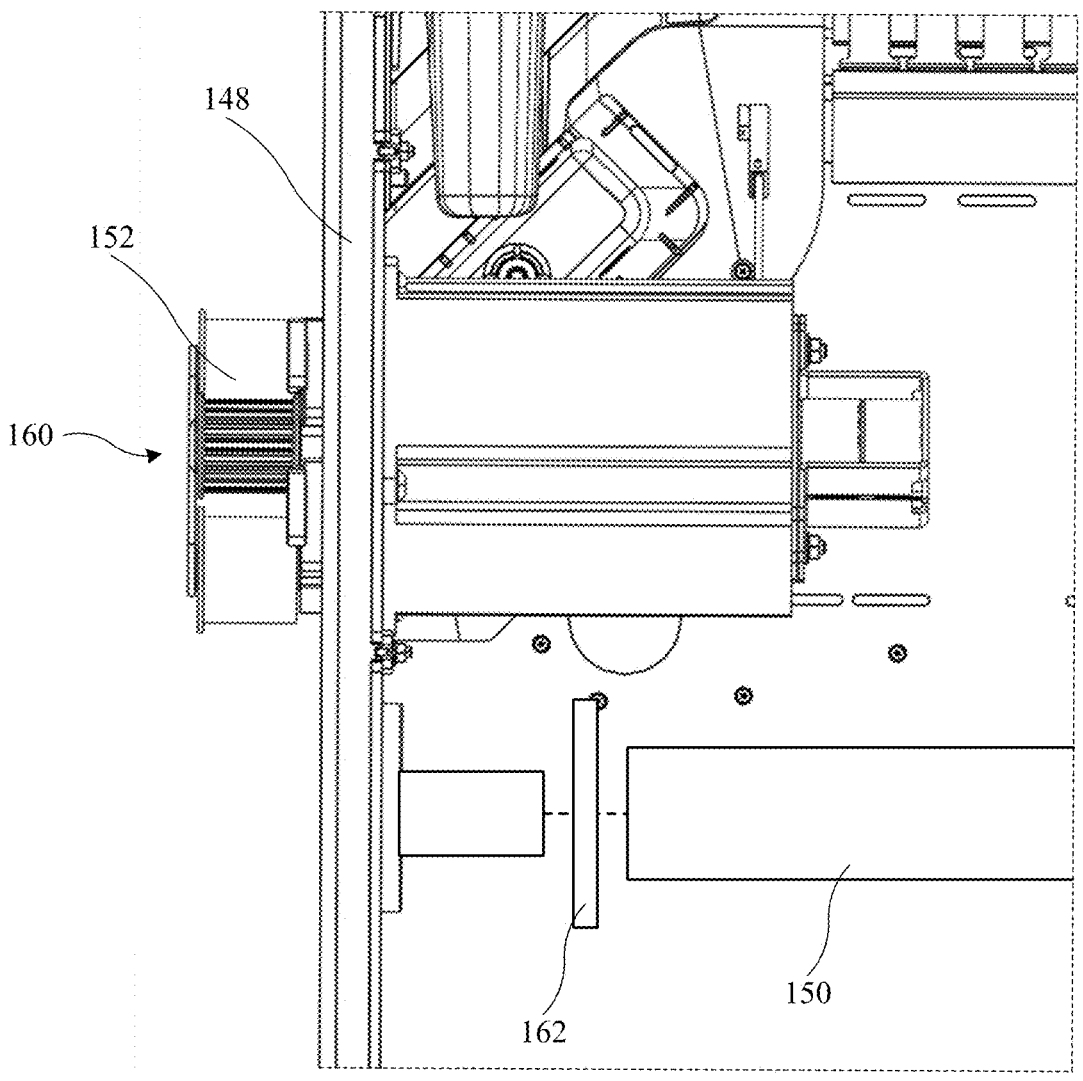
FIG. 21 is a top view of the base station during the installation of a pivot shaft.
Figure 22:
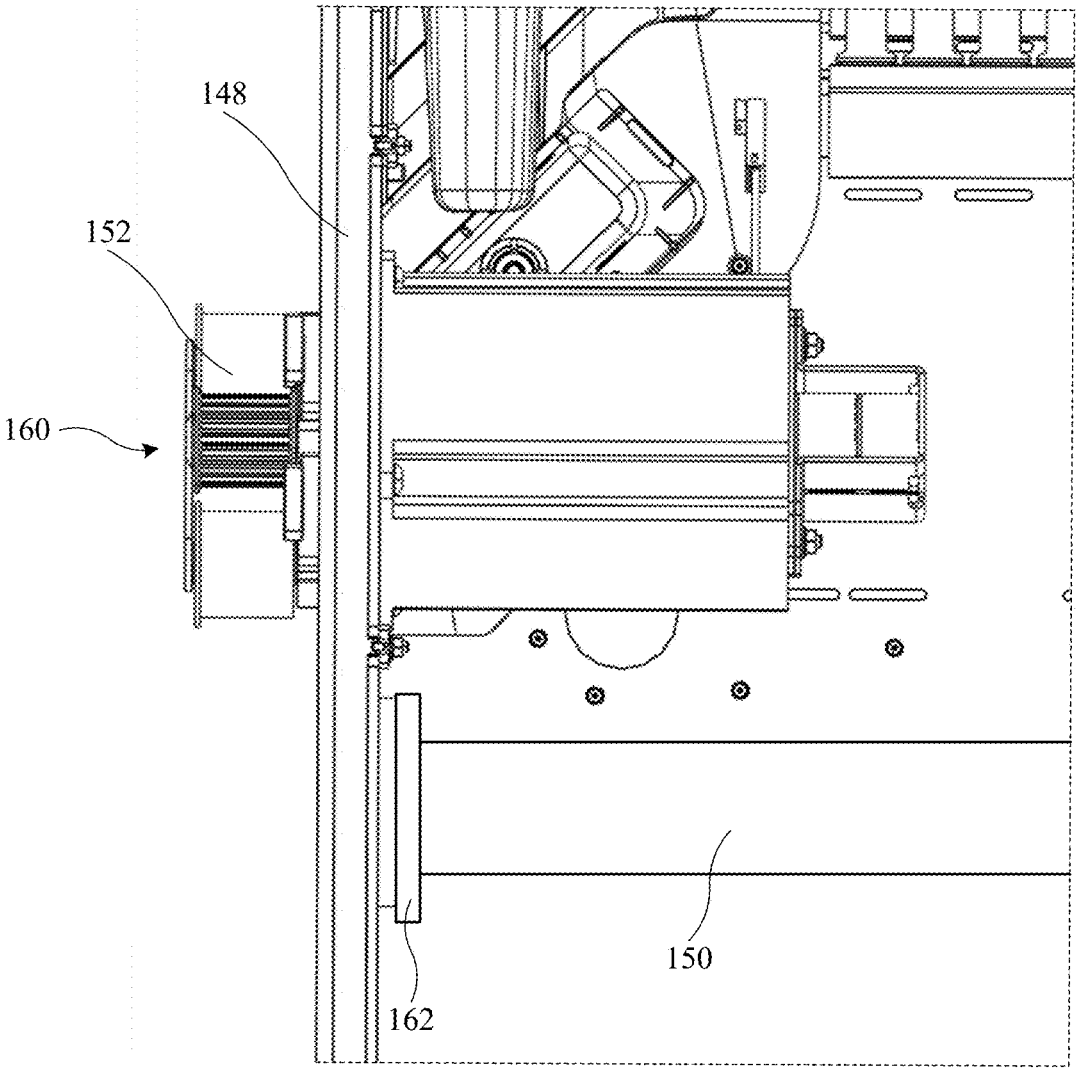
FIG. 22 is a perspective view of the base station upon installation of the pivot shaft.
Figure 23:
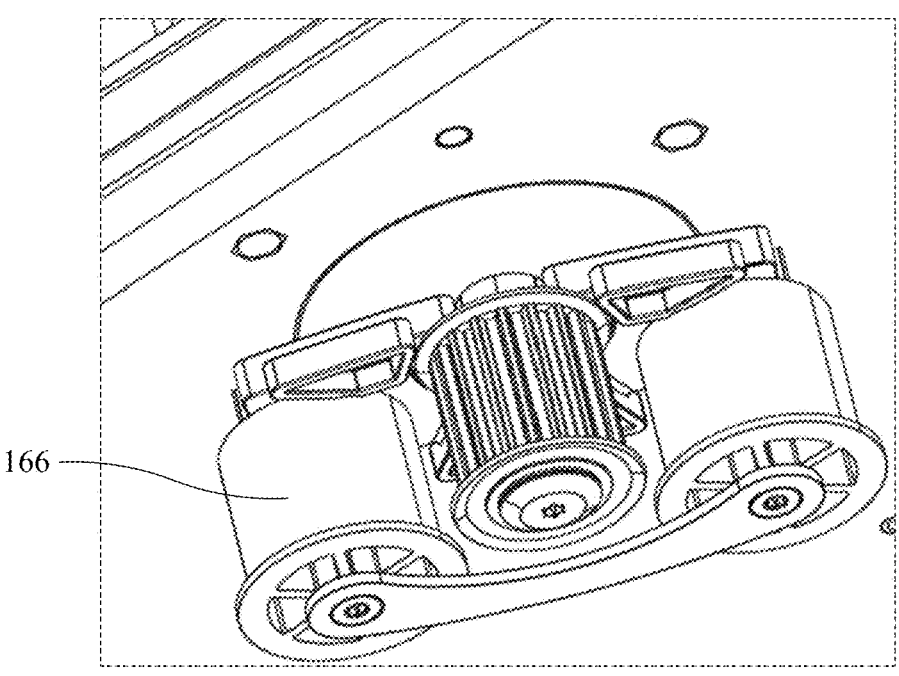
FIG. 23 is a perspective view of the drive system of the roof assembly.
Figure 24:
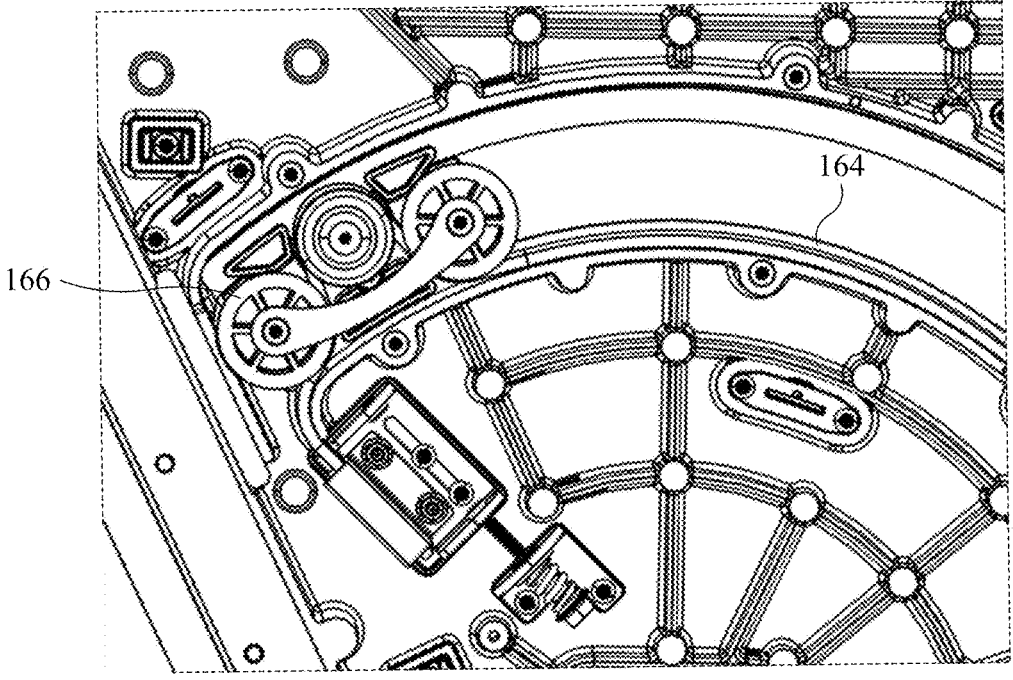
FIG. 24 is a perspective view of the drive system of the roof assembly.

The drive system 152 engages the ears 148 and is configured to rotate the ears 148 in relation to the base 102 during repositioning of the roof assembly 104 between the closed position and the open position. The drive system 152 includes: (one or more) at least one motor (actuator) 160; (one or more) one or more spacers 162 (FIGS. 19, 20); (one or more) at least one belt 164 (FIGS. 23, 24), which engages (contacts) the motors 160; (one or more) at least one pulley 166, which supports the belts 164; (one or more) at least one damper, which is configured to absorb force during repositioning of the roof between the closed and open positions; and (one or more) at least one limit sensors.

The motors 160 are connected (secured) to the base 102 and are configured to drive the roof assembly 104 during repositioning between the closed and open positions. In the illustrated embodiment, the base station 100 includes a pair of motors 160. Embodiments in which the particular number of motors 160 may be increased or decreased are also envisioned herein (e.g., depending upon the size and/or the configuration of the roof assembly 104), however, and would not be beyond the scope of the present disclosure.

The spacers 162 are positioned (located) between and separate the motors 160 and the base 102. The spacers 162 correspond in number to the motors 160 and are in general (radial) alignment therewith. As such, in the illustrated embodiment, the base station 100 includes a pair of spacers 162. Embodiments in which the particular number of spacers 162 may be increased or decreased are also envisioned herein (e.g., depending upon the particular number of motors 160), however, and would not be beyond the scope of the present disclosure.

As seen in FIG. 20, the spacers 162 each includes a generally symmetrical configuration, which allows for the use of identical ones of the spacers 162, thereby obviating the need for distinct (different) components and simplifying the manufacturing and assembly of the base station 100.

Figure 25:
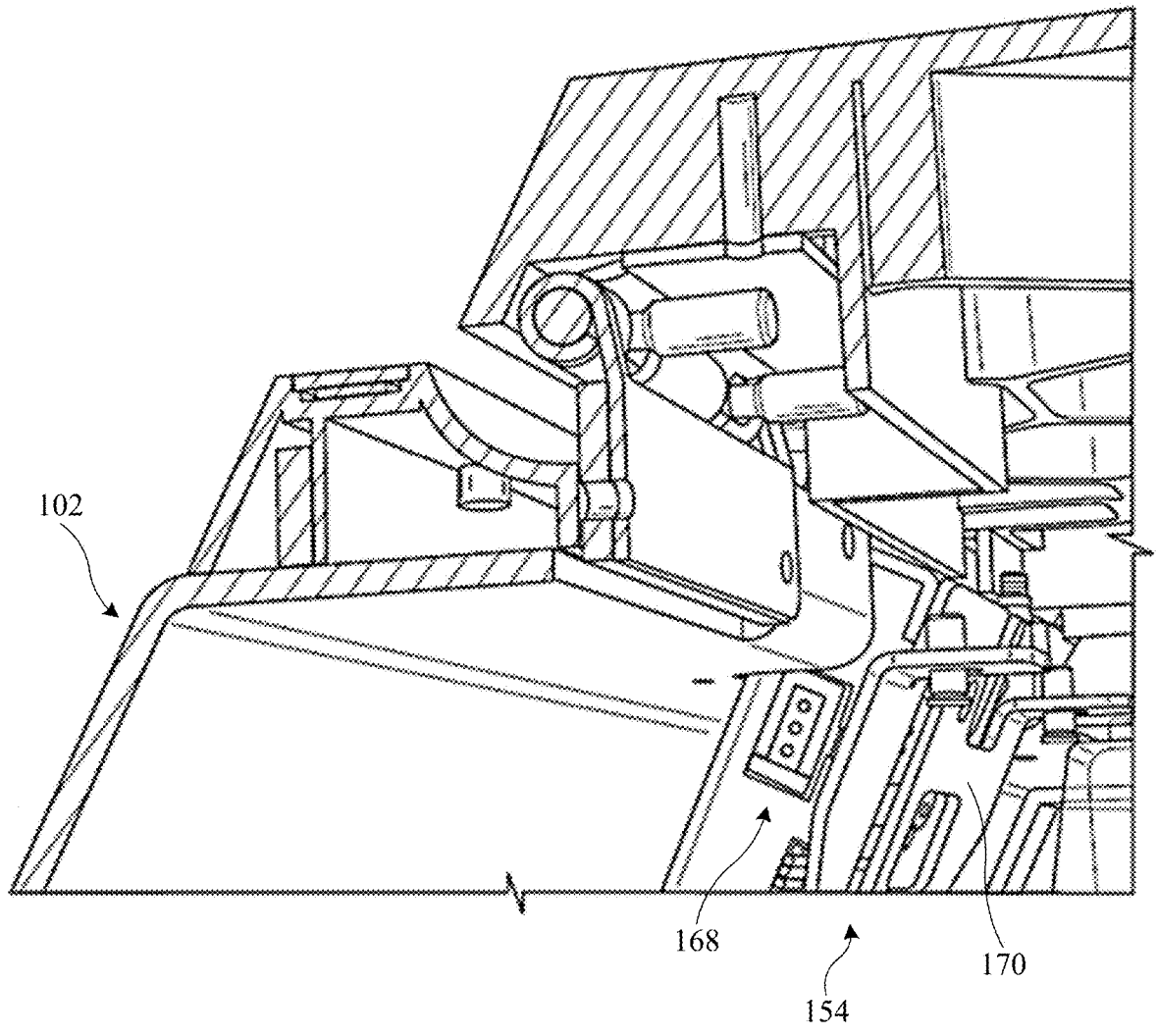
FIG. 25 is a perspective view of the base station illustrating a roof latch of the roof assembly.

The locking mechanism 154 (FIGS. 18, 25) includes a roof latch 168, which is connected (secured) to the base 102 via a bracket 170 (FIG. 25). The roof latch 168 is configured for engagement (contact) with the roof latch lever 124 (FIG. 13) such that the roof latch 168 is (manually) repositionable from a locked position into an unlocked position upon the application of sufficient force to the roof latch lever 124.

Figure 26:
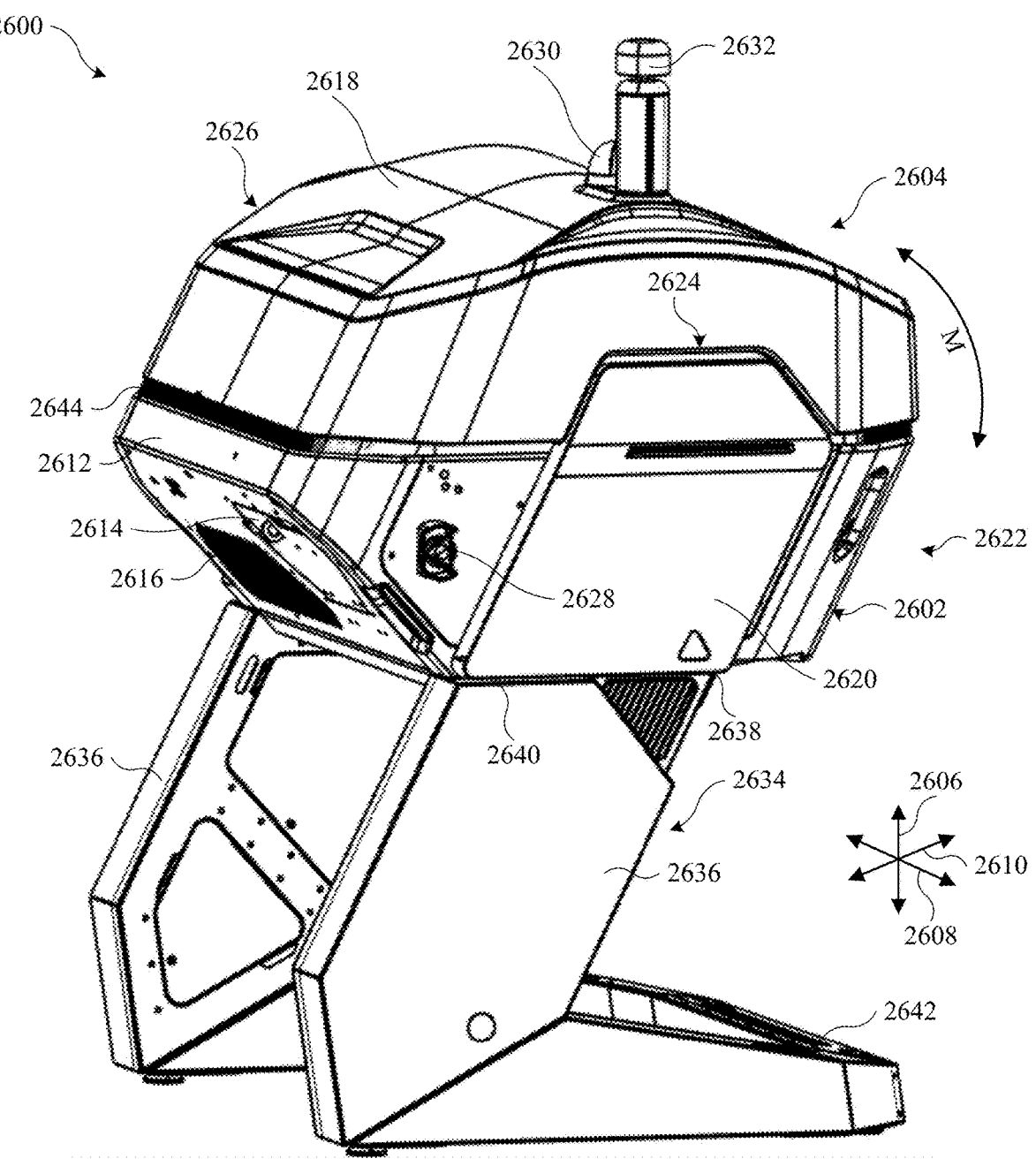
FIG. 26 is a perspective view of another example of a base station illustrating a roof assembly of the base station in a closed position.

FIG. 26 illustrates a perspective view of another example of a base station 2600. The base station 2600 may be similar to the base station 100 of FIGS. 1-25 described above unless otherwise stated. By way of example, the base station 2600 may also include a base 2602 and a roof assembly 2604 movably coupled to the base 2602. As discussed further below, the roof assembly 2604 may be movable between an open position, in which the roof assembly 2604 exposes an interior region of the base 2602, and a closed position, in which the roof assembly 2604 at least partially encloses the interior region of the base 2602. FIG. 26 illustrates the closed position of the roof assembly 2604.

The base station 2600 may be configured to house and/or support a UAV, such as the UAV 10. For example, the base 2602 may be or may include a landing platform (e.g., similar to the landing platform 114 of the base station 100). During operation (e.g., flight) of the UAV 10, the UAV 10 may commence a landing sequence, such as based upon recognition of the landing platform and/or one or more fiducial markings thereon, and land on the landing platform. That is, the UAV 10 may be docked on the landing platform and supported by the landing platform.

When the UAV 10 is docked, the roof assembly 2604 may be configured to move to the closed position shown in FIG. 26 to enclose the landing platform and the UAV 10 supported thereon to protect both the landing platform and the UAV 10 from environmental conditions (e.g., precipitation, debris, sunlight, etc.) When an operator wishes to initiate takeoff of the UAV 10 from the landing platform, the roof assembly 2604 may be actuated to move to the open position, whereby the roof assembly 2604 may be located at least partially below the landing platform with respect to an elevational direction 2606 of movement (e.g., an up-and-down direction). For illustrative purposes, the elevation direction 2606 may be considered movement along or parallel to a Z-axis of the base station 2600, which may be transverse to a lateral direction 2608 of movement (e.g., side-to-side movement along or parallel to an X-axis of the base station 2600) and transverse to a longitudinal direction 2610 of movement (e.g., front-to-back movement, or vice versa, along or parallel to a Y-axis of the base station 2600). As such, when the roof assembly 2604 is in the open position, the landing platform—and thus the UAV 10—are unobstructed by the roof assembly 2604 to facilitate takeoff and landing of the UAV 10.

The base 2602 may include a body 2612 that supports the landing platform. The body 2612 may substantially form an overall shape and housing of the base 2602. As discussed further below, the body 2612 may define a cavity therein, which may contain one or more components of the base station 2600, such as the landing platform and at least a portion of the drive system that actuates the roof assembly 2604. Additionally, the body 2612 may be movably coupled to the roof assembly 2604 and may help facilitate movement of the roof assembly 2604 between the open position and the closed position.

As mentioned above, the body 2612 may include and/or house one or more components of the base station 2600. By way of example, the body 2612 store one or more electrical components of the base station 2600, such as a control module, wiring (e.g., power and/or data wiring), one or more sensors (e.g., contact sensors, humidity sensors, temperature sensors, etc.), or a combination thereof. Such electrical components may be accessible from outside the base station 2600 via an access module 2614 of the body 2612. The access module 2614 may be an access panel, which may open to allow a user to access or otherwise communicate with the electrical components of the base station 2600. For example, the access module 2614 may be opened to expose a port, whereby the user may connect an external electronic device (e.g., laptop, tablet, mobile phone, etc.) to an electrical system of the base station 2600 via a connector connected to the port to thereby establish a communication path between the electronic device and the electrical system.

Additionally, due to potentially heightened operating temperatures of such an electrical system, the body 2612 may also include venting 2616 to dissipate such heat and ensure that the electrical system of the base station 2600 does not overheat. The venting 2616 may be slits, cutouts, or other openings to promote air flow between the interior region of the body 2612 (e.g., the cavity storing the electronic components therein) and an external environment. In some configurations, the base 2602 may also include one or more heat sinks to further promote heat dissipation from the body 2612. In an example, the electronic components of the base station 2600 may include one or more printed circuit boards (PCBs), which may be coupled to one or more heat sinks located within the body 2612. The one or more heat sinks may be coupled to the body 2612 such that heat generated by the PCBs may be transferred through the one or more heat sinks to the body 2612, at which point the heat may be dissipated into the external environment.

As discussed above, the roof assembly 2604 may be movable coupled to the base 2602. As shown in FIG. 26, the roof assembly 2604 may include a cover 2618 and one or more ears, such a first ear 2620 coupled to the cover 2618 and movably coupled to the body 2612. For example, the first ear 2620 may be coupled to a first side 2622 (e.g., a first lateral side) of the cover 2618, such as within a groove 2624 defined by the cover 2618 and located on the first side 2622 of the cover 2618. The first ear 2620 may extend downward from the cover 2618 with respect to the elevational direction 2606 and coupled to the first side 2622 of the base 2602 (e.g., the first side 2622 of the body 2612) to establish a pivot therebetween.

The roof assembly 2604 may further include a second ear, which may be similar to the first ear 2620 described above, that is coupled to an opposing second side 2626 of the cover 2618. For example, the second ear may extend downward from the cover 2618 with respect to the elevational direction 2606 and may be coupled to the opposing second side 2626 of the base 2602 (e.g., the opposing second side 2626 of the body 2612) to establish a pivot therebetween. Thus, based on actuation by the drive system of the base station 2600, the first ear 2620 and the second ear may facilitate movement of the roof assembly 2604 in a direction of movement (M)

between the closed position and the open position. That is, the roof assembly 2604 may be rotatable through an angular range of motion that is defined by one or more ears of roof assembly 2604, such as the first ear 2620 and the second ear. For example, the roof assembly 2604 may be rotatable through the angular range of motion, which may be substantially within a range of approximately 110 degrees to approximately 120 degrees during repositioning of the roof assembly 2604 between the closed position and the open position. However, such a range of motion is not limited and could be tuned to any desired range of motion. For example, the roof assembly 2604 may be rotatable through an angular range of motion that may be within the range of approximately 60 degrees or more to approximately 180 degrees or less.

Actuation of the roof assembly 2604 may be done manually and/or remotely. For manual operation, the base station 2600 may include a manual override state in which a user may manually articulate the roof assembly 2604 between the closed position and the open position.

For example, the base station 2600 may enter the manual override state for maintenance or during a power outage. However, it is envisioned that the roof assembly 2604 may generally be actuated remotely. For example, when the UAV 10 initiates a takeoff sequence, the takeoff sequence may include communicating with the base station (e.g., via wireless or wired communication) so that the roof assembly 2604 may be actuated in the direction of movement (M) to the open position. Similarly, when the UAV 10 lands on the landing platform, the base station 2600 may detect the UAV 10 (or the UAV 10 may communicate with the base station 2600 that it has landed), at which point the roof assembly 2604 may be actuated in the direction of movement (M) to the closed position.

Moreover, a user may actuate the roof assembly 2604 based upon user input, such as via an external electronic device in communication with the base station 2600 and/or a user interface disposed on the base station 2600, such as the first user interface 2628. For example, the first user interface 2628 may be disposed along an exterior surface of the body 2612, such as along the first side 2622 and/or the opposing second side 2626 of the body 2612. The user may interact with the first user interface 2628 (e.g., push, contact, slide, switch, etc.) to activate movement of the roof assembly 2604.

Similarly, in certain circumstances the user may wish to manually stop actuation of the roof assembly 2604. For example, the user may wish to initiate an emergency stop of the roof assembly 2604 midway through actuation of the roof assembly 2604 between the open position and the closed position. In such a case, the user may stop movement of the roof assembly 2604 between the closed position and the open position by interacting with the first user interface 2628.

As discussed above, the base station 2600 may include one or more electrical components that are disposed within the cavity of the body 2612. The base station 2600 may further include one or more electrical components, such as one or more sensors, along an exterior of the body 2612 and/or the cover 2618. For example, as shown in FIG. 26, the roof assembly 2604 may include a rain sensor 2630 (e.g., to detect rain or a severity thereof) and a wind sensor 2632 (e.g., to detect wind or a severity thereof) coupled to an exterior surface of the cover 2618, such as along a top exterior surface of the cover 2618 so that the rain sensor 2630 and the wind sensor 2632 are located above substantially all of the base station 2600 in the elevational direction

2606. As such, the rain sensor 2630 and the wind sensor 2632 may detect rain and wind, respectively, substantially unencumbered by the base station 2600. It should be noted that type of sensor may be disposed along the exterior surface of the base station 2600. For example, the base station 2600 may include one or more contact sensors, one or more pressure sensors, one or more temperature sensors, other sensors, or a combination thereof disposed along the exterior surface of the base station 2600.

Turning back to FIG. 26, the first ear 2620 and the second ear may be coupled to the body 2612 such that the roof assembly 2604 is movable (e.g., in the direction of movement (M)) between the closed position, in which the cover 2618 is configured to enclose the landing platform and the UAV 10 supported thereon, and an open position, in which the cover is located at least partially below the landing platform (e.g., below the body 2612) with respect to the elevational direction 2606 such that the landing platform is unobstructed by the cover 2618 to facilitate takeoff and landing of the UAV 10. To facilitate such articulation of the roof assembly 2604, the base 2602 may be coupled to a stand 2634.

The stand 2634 may include one or more legs, such as the legs 2636, which may support the base 2602 and thus also support the roof assembly 2604. For example, a lower surface 2638 of the body 2612 may be supported along an upper surface 2640 of the legs 2636. The legs 2636 may substantially define a clearance height for articulation of the roof assembly 2604. That is, the legs 2636 may extend upward in the elevational direction 2606 such that the base 2602 is raised above the ground to thereby provide an area in which the roof assembly 2604 is free to articulate at least partially beneath the body 2612 (e.g., in the open position). The legs 2636 may also be coupled to one another and/or further structurally reinforced by a frame 2642. As shown in FIG. 26 the frame 2642 may extend between the legs 2636 to improve stability of the stand 2634.

To further improve operation of the base station 2600, the base station 2600 may include indicator lighting 2644 extending at least partially around a perimeter (e.g., a periphery) of the base 2602. The indicator lighting 2644 may remain unobstructed by the roof assembly 2604 when the roof assembly 2604 is in the open position and when the roof assembly 2604 is in the closed position. That is, the indicator lighting 2644 may remain unobstructed by the roof assembly 2604 before, during, and after actuation of the roof assembly 2604. As such, the indicator lighting 2644 may provide a visual indication of activity of the base station 2600. In an example, the indicator lighting 2644 may illuminate during opening and/or closing of the roof assembly 2604.

Similarly, the indicator lighting 2644 may illuminate when the UAV 10 is docked within the base station 2600, when the base station 2600 is receiving power from an external power source, when the base station 2600 is malfunctioning, or a combination thereof. Illumination herein by the indicator lighting 2644 may be considered any lighting provided by the indicator lighting 2644 in any color, pattern (e.g., rate of pulsing), intensity, or a combination thereof. The indicator lighting 2644 may also be any lighting component that may facilitate such illumination, such as, for example, an LED panel (e.g., a backlit and/or edge-lit LED panel), fluorescent lighting, LED strips, or a combination thereof. However, the indicator lighting 2644 is not limited to any particular lighting component.

Figure 27:
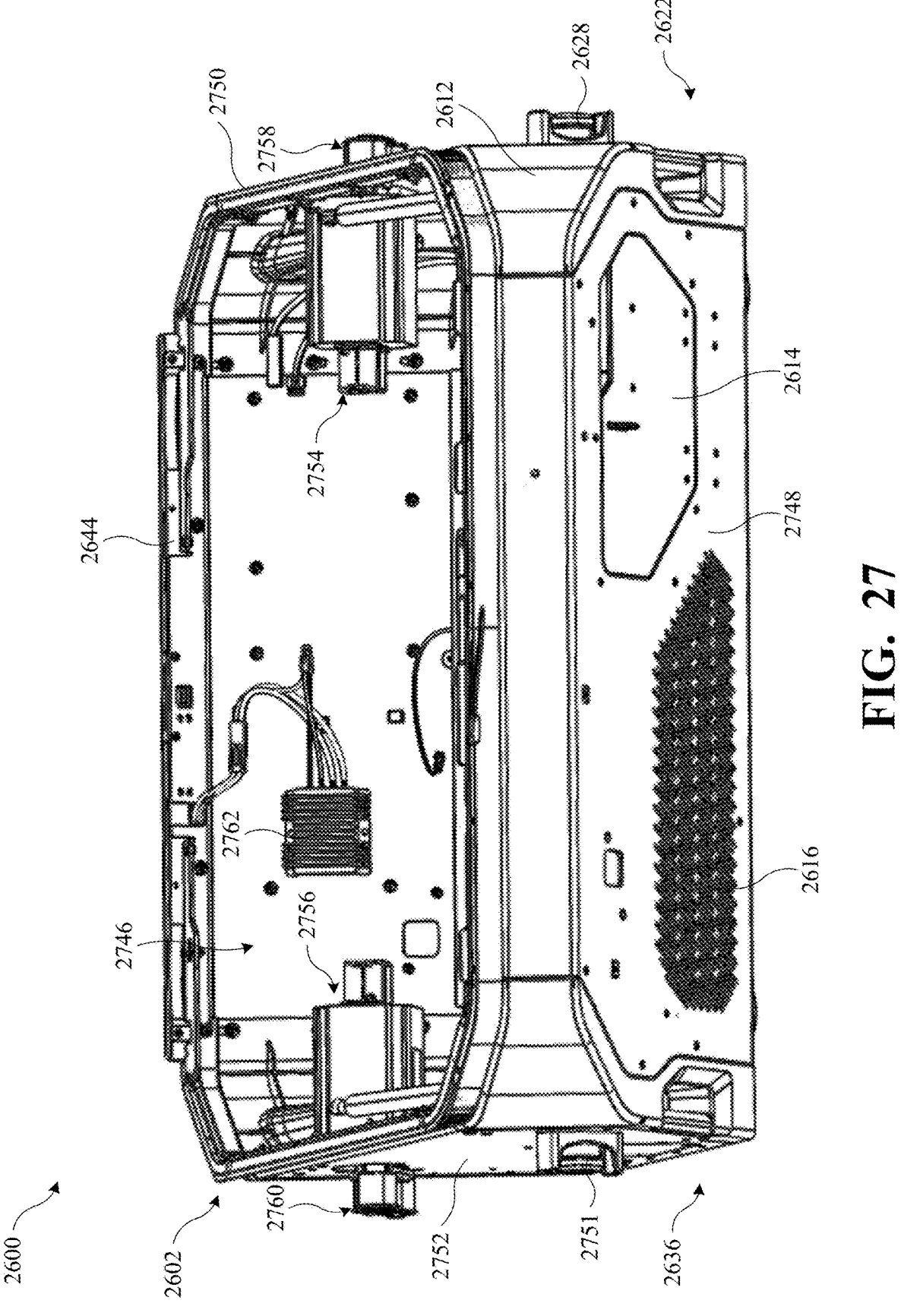
FIG. 27 is a perspective view of a base of the base station shown in FIG. 26.
Figure 28:
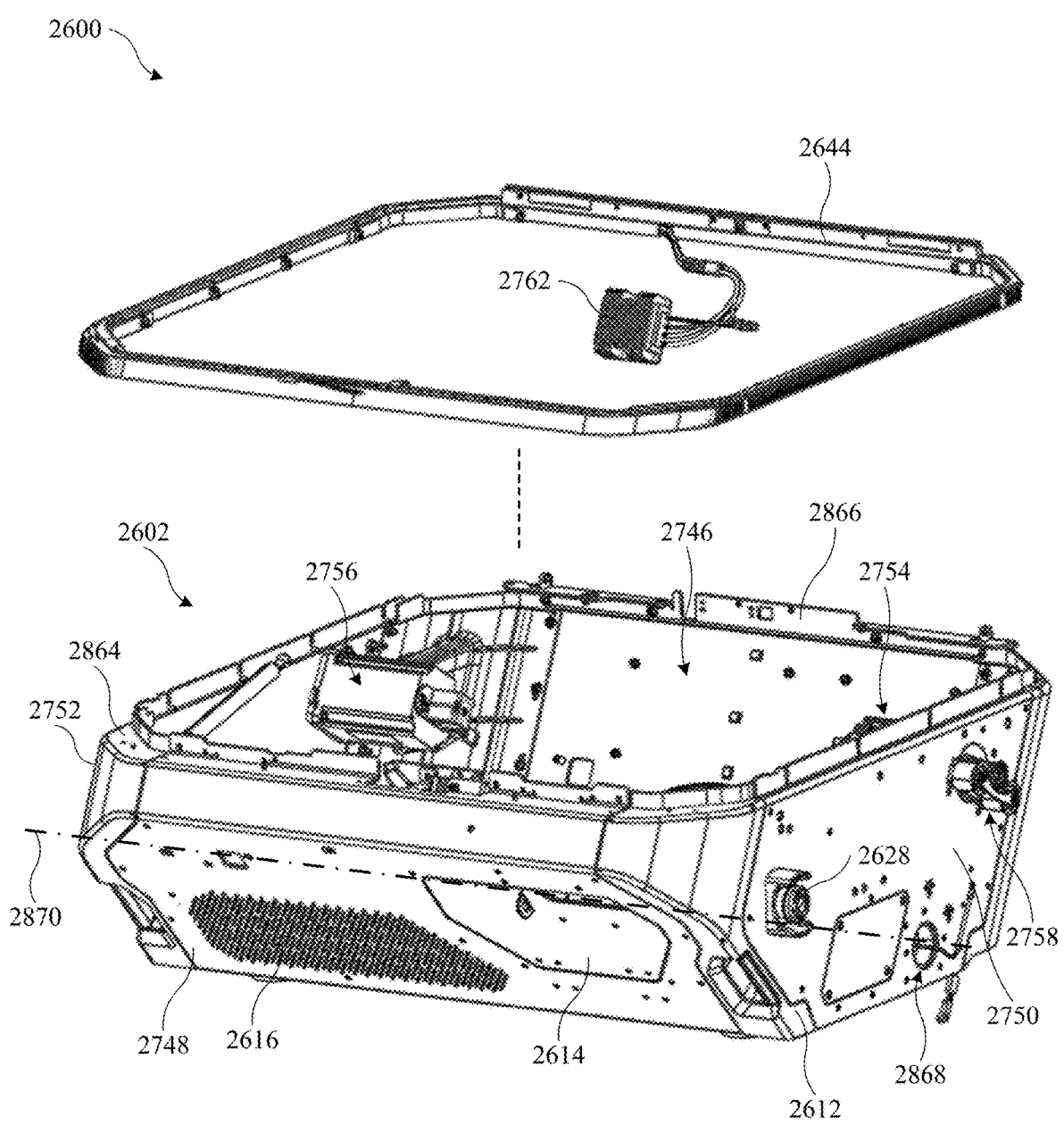
FIG. 28 is a partially exploded view of the base shown in FIG. 27.

FIG. 27 illustrates a perspective view of the base 2602 of the base station 2600. FIG. 28 illustrates a partially exploded view of the base 2602. The roof assembly 2604 and the landing platform have been removed for illustrative purposes and clarity. As discussed above, the base 2602 may include the body 2612, which may define a cavity 2746 therein. The body 2612 may form an overall housing of the body 2612 to contain one or more electrical components therein. The body 2612 may also include the access module 2614 and/or the venting 2616 to facilitate improved connectivity and operation, respectively, of the electrical system of the base station 2600. For example, the access module 2614 and the venting 2616 may be located along an exterior surface of a front panel 2748 of the body 2612. The body 2612 may further include one or more user interfaces, such as the first user interface 2628 disposed along the first side 2622 of the body 2612 (e.g., along a first side panel 2750 of the body 2612) and a second user interface 2751 disposed along the opposing second side 2626 of the body 2612 (e.g., along a second side panel 2752 of the body 2612), which may operate as described above.

As discussed above, one or more components of the base station 2600 may be disposed within the cavity 2746 of the body 2612. By way of example, at least a portion of a drive system of the roof assembly 2604 may be disposed within the cavity 2746 of the body 2612. For example, the drive system may include a first drive assembly 2754 (e.g., including a first actuator) and a second drive assembly 2756 (e.g., including a second actuator), which may both be disposed substantially within the cavity 2746 of the body 2612. The first drive assembly 2754 may be coupled to and extend at least partially through the first side panel 2750 to communicate with a first retaining mechanism 2758. Similarly, the second drive assembly 2756 may be coupled to and extend at least partially through the second side panel 2752 to communicate with a second retaining mechanism 2760. Though the roof assembly 2604 is not shown for illustrative purposes, the first retaining mechanism 2758 and the second retaining mechanism 2760 may be coupled to the first ear 2620 and the second ear of the roof assembly 2604, respectively, to move the roof assembly 2604 between the closed position and the open position. As such, the first drive assembly 2754 and the second drive assembly 2756 may move the roof assembly 2604 between the closed position, in which the roof assembly 2604 encloses the landing platform and the UAV 10 supported thereon, and the open position, in which the roof assembly 2604 exposes the landing platform to facilitate takeoff and landing of the UAV 10.

Additionally, a lighting module 2762 may also be disposed within the cavity 2746 of the body 2612. For example, the lighting module 2762 may be coupled (e.g., mounted) to an interior surface of the body 2612 and electrically connected to the indicator lighting 2644. As such, the lighting module 2762 may provide power to the indicator lighting 2644, may control one or more operations of the indicator lighting 2644 based upon a status of the base station 2600 (e.g., opening and/or closing of the roof assembly 2604), or both. As such, the lighting module 2762 may be protected within the confines of the cavity 2746 of the body 2612 and maintain electrical connection to the indicator lighting 2644.

The indicator lighting 2644 may also be coupled to the body 2612. For example, as shown in FIG. 28, the indicator lighting 2644 may be disposed along a top edge 2864 of the body 2612 and secured to the body 2612 by a peripheral bracket 2866 projecting (e.g., extending) in the elevational direction 2606 away from the top edge 2864. As such, indicator lighting 2644 may be disposed along the top edge 2864 such that the indicator lighting 2644 remains substantially or entirely unobstructed by the roof assembly 2604 even when the roof assembly 2604 is in the closed position. Moreover, to provide sufficient indication to the user (e.g., to provide a visual indication of activity of the base station 2600), the indicator lighting 2644 may extend around substantially or entirely all of the periphery of the body 2612— and thus the base 2602—as defined by the top edge 2864 of the body 2612.

As discussed above, the first drive assembly 2754 and the second drive assembly 2756 may facilitate actuation of the roof assembly 2604. The drive assemblies, in conjunction with the roof assembly 2604, may define the angular range of motion of the roof assembly 2604 when moving between the open position and the closed position. Additionally, to ensure proper rotation of the roof assembly 2604 with respect to the base 2602, the first side panel 2750 and the second side panel 2752 may each define a pivot opening, such as the pivot opening 2868 of the first side panel 2750 shown in FIG. 28.

The pivot opening 2868 of the first side panel 2750 and the second side panel 2752 may facilitate pivotal engagement between the roof assembly 2604 and the body 2612. As discussed further below, the first ear 2620 of the roof assembly 2604 may be movably coupled to the first side 2622 of the body 2612 by a first pivot shaft projecting from the first ear 2620 into the pivot opening 2868 of the first side panel 2750. Additionally, the second ear of the roof assembly 2604 may be movably coupled to the opposing second side 2626 of the body 2612 by a second pivot shaft projecting from the second ear into the pivot opening 2868 of the second side panel 2752. The first pivot shaft and the second pivot may be coaxial along an axis of rotation 2870 of the roof assembly 2604. As such, the pivot opening 2868 of the first side panel 2750 and the second side panel 2752 may define the axis of rotation 2870 of the roof assembly 2604 to move in the direction of movement (M) between the open position and the closed position.

Figure 29:
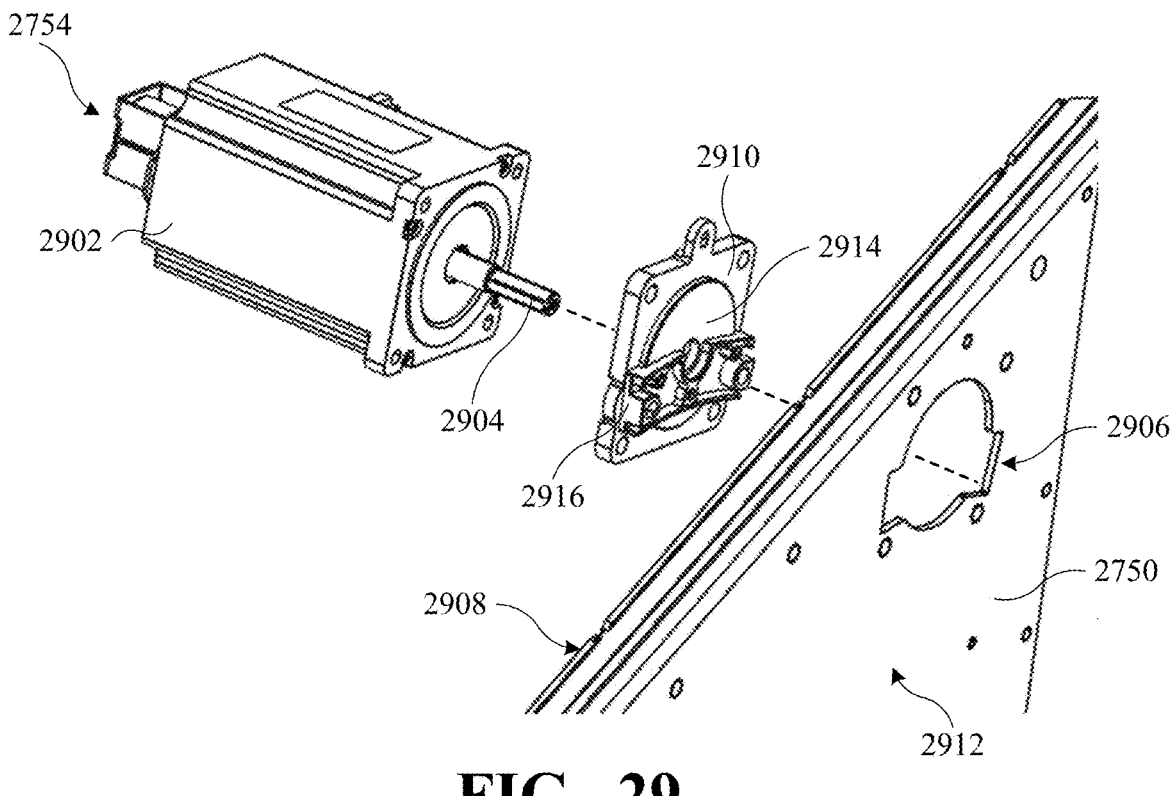
FIG. 29 is a partially exploded view of an actuator assembly of the base station shown in FIG. 26.

FIG. 29 illustrates a partially exploded view of the first drive assembly 2754 of the base station 2600 shown in FIGS. 27 and 28. The second drive assembly 2756 may be similar to the first drive assembly 2754. That is, the description of the first drive assembly 2754 herein may be equally describe the second drive assembly 2756 unless otherwise stated. As discussed above, the first drive assembly 2754 may be coupled to the first side panel 2750 of the body 2612 of the base 2602. The first drive assembly 2754 may also extend at least partially through the first side panel 2750 to communicate with the first retaining mechanism 2758 and thereby articulate the roof assembly 2604 with respect to the base 2602.

The first drive assembly 2754 may include an actuator 2902 that is configured to actuate (e.g., rotate) a drive shaft 2904 of the actuator 2902. The actuator 2902 may be coupled to the first side panel 2750 such that the drive shaft 2904 may extend through an actuator opening 2906 defined by the first side panel 2750. By way of example, the actuator 2902 may be coupled to an interior surface 2908 of the first side panel 2750 by a mounting bracket 2910 such that the drive shaft 2904 extends through the actuator opening 2906 to engage the first retaining mechanism 2758, which may be located adjacent to an exterior surface 2912 of the first side panel 2750 (e.g., external to the cavity 2746 of the body 2612).

The mounting bracket 2910 may include a protruding portion 2914 and a connector 2916. The connector 2916 may formed with (e.g., integrally formed with) or coupled to the protruding portion 2914 such that connector 2916 may at least partially extend through actuator opening 2906 to engage the first retaining mechanism 2758. For example, the protruding portion 2914 may protrude from a surface of the mounting bracket 2910 and may be keyed to a shape of the actuator opening 2906 such that, when the protruding portion is received by the actuator opening 2906, the mounting bracket 2910 and thus the actuator 2902 are prevented from unwanted rotation relative to the body 2612. As such, when the mounting bracket 2910 is coupled to the first side panel 2750, the protruding portion 2914 and the connector 2916 may extend into 2906 and/or at least partially through the actuator opening 2906. The drive shaft 2904 may then extend through the mounting bracket 2910 (e.g., an opening therein) and the actuator opening 2906 to communicate with the first retaining mechanism 2758.

Figure 30:
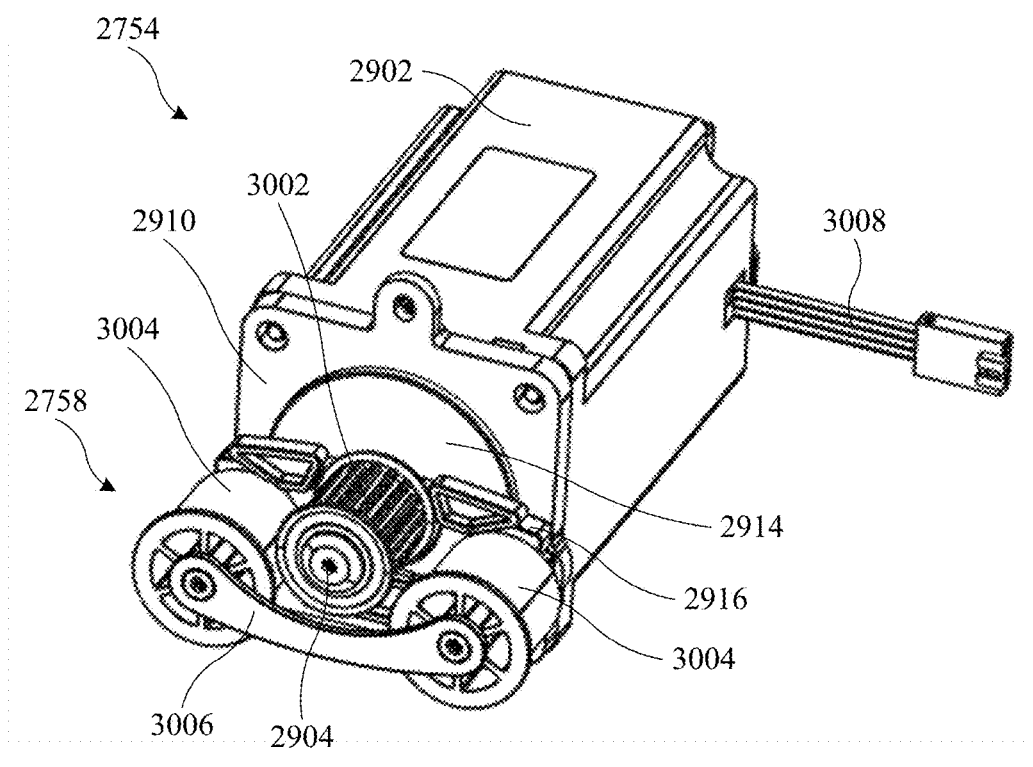
FIG. 30 is a perspective view of the actuator assembly shown in FIG. 29.

FIG. 30 illustrates a perspective view of the first drive assembly 2754 in communication with the first retaining mechanism 2758. As shown in FIG. 30, the drive shaft 2904 of the first drive assembly 2754 may extend through the mounting bracket 2910 to communicate with the first retaining mechanism 2758. In particular, the drive shaft 2904 may be coupled to a gear 3002 such that the drive shaft 2904 may rotate the gear 3002 about an axis of rotation of the drive shaft 2904. As discussed further below, the gear 3002 may be configured to mesh with a belt of the drive system of the roof assembly 2604 such that, based upon rotation of the gear 3002, the belt may be translated along the gear 3002 to drive the roof assembly 2604 between the open and closed positions. The actuator 2902 may be powered by an external power source connected to the actuator 2902 via wiring 3008 therebetween.

The first retaining mechanism 2758 may be mounted to the connector 2916 of the mounting bracket 2910. For example, the first retaining mechanism 2758 may include one or more bushings, such as the bushings 3004, which may be rotatably coupled to the connector 2916 and coupled to one another via a strap 3006. The bushings 3004 may be positioned on opposing sides of the gear 3002 such that the belt of the drive system may be routed around the gear 3002 and between the bushings 3004 (see FIGS. 35A and 35B below). As such, the bushings 3004, at least in part due to the strap 3006, may maintain a desired tension of the belt to ensure that the belt remains engaged (e.g., meshed) with the gear 3002 and thus ensure proper actuation of the roof assembly 2604.

Figure 31:
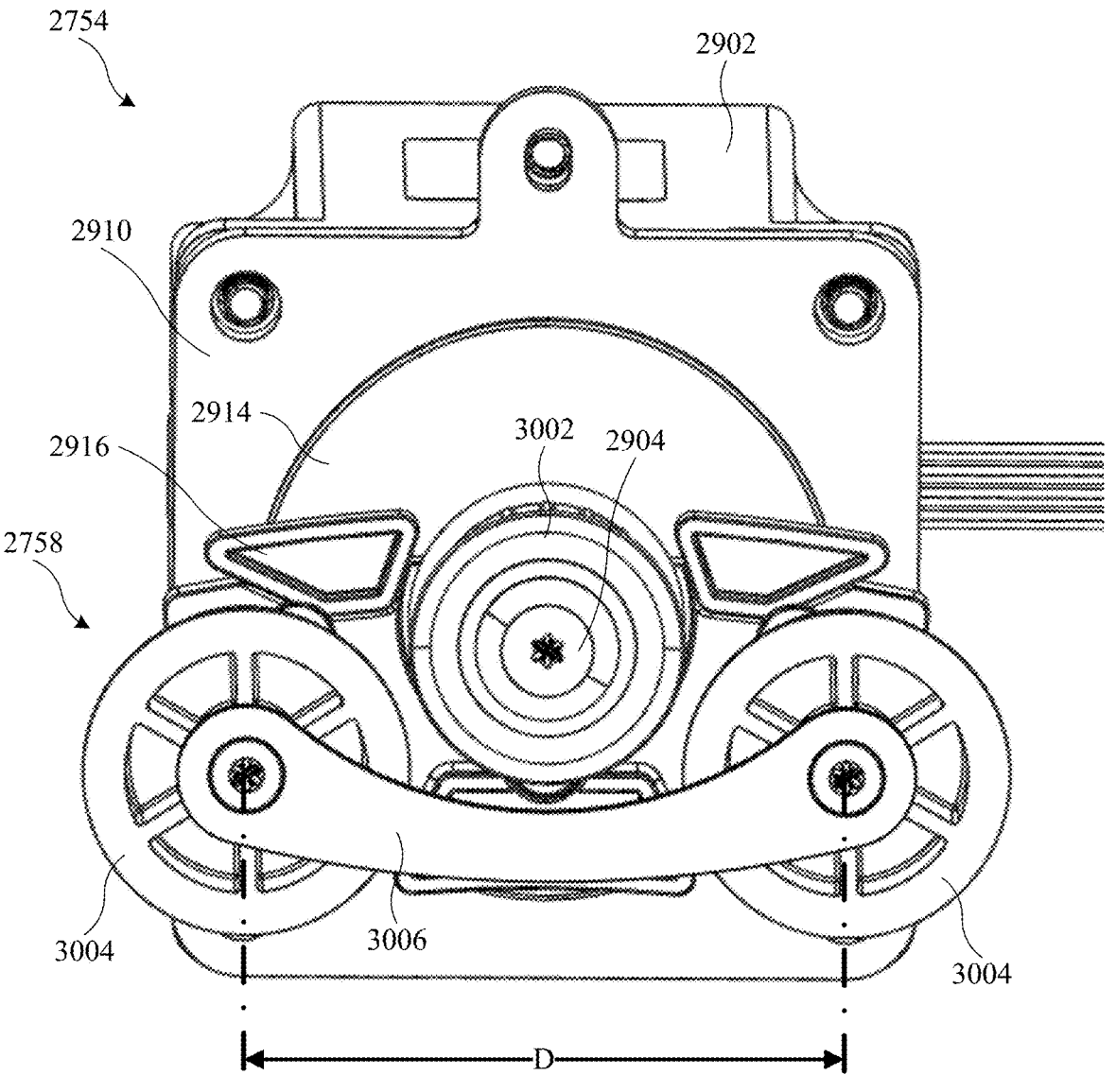
FIG. 31 is a front view of the actuator assembly shown in FIG. 29.

FIG. 31 illustrates a front view of the first drive assembly 2754 in communication with the first retaining mechanism 2758. As discussed above, the bushings 3004 may maintain the desired tension of the belt to ensure that the belt remains engaged with the gear 3002 of the actuator 2902 to thereby ensure proper actuation of the roof assembly 2604. To maintain such tension, the strap 3006 may extend between, and be coupled to the bushings 3004. The strap 3006 may be compliant or otherwise flexible (e.g., elastic) to facilitate a desired amount of lateral movement of the bushings 3004 relative to each other.

In particular, a distance (D) between the bushings 3004 may be tuned (e.g., adjusted) to adjust the tension on the belt of the drive system. For example, the bushings 3004 may move laterally relative to one another along the connector 2916 (e.g., within slots or channels of the connector 2916) such that the distance (D) between the bushings 3004 may be increased or decreased. As a result, the tension of the belt, which may be at least partially determined by contact on the belt by the bushings 3004, may be increased or decreased. For example, when the distance (D) between the bushings 3004 is decreased, the belt may be pushed towards the gear 3002 with a greater force to ensure proper meshing between the gear 3002 and the belt. Conversely, when the distance (D) between the bushings 3004 is increased, the belt may be pushed towards the gear with a lesser force to facilitate easier movement of the belt along the gear 3002. Thus, operation of the roof assembly 2604 may be tuned based upon a desired fluidity of movement.

Furthermore, the strap 3006 may define a maximum distance (D) between the bushings 3004 to further ensure that the belt remains meshed with the gear 3002. For example, the strap 3006 may exhibit some slack between the bushings 3004 or may otherwise be compliant such that, when the drive shaft 2904 drives the gear 3002 to advance the belt along the gear 3002, bushings 3004 may be able to move towards and away from one another to facilitate smoother articulation of the roof assembly 2604. However, the strap 3006 may be tuned (e.g., based on material properties and/or dimensions) to ensure that the bushings 3004 are only free to move away from one another a desired maximum distance (D) to ensure that the belt does not disengage the gear 3002.

Figure 32A:
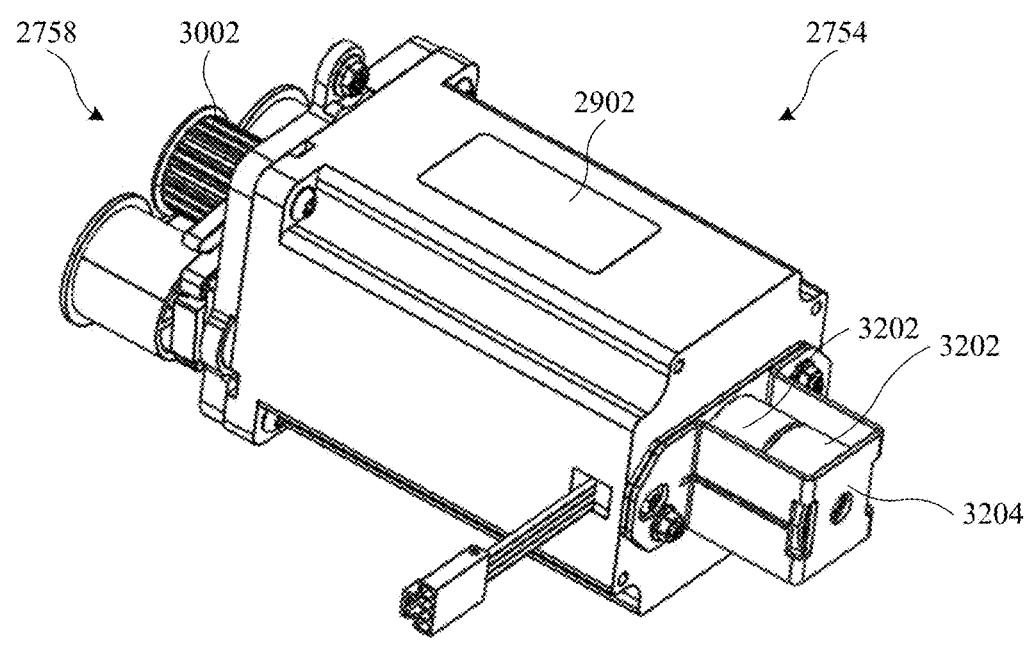
FIG. 32A is a rear perspective view of the actuator assembly shown in FIG. 29.
Figure 32B:
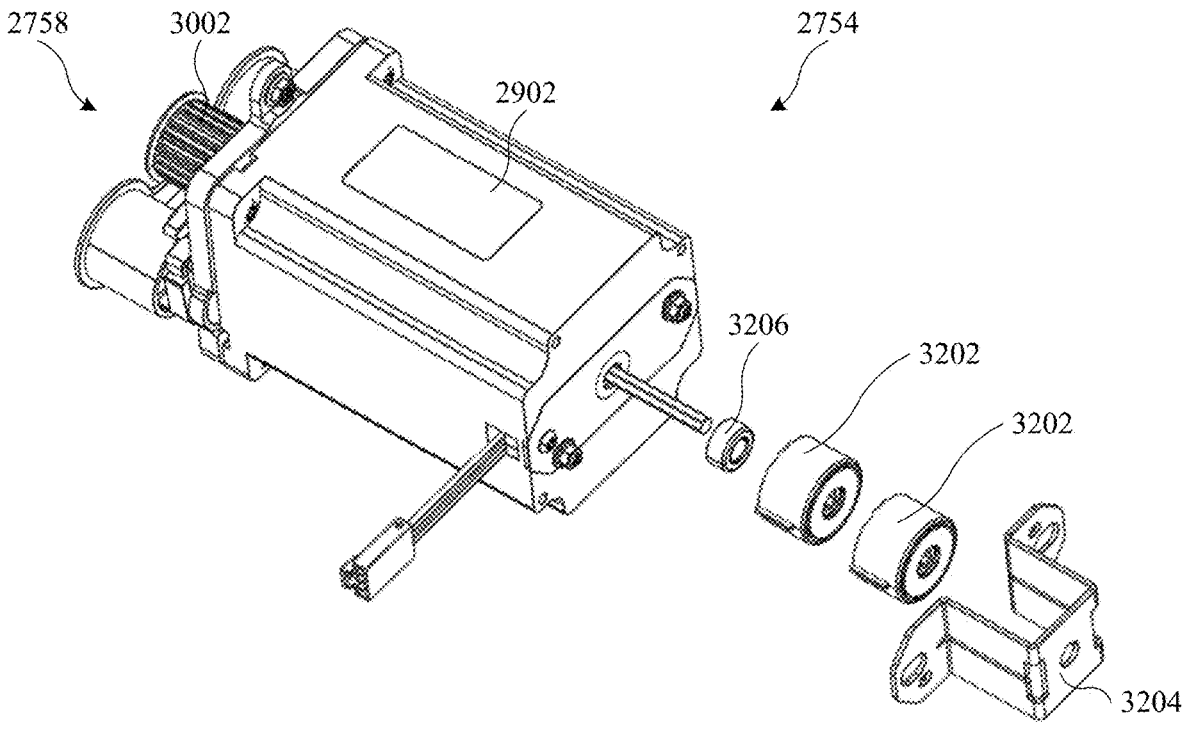
FIG. 32B is a front perspective view of the actuator assembly shown in FIG. 32A.

FIG. 32A illustrates a rear perspective view of the first drive assembly 2754 in communication with the first retaining mechanism 2758. FIG. 32B illustrates a partially exploded view of the first drive assembly 2754 shown in FIG. 32A. As discussed above, the gear 3002 of the actuator 2902 may be driven (e.g., rotated) by the drive shaft 2904 to engage and advance a belt of the drive system of the roof assembly 2604 to thereby actuator the roof assembly 2604 between the open position and the closed position.

During such operation, a user may need to stop the roof assembly 2604 during mid-operation in a position somewhere between the open position and the closed position. As a result, a weight of the roof assembly 2604 may naturally result in the roof assembly 2604 quickly moving to the open position or the closed position, depending on the position of the roof assembly 2604 during stoppage. That is, when the user initiates an emergency stop of the roof assembly 2604 during actuation (e.g., via the first user interface 2628 of the base 2602), the drive shaft 2904 may be free to rotate without resistance from the actuator 2902. As such, damage to the roof assembly 2604 may occur if the roof assembly 2604 quick moves to the open position or the closed position (e.g., "slams" closed).

To combat such concerns, the first drive assembly 2754 may include one or more counterweights, such as the counterweights 3202, coupled to the actuator 2902 by a counterweight bracket 3204. Any number of counterweights 3202 may be possible based upon a size and/or weight of the roof assembly 2604. As shown in FIGS. 32A and 32B, the counterweights 3202 may be coupled to the drive shaft 2904 at an opposing end of the drive shaft 2904 from the gear 3002. A gasket 3206 (e.g., O-ring, rubber seal, etc.) may be disposed between the counterweights 3202 and the actuator 2902 to seal an opening or gap therebetween. Based upon the position of the counterweights 3202, if an emergency stop is initiated, the counterweights 3202 may significantly slow down movement of the roof assembly 2604 towards the open position or the closed position when the drive shaft 2904 is free to rotate without resistance from the actuator 2902. As a result, damage to the roof assembly 2604 may be prevented during emergency stoppage.

Figure 33:
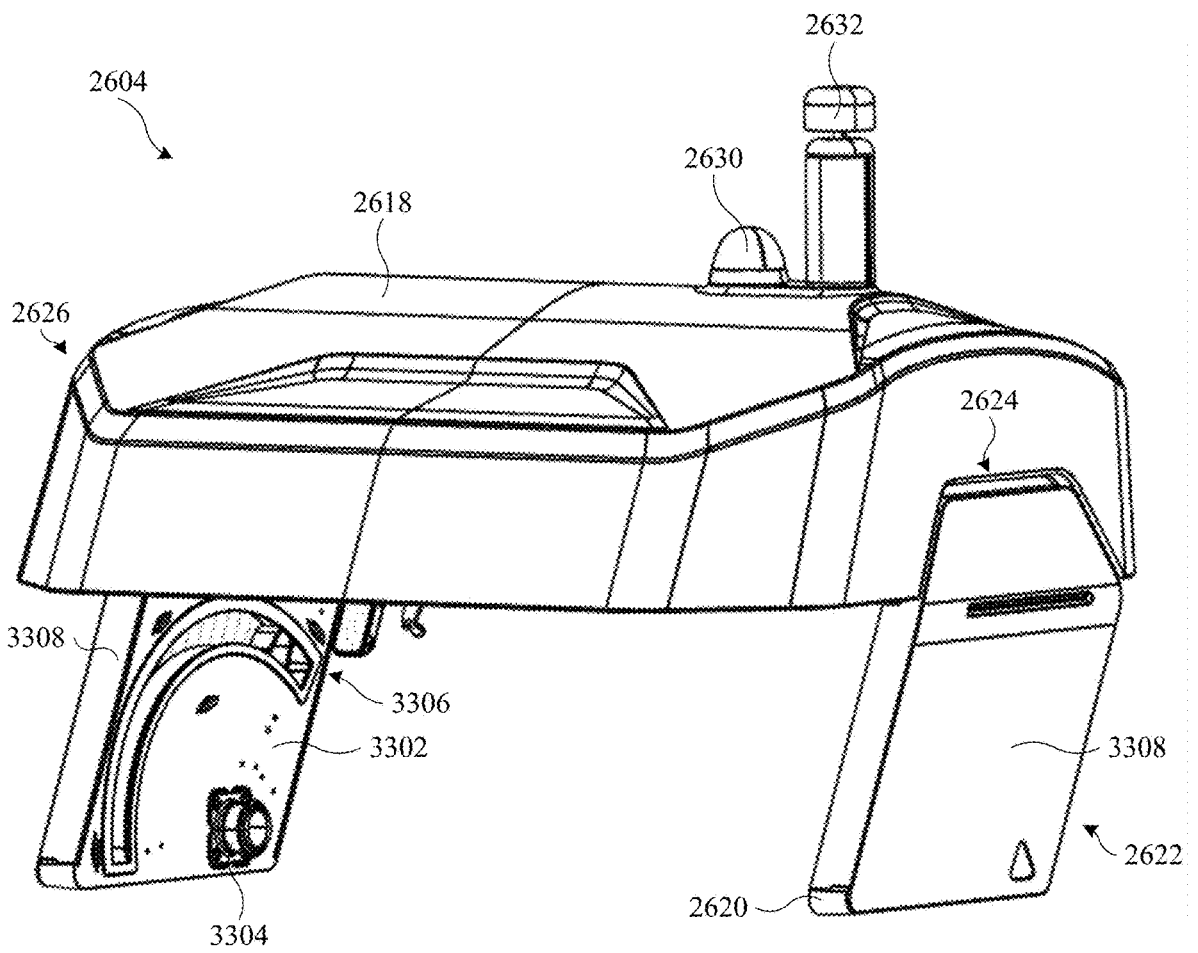
FIG. 33 is a perspective view of a roof assembly of the base station shown in FIG. 26.

FIG. 33 illustrates a perspective view of the roof assembly 2604 of the base station 2600. As discussed above, the roof assembly 2604 may include the cover 2618, which may include the rain sensor 2630 and the wind sensor 2632 disposed thereon. The roof assembly 2604 may also include one or more ears, such as the first ear 2620 and the second ear 3302, which may be coupled to the cover 2618 and movably coupled to the body 2612 of the base 2602 such that the roof assembly 2604 is movable between the open position and the closed position.

As shown in FIG. 33, the first ear 2620 may extend downward from the cover 2618 (e.g., downward from the groove 2624 of the cover 2618 located along the first side 2622 of the cover 2618) with respect to the elevational direction 2606 such that the first ear 2620 may be coupled to the first side 2622 of the base 2602 (e.g., the first side 2622 of the body 2612) via a pivot shaft of the first ear 2620, which may be similar to the pivot shaft 3304 of the second ear 3302. Similarly, the second ear 3302 may extend downward from the cover 2618 (e.g., downward from the groove 2624 of the cover 2618 located along the second side 2626 of the cover 2618) with respect to the elevational direction 2606 such that the second ear 3302 may be coupled to the opposing second side 2626 of the base 2602 (e.g., the second side 2626 of the body 2612) via the pivot shaft 3304 of the second ear 3302. As discussed about the pivot shaft 3304 of the first ear 2620 may be received by the pivot opening 2868 of the first side panel 2750 of the body 2612 and the pivot shaft 3304 of the second ear 3302 may be received by the pivot opening 2868 of the second side panel 2752 to define the axis of rotation 2870 of the roof assembly 2604.

Based on the above, the roof assembly 2604, when actuated by the first drive assembly 2754 and the second drive assembly 2756, may rotate about the axis of rotation 2870 defined by the pivot shaft 3304 of the first ear 2620 and the pivot shaft 3304 of the second ear 3302. Additionally, the first ear 2620 and the second ear 3302 may each include a track, such as the track 3306 of the second ear 3302 shown in FIG. 33. The track 3306 of the first ear 2620 may be complementary in shape to the track 3306 of the second ear 3302 such that the tracks may guide movement of the roof assembly 2604 between the open position and the closed position. That is, the actuator assemblies may, in conjunction with the belt and the retaining mechanism, be guided along a respective one of the tracks (e.g., the track 3306 of the first ear 2620 or the track 3306 of the second ear 3302). Additionally, to protect such operation from external moisture and/or debris, the first ear 2620 and the second ear 3302 may each include a cover panel 3308. As such, the track 3306 and the pivot shaft 3304 of each of the ears may be at least partially contained and/or enclosed by the cover panel 3308.

Figure 34:
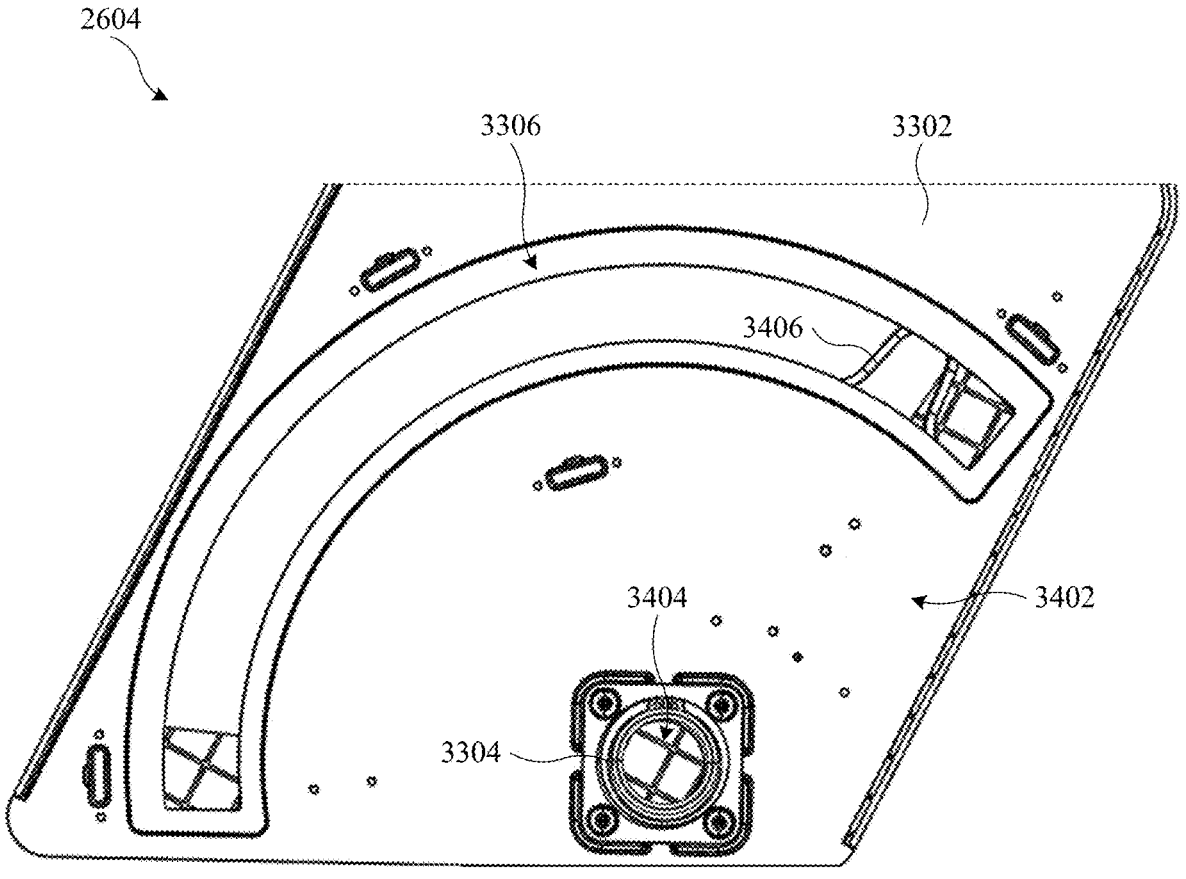
FIG. 34 is a close-up view of an ear of the roof assembly shown in FIG. 33.

FIG. 34 illustrates a close-up view of the second ear 3302 of the roof assembly 2604 shown in FIG. 33. The description herein of the second ear 3302 may also be equally applicably to the first ear 2620. That is, the first ear 2620 and the second ear 3302 may be similar unless otherwise stated. As discussed above, the second ear 3302 may define the track 3306. The second ear 3302 may further include the pivot shaft 3304 projecting from an inwardly facing surface 3402 of the second ear 3302 such that the pivot shaft 3304 may engage a respective pivot opening 2868 of the body 2612.

Additionally, as shown in FIG. 34, the pivot shaft 3304 of the second ear 3302 may define an opening 3404 therein. In particular, with respect to the base station 2600, the pivot shaft 3304 of the first ear 2620 (i.e., a first pivot shaft) and the pivot shaft 3304 of the second ear 3302 (i.e., a second pivot shaft) may each define an opening similar to the opening 3404. As such, wiring of the base station 2600 may be routed through one or more of the opening 3404 of the first pivot shaft or the opening 3404 of the second pivot shaft to electrically connect the base 2602 to the roof assembly 2604. As such, the roof assembly 2604 may rotate about the pivot shafts without shearing or otherwise damaging wiring extending through the opening 3404 of the pivot shafts.

The track 3306 of the second ear 3302 (and thus the first ear 2620) may be any size and/or shape to define the desired travel path of the roof assembly 2604 about the axis of rotation 2870. For example, as shown in FIG. 34, the track 3306 may be substantially arcuate and may at least partially surround the pivot shaft 3304 of the second ear 3302. Additionally, the track 3306 may extend through the second ear 3302 such that the belt 3406 of the drive system may communicate with the second drive assembly 2756 through the track 3306.

Figure 35A:
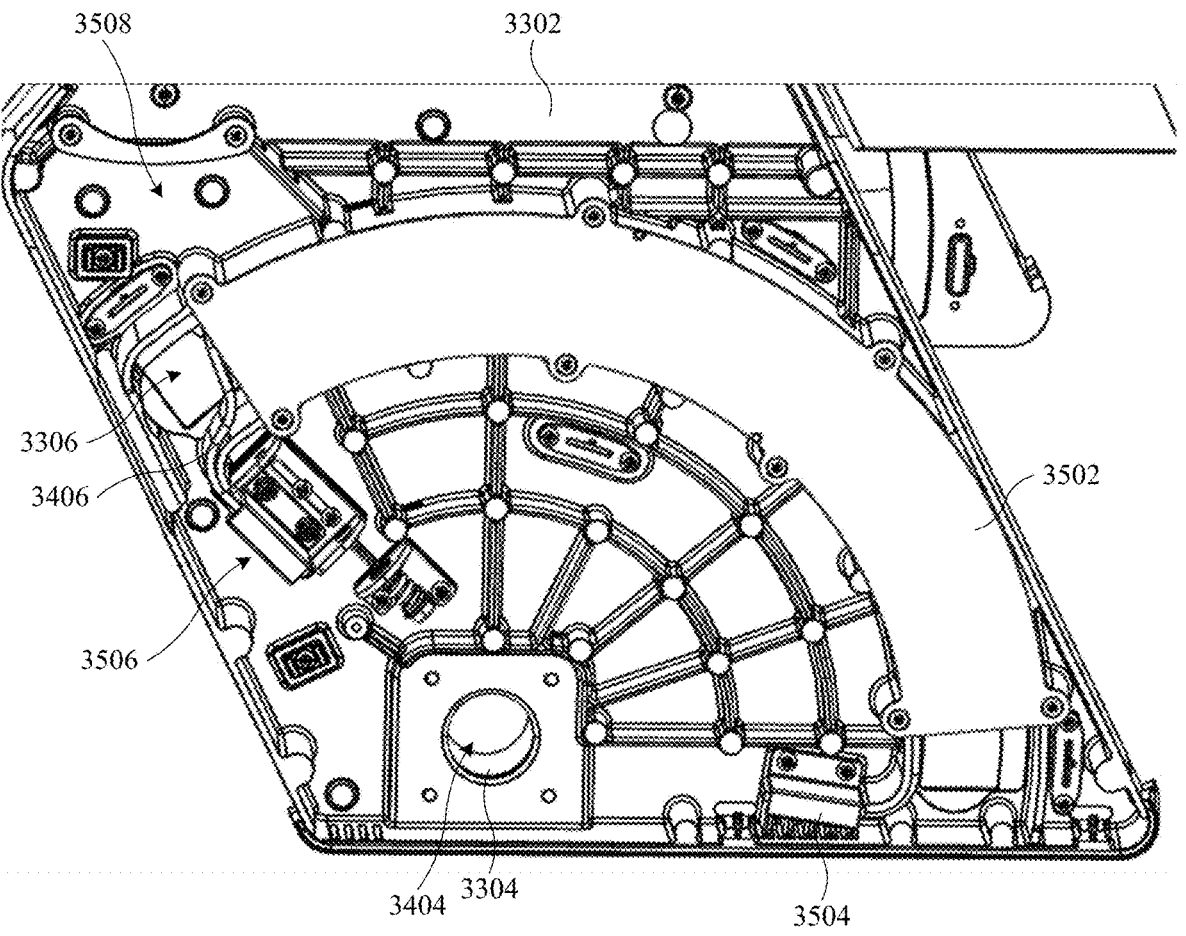
FIG. 35A is another close-up view of the ear shown in FIG. 34.
Figure 35B:
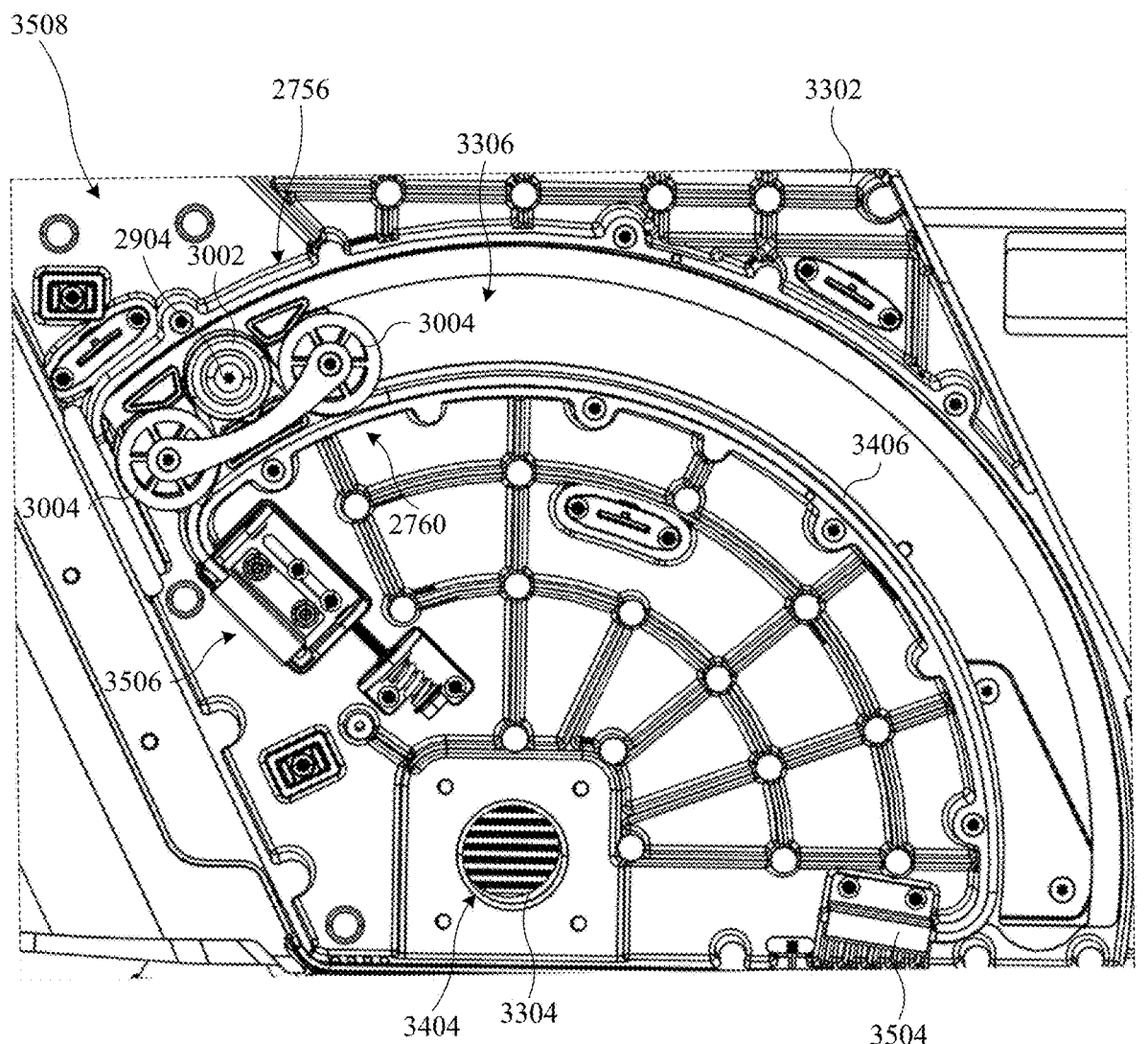
FIG. 35B is the close-up view of FIG. 35A with a track cover removed.

FIG. 35A illustrates another close-up view of the second ear 3302 with the cover panel 3308 removed. FIG. 35B illustrates the second ear 3302 shown in FIG. 35A with a track cover 3502 removed. The track cover 3502 may be configured to at least partially enclose the track 3306 within the second ear 3302 and/or maintain a position of the belt 3406 within the track 3306.

As discussed above, the second drive assembly 2756 may communicate with the second retaining mechanism 2760 to actuate the roof assembly 2604. In particular, as shown in FIG. 35B, the belt 3406 may be routed through the bushings 3004 and around the gear 3002 to mesh with the gear 3002 (e.g., grooves or teeth of the belt 3406 may mesh with teeth of the gear 3002) such that, when the drive shaft 2904 is rotated to thereby rotate the gear 3002, the rotational movement of the gear 3002 may advance (e.g., translate) the belt 3406 along the gear 3002 to guide rotation of the roof assembly 2604 along the track 3306.

To facilitate the above movement, the belt 3406 may be fixedly connect to the second ear 3302 via a belt bracket 3504 at a first end of the belt 3406. The belt 3406 may be routed through the track 3306, such as along a peripheral edge of the track 3306, routed through the bushings 3004 and around the gear 3002, and secured to a belt tensioner 3506 at an opposing second end of the belt 3406. As such, the belt 3406 may extend between, and be coupled to, the belt tensioner 3506 and the belt bracket 3504 to maintain a position and tension of the belt 3406 to facilitate translation of the belt 3406 relative to the gear 3002.

Additionally, it should be noted that the belt bracket 3504, the belt tensioner 3506, and the second retaining mechanism 2760 (or a portion thereof), may be contained within a cavity 3508 defined by the second ear 3302. The cavity 3508 may be enclosed by the cover panel 3308 such that the aforementioned components may be protected by moisture and/or debris, which may negatively impact operation of the drive system of the roof assembly 2604.

Figure 36:
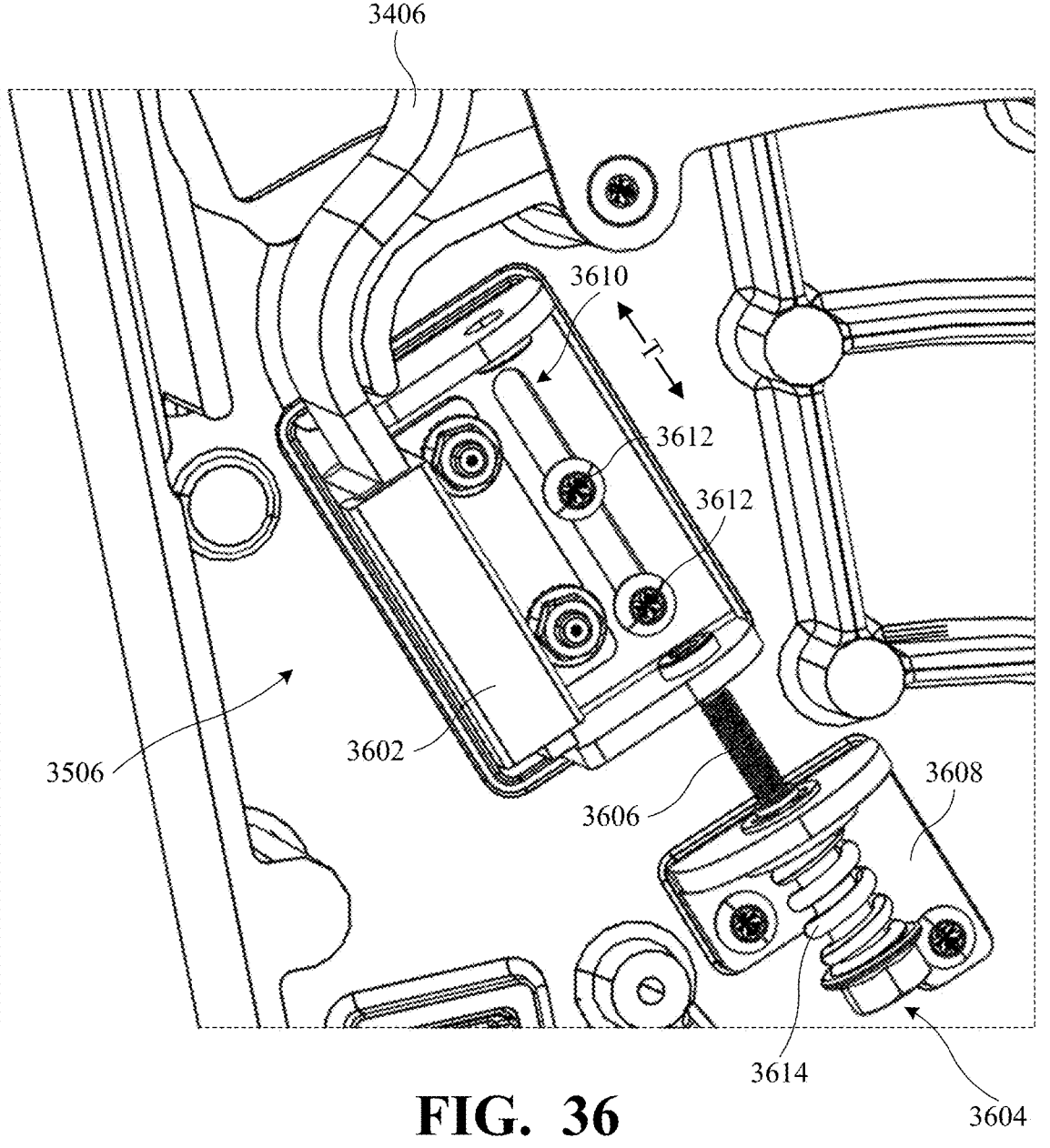
FIG. 36 is a close-up view of a belt tension shown in FIG. 35B.

FIG. 36 illustrates a close-up view of the belt tensioner 3506 shown in FIG. 35B. As discussed above, an end of the belt 3406 may be coupled to the belt tensioner 3506. For example, the end of the belt 3406 may be fixedly coupled to a tensioner bracket 3602 to maintain a position of the belt 3406 in conjunction with the belt bracket 3504. The tensioner bracket 3602 may be movable in a direction (T) towards and away from the track 3306 to adjust a tension of the belt 3406. That is, the tensioner bracket 3602 may be translated away from the belt 3406 in the direction (T) to increase the tension of the belt 3406. Conversely, the tensioner bracket 3602 may be translated towards the belt 3406 in the direction (T) to decrease the tension of the belt 3406. As such, since the belt 3406 is fixed to the tensioner bracket 3602, the tension of the belt 3406 may be adjusted by moving the tensioner bracket to ensure proper actuation of the roof assembly 2604.

To move the tensioner bracket 3602 in the direction (T), the tensioner bracket 3602 may be in communication with a tensioner 3604. The tensioner 3604 may be in communication with a fastener 3606 (e.g., a threaded fastener) or may be the fastener 3606. The tensioner 3604 may be rotated or otherwise advanced to move the tensioner bracket 3602. For example, the fastener 3606 may be coupled to the tensioner bracket 3602 such that advancing the tensioner 3604 towards the tensioner bracket 3602 may cause the tensioner bracket 3602 to move in the direction (T) towards the belt 3406, and advancing the fastener 3606 away from the tensioner bracket 3602 may cause the tensioner bracket 3602 to move in the direction (T) away from the belt 3406. As such, at least a portion of the tensioner 3604, such as a fixed plate 3608 of the tensioner 3604, may remain stationary. Moreover, the tensioner bracket 3602 may define a slot 3610 therein that may guide the tensioner bracket 3602 in the direction (T), such as along one or more fasteners 3612. Furthermore, to maintain the tension on the belt 3406, the tensioner may also include a biasing member 3614 (e.g., a spring, coil, compressible member, etc.) to bias the tensioner 3604 away from the tensioner bracket 3602.

Figure 37:
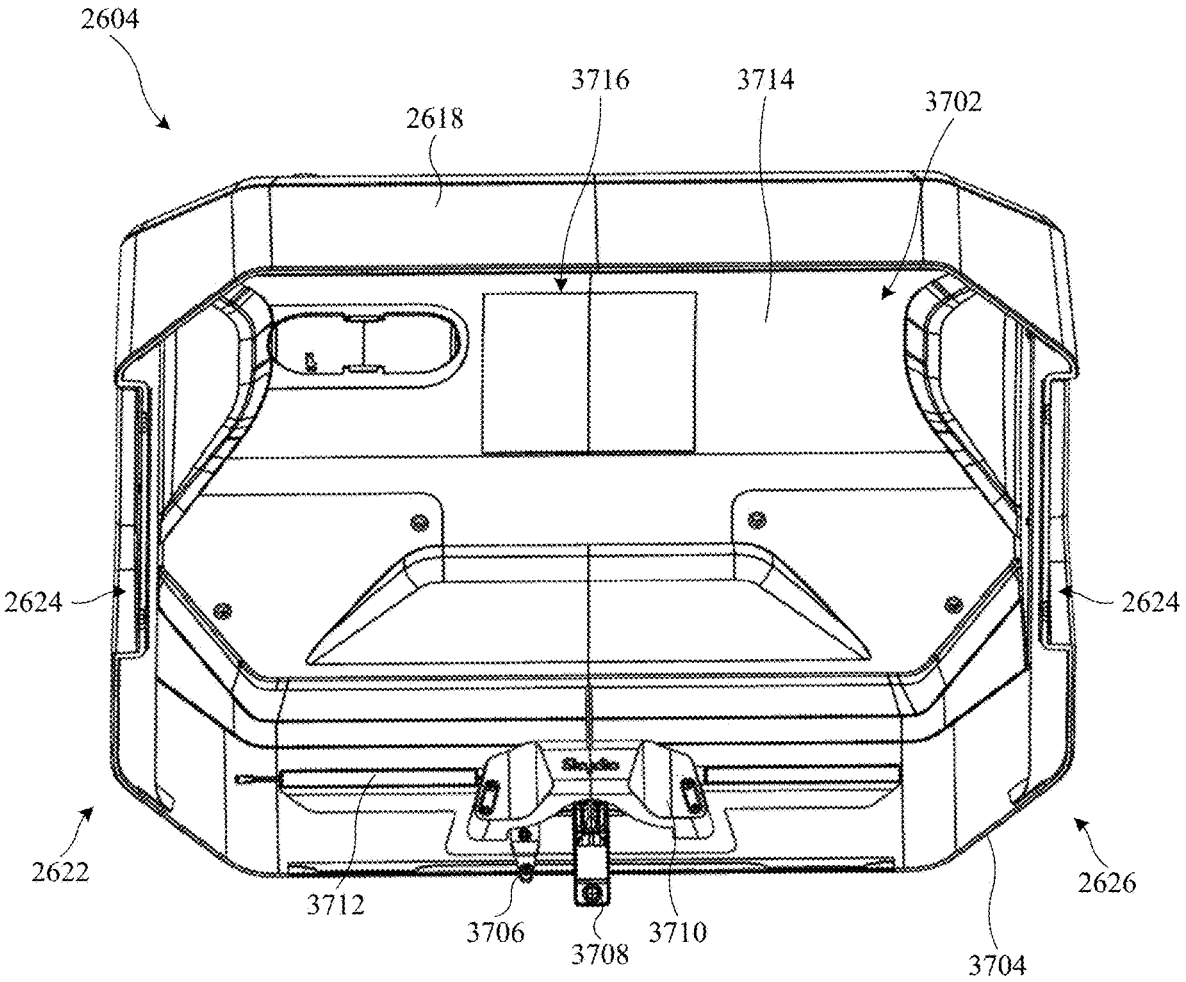
FIG. 37 is a perspective view of the roof assembly shown in FIG. 33 illustrating an interior of a cover of the roof assembly.
Figure 38:
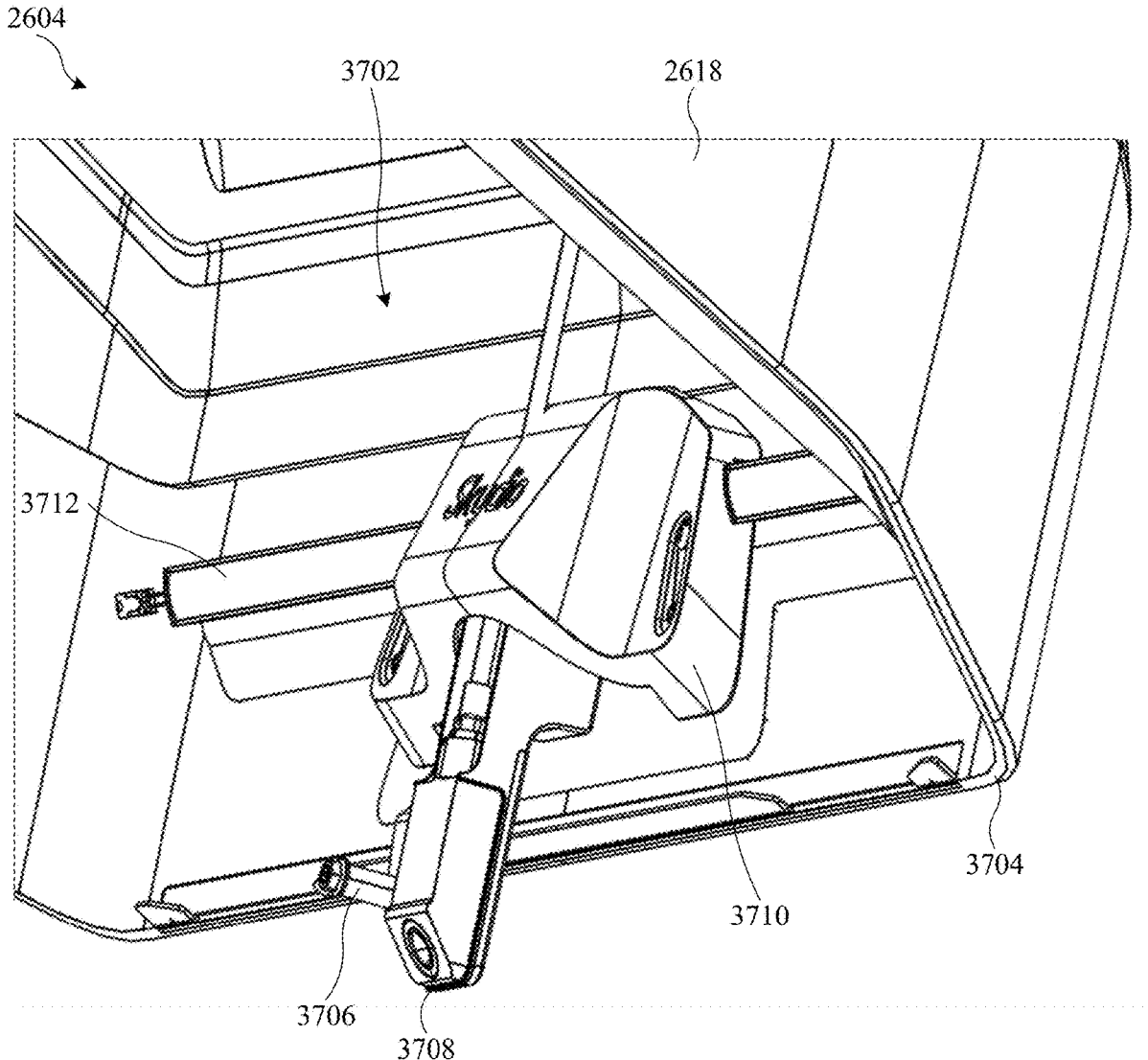
FIG. 38 is a close-up view of the roof assembly shown in FIG. 37.

FIG. 37 illustrates a perspective view of the roof assembly 2604 to further illustrate an interior of the cover 2618. FIG. 38 illustrates a close-up view of the roof assembly 2604 shown in FIG. 37. The first ear 2620 and the second ear 3302 have been removed for illustrative purposes. As discussed above, the first ear 2620 and the second ear 3302 may be coupled to the cover 2618 within the groove 2624 of the first side 2622 and the groove 2624 of the opposing second side 2626 of the cover 2618, respectively.

Similar to the body 2612 of the base 2602, the cover 2618 may define a cavity 3702 therein, which may store one or more components of the base station 2600. The cavity 3702 may also be adapted to at least partially enclose the base 2602 (e.g., the landing platform of the base 2602 support by the body 2612) and/or the UAV 10 when docked. By way of example, when the roof assembly 2604 is located in the closed position, at least a portion of the UAV 10 docked on the landing platform may be contained within the cavity 3702 of the cover 2618. For example, a mounting edge 3704 of the cover 2618 (e.g., a bottom edge of the cover 2618 with respect to the elevational direction 2606) may be configured to abut the top edge 2864 of the body 2612 and/or an upper surface of the indicator lighting 2644 to substantially enclose the base 2602 and contain the UAV 10 therein. The cover 2618 may further include a latch 3706 positioned adjacent to the mounting edge 3704, which may engage a portion of the body 2612 to lock the cover 2618 to the body 2612 when the roof assembly 2604 is in the closed position.

The roof assembly 2604 may also include a camera 3708 coupled to the cover 2618 and at least partially disposed within the cavity 3702 of the cover. For example, the camera 3708 may be secured to an interior wall of the cover 2618 such that at least a portion of the camera (e.g., a body of the camera) may extend into the cavity 3702 and be coupled to the interior wall by a camera bracket 3710. It should be noted that the camera 3708 is not limited to any particular type of camera and may be any camera that may capture images and/or video (e.g., live feed video) of a surrounding area. For example, based upon the position of the camera 3708 along the cover 2618, the camera 3708 may be positioned such that a field of view of the camera 3708 may monitor the landing platform—and thus also the UAV 10—when the roof assembly 2604 is in the closed position. Similarly, the camera 3708 may extend above the landing platform (e.g., above the top of the base 2602) in the elevation direction 2606 when the roof assembly 2604 is in the closed position such that the field of view of the camera 3708 maintains monitoring of the landing platform—and thus also the UAV 10. As such, the landing platform may be configured to be positioned within the field of view of the camera 3708 when the roof assembly 2604 is in the closed position and the open position. Thus, the camera 3708 may be coupled to the cover 2618 such that the camera 3708 may be enclosed by the base 2602 and the cover 2618 when the roof assembly 2604 is in the closed position.

The roof assembly 2604 may also include a light 3712 located within the cavity 3702 of the cover 2618. For example, the light 3712 may be located adjacent to the camera 3708 and contained within the cavity 3702 of the cover 2618 such that the light 3712 may illuminate the field of view of the camera 3708 (e.g., to illuminate the landing platform and the cavity 3702 of the cover 2618). The light 3712 may be adapted to illuminate a surrounding area based upon activity of the base station 2600 and/or the UAV 10. For example, the light 3712 may be adapted to illuminate the landing platform when the UAV 10 initiates a takeoff sequence and/or a landing sequence. Similarly, the light 3712 may illuminate the surrounding area when the roof assembly 2604 moves from the closed position to the open position, or vice versa. As such, the light 3712 may be any type of light, such as an LED panel and/or an LED strip.

As discussed above, the roof assembly 2604 may enclose the UAV 10 when the UAV 10 is docked on the landing platform and the roof assembly 2604 is in the closed position. In such a case, the user may need to wirelessly communicate with the UAV 10 while maintaining the closed position of the roof assembly 2604. For example, in circumstances where the user (e.g., the operator) is remotely located and communicating with the UAV 10 using wireless communication between the UAV 10 and an external electronic device, the user may be unable to physically access the UAV 10 to obtain data, a status of the UAV 10 (e.g., power charge), or other information pertaining to the UAV 10. As such, it may be necessary to ensure that the roof assembly 2604 does not inhibit (e.g., interfere) with the wireless communication between the UAV 10 and the external electronic device when the roof assembly 2604 is in the closed position.

To facilitate such wireless communication, the cover 2618 may include a cover panel 3714 disposed within the cavity 3702 of the cover 2618 such that a heating element, as discussed further below, is located between the interior surface of the cover 2618 and the cover panel 3714. The cover panel 3714 and the heating element may define a cutout 3716 therein that is configured to facilitate the wireless communication between the UAV 10 located on the landing platform and the external electronic device when the roof assembly 2604 is in the closed position. That is, the cover panel 3714 and/or the heating element may interfere with wireless communication between the UAV 10 and the external electronic device. As such, the cutout 3716 may form a void in the cover panel 3714 and/or the heating element to provide an access point for the wireless signal to reach the UAV 10 unobstructed. As shown in FIG. 37, the cutout 3716 may be enclosed by the cover 2618 such that the cutout 3716 does not expose the cavity 3702 of the cover 2618 to external elements (e.g., moisture and/or debris).

Figure 39:
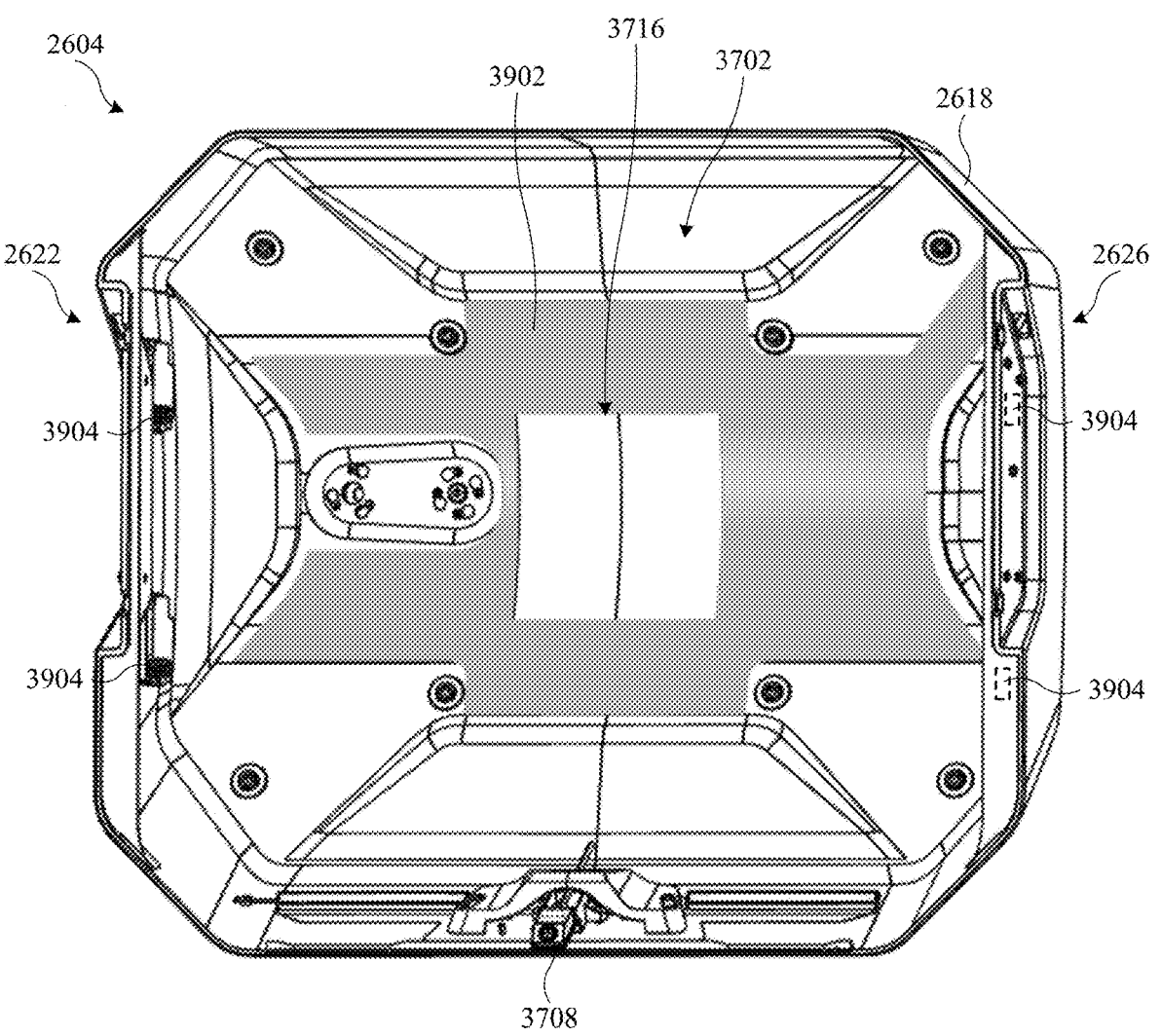
FIG. 39 is close-up view of the roof assembly shown in FIG. 37 highlighting a heating element of the cover.

To further illustrate, FIG. 39 is another perspective view of the cover 2618 with the cover panel 3714 removed to better show a heating element of the roof assembly 2604, such as the heating element 3902 (shaded for illustrative purposes). As discussed above, the heating element 3902 may be disposed along an interior surface of the cover 2618 and located within the cavity 3702 of the cover 2618. The heating element 3902 may be located between the interior surface of the cover 2618 and the cover panel 3714, and may at least partially define the cutout 3716 in conjunction with the cover panel 3714. A size and/or shape of the heating element 3902 and/or a position of the heating element 3902 is not particularly limited to any one configuration, and FIG. 40 is intended only as an illustrative configuration.

The heating element 3902 may facilitate de-icing of one or more of the roof assembly 2604, the base 2602, or the UAV 10. The heating element 3902 may be any type of heating element that may increase a temperature of at least a portion of the base station 2600. For example, the heating element 3902 may be a positive temperature coefficient (PTC) heater, a resistance wire heater, an infrared heater, another type of heating element, or a combination thereof. As such, the heating element 3902 may increase a temperature of the cover 2618 and/or the base 2602 (e.g., the body 2612 or one or more components therein) to prevent unwanted ice and/or snow accumulation, which may inhibit operation of the base station 2600. Similarly, the heating element 3902 may increase an overall temperature of the base station 2600 to maintain a temperature of the UAV 10 therein.

As discussed above, the UAV 10 may be in wireless communication with the external electronic device through the cutout 3716. The roof assembly 2604 may also be in wireless communication with the external electronic device (or another electronic device). For example, the roof assembly 2604 may include one or more antennas 3904 coupled to the interior surface of the cover 2618 and contained within the cavity 3702 of the cover 2618. For example, a first pair of the antennas 3904 may be disposed near the first side 2622 of the cover 2618 and a second pair of the antennas 3904 may be disposed near the opposing second side 2626 of the cover 2618. As such, the antennas 3904 may be spaced apart from the UAV 10 when docked and/or may be spaced apart from the camera 3708 to prevent electrical interface with the UAV 10 and/or the camera 3708. Thus, the antennas 3904 may act as a receiver and/or a transmitter to establish wireless communication with the external electronic device.

Figure 40:
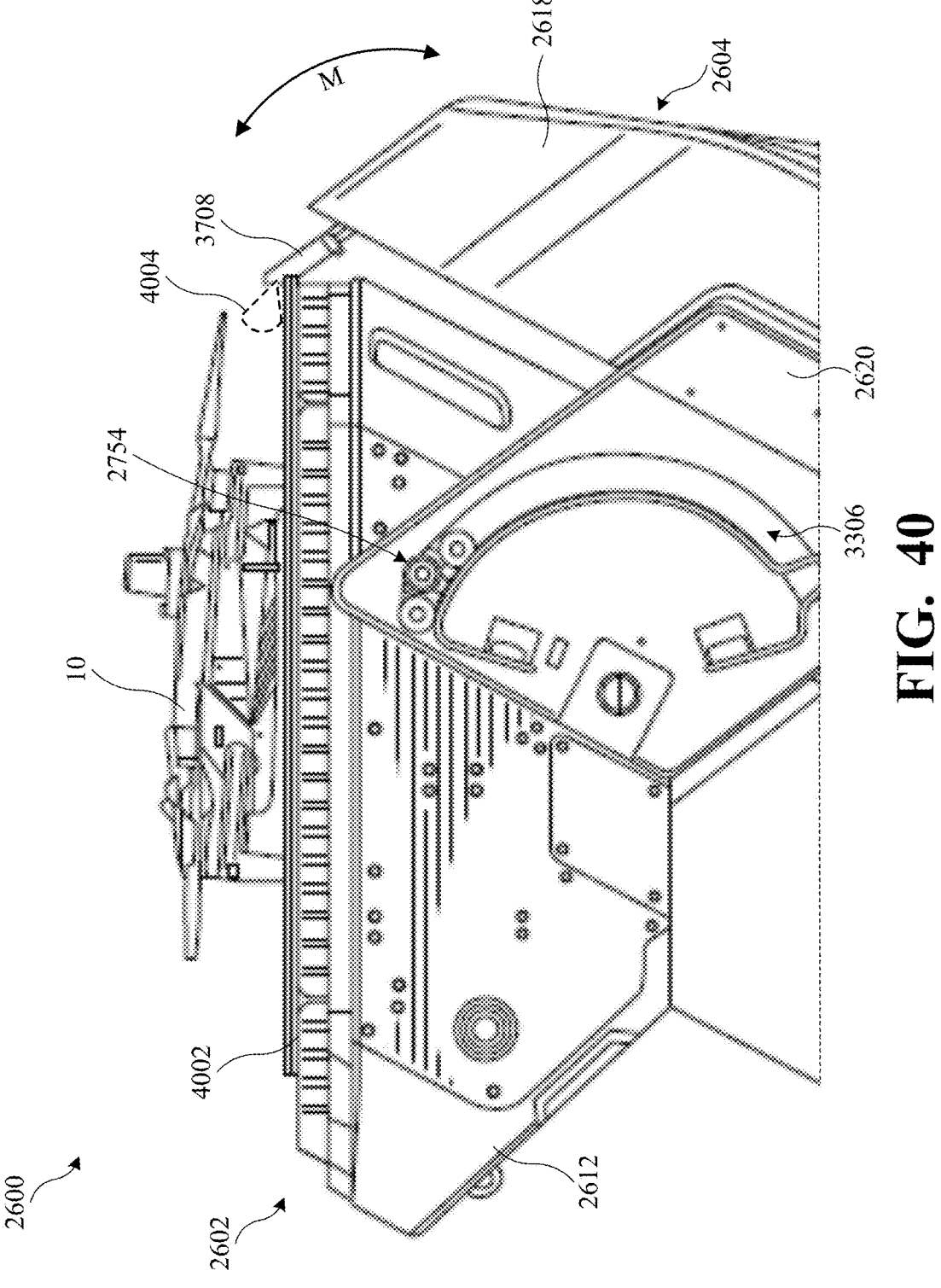
FIG. 40 is a side view of the base station shown in FIG. 26 illustrating the roof assembly of the base station in an open position.

FIG. 40 illustrates a side view of the base station 2600 having the roof assembly 2604 in an open position. As discussed above, the roof assembly 2604 may move in the direction of movement (M) between the closed position, in which the cover 2618 may enclose the landing platform, such as the landing platform 4002, and the UAV 10 supported thereon, and the open position, in which the cover 2618 may be located at least partially below the landing platform 4002—and thus also partially below the base 2602—with respect to the elevational direction 2606 such that the landing platform 4002 may be unobstructed by the cover 2618 to facilitate takeoff and landing of the UAV 10. In the open position, the roof assembly 2604 may also be at least partially inboard of the back side of the base 2602 with respect to the longitudinal direction 2610 such that at least a portion of the roof assembly 2604 (e.g., a portion of the cover 2618) is contained beneath the base 2602.

Such positioning of the roof assembly 2604 in the closed position and the open position may be dictated by the first drive assembly 2754 and the second drive assembly 2756. As discussed above, the drive assemblies may interact with the track 3306 of the first ear 2620 and the track 3306 of the second ear 3302, respectively, to define the angular range of motion and the swing envelope of the roof assembly 2604. Moreover, as shown in FIG. 40, the drive assemblies may be located beneath the landing platform 4002 with respect to the elevational direction 2606.

Additionally, as discussed above, the roof assembly 2604 may include a camera 3708 coupled to the cover 2618. The camera 3708 may be positioned such that a field of view 4004 of the camera 3708 may monitor the landing platform 4002 when the roof assembly 2604 is in the closed position. Similarly, the camera 3708 may also extending above the landing platform 4002 in the elevational direction 2606 when the roof assembly 2604 is in the closed position such that the field of view 4004 of the camera 3708 maintains monitoring of the landing platform 4002, and thus also maintains monitoring of the UAV 10. Thus, the camera 3708 may remain unobstructed by the base 2602 even when the roof assembly 2604 articulates between the closed position and the open position, such that the landing platform 4002 and the UAV 10 thereon may be accurately tracked.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A base station for an unmanned aerial vehicle (UAV), comprising:
   a base that includes:
      a body; and
      a landing platform supported by the body and configured to support the UAV; and
   a roof assembly movably coupled to the base and that includes:
      a cover defining a cavity therein; and
      one or more ears fixedly coupled to the cover and movably coupled to the body such that the roof assembly is movable between a closed position, in which the cover is configured to enclose the landing platform and the UAV supported thereon, and an open position, in which the cover is located at least partially below the landing platform with respect to an elevational direction and at least partially beneath the base with respect to a longitudinal direction that is transverse to the elevational direction such that the landing platform is unobstructed by the cover to facilitate takeoff and landing of the UAV,
      wherein the roof assembly is rotatable through an angular range of motion that is defined by the one or more ears.

2. The base station of claim 1, wherein the one or more ears includes:
   a first ear fixedly coupled to a first side of the cover and movably coupled to a first side of the body; and
   a second ear fixedly coupled to an opposing second side of the cover and movably coupled to an opposing second side of the body.

3. The base station of claim 2, wherein the first ear is movably coupled to the first side of the body by a first pivot shaft projecting from the first ear, the second ear is movably coupled to the opposing second side of the body by a second pivot shaft projecting from the second ear, and the first pivot shaft and the second pivot shaft are coaxial along an axis of rotation of the roof assembly.

4. The base station of claim 1, wherein the body defines a cavity therein, and wherein one or more actuators are disposed in the cavity of the body and coupled to the roof assembly to move the roof assembly between the closed position and the open position.

5. The base station of claim 4, wherein the one or more actuators extend at least partially through the body to engage the one or more ears.

6. The base station of claim 1, where the roof assembly is rotatable through the angular range of motion, which lies substantially within a range of approximately 110 degrees to approximately 120 degrees during repositioning of the roof assembly between the closed position and the open position.

7. The base station of claim 1, further comprising indicator lighting extending at least partially around a perimeter of the base, wherein the indicator lighting remains unobstructed by the roof assembly when the roof assembly is in the open position and the closed position.

8. The base station of claim 7, wherein the indicator lighting is disposed along a top edge of the body and secured to the body by a peripheral bracket projecting in the elevational direction away from the top edge.

9. The base station of claim 7, wherein a light module that is configured to control and power the indicator lighting is electrically connected to the indicator lighting and disposed within confines of the body.

10. The base station of claim 1, wherein the roof assembly further includes one or more of a rain sensor or a wind sensor coupled to an exterior surface of the cover.

11. The base station of claim 1, wherein the base further includes a user interface disposed along an exterior surface of the body, and wherein a user is configured to stop movement of the roof assembly between the closed position and the open position by interacting with the user interface.

12. The base station of claim 1, wherein the roof assembly further includes a camera coupled to the cover and at least partially disposed within the cavity of the cover, and wherein the camera is positioned such that a field of view of the camera is configured to monitor the landing platform when the roof assembly is in the closed position.

13. The base station of claim 12, wherein the camera is configured to extend above the landing platform in the elevational direction when the roof assembly is in the closed position such that the field of view of the camera maintains monitoring of the landing platform.

14. A base station for an unmanned aerial vehicle (UAV), comprising:
   a base that includes a landing platform configured to support the UAV; and
   a roof assembly movably coupled to the base and configured to move between a closed position, in which the roof assembly is configured to enclose the landing platform and the UAV supported thereon, and an open position, in which the roof assembly exposes the landing platform to facilitate takeoff and landing of the UAV, wherein the roof assembly includes:
      a cover defining a cavity therein;
      a first ear extending downward from the cover with respect to an elevational direction and coupled to a first side of the base via a first pivot shaft;
      a second ear extending downward from the cover with respect to the elevational direction and coupled to an opposing second side of the base via a second pivot shaft; and a camera coupled to the cover and configured for enclosure by the base and the cover when the roof assembly is in the closed position, wherein the landing platform is configured for positioning within a field of view of the camera when the roof assembly is in the closed position and the open position.

15. The base station of claim 14, wherein the first pivot shaft and the second pivot shaft each define an opening therein, and wherein wiring of the base station is configured for routing through one or more of the opening of the first pivot shaft or the opening of the second pivot shaft to electrically connect the base to the roof assembly.

16. The base station of claim 14, wherein the roof assembly further includes a light located adjacent to the camera and contained within the cavity of the cover.

17. The base station of claim 14, further comprising indicator lighting extending around a periphery of the base, wherein the indicator lighting is configured to provide a visual indication of activity of the base station.

18. A base station for an unmanned aerial vehicle (UAV), comprising:

a base that includes a landing platform configured to support the UAV; and a roof assembly movably coupled to the base and configured to move between a closed position, in which the roof assembly is configured to enclose the landing platform and the UAV supported thereon, and an open position, in which the roof assembly exposes the landing platform, wherein the roof assembly includes:

a cover defining a cavity therein;

a heating element disposed along an interior surface of the cover and located within the cavity of the cover, wherein the heating element is configured to facilitate de-icing of one or more of the roof assembly, the base, or the UAV; and a cover panel disposed within the cavity of the cover such that the heating element is located between the interior surface of the cover and the cover panel, wherein the heating element and the cover panel define a cutout therein that is configured to facilitate wireless communication between the UAV located on the landing platform and an external device when the roof assembly is in the closed position.

19. The base station of claim 18, wherein the roof assembly further includes one or more antennas coupled to the interior surface of the cover and contained within the cavity of the cover.

20. The base station of claim 18, wherein the cutout defined by the heating element and the cover panel is enclosed by the cover.

* * * * *